United States Patent [19]
Asano et al.

[11] 3,876,028
[45] Apr. 8, 1975

[54] SYSTEM FOR CONTROLLING AUTOMATIC TRANSMISSION OF VEHICLE

[75] Inventors: Tadao Asano, Kariya; Noboru Murakami, Nagoya; Koichiro Hirozawa, Kariya; Akira Tarao, Okazaki, all of Japan

[73] Assignee: Aisin Seiki Kabushiki Kaisha, Kariya, Japan

[22] Filed: Apr. 14, 1972

[21] Appl. No.: 244,052

[30] Foreign Application Priority Data
Apr. 16, 1971   Japan.............................. 46-25498

[52] U.S. Cl................. 180/70 R; 74/866; 192/3.57
[51] Int. Cl............................................. B60k 21/00
[58] Field of Search......... 74/866; 180/70; 192/3.57, 192/3.58

[56] References Cited
UNITED STATES PATENTS
3,640,156  2/1972  Mori .................................. 74/866
3,709,068  1/1973  Mohri ................................ 74/866
3,713,351  1/1973  Sakakibara ........................ 74/866

Primary Examiner—David Schonberg
Assistant Examiner—T. L. Siemens
Attorney, Agent, or Firm—Stevens, Davis, Miller & Mosher

[57] ABSTRACT

For completing a selected one of a plurality of gear trains through a transmission of a vehicle, gearshift means is driven by a hydraulic circuit including a plurality of solenoid valves. The solenoids of these valves are selectively energized by gearshift control means in response to an electric signal which represents the rotational speed of a transmission output shaft or each manual shift made by the vehicle driver. Provisions are also made for modifying shifts according to the payload of the vehicle and the inclination of the road.

23 Claims, 32 Drawing Figures

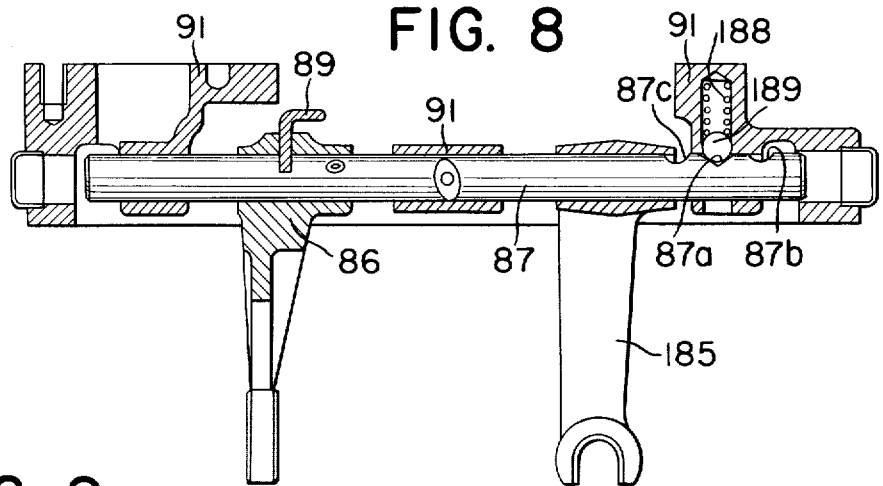
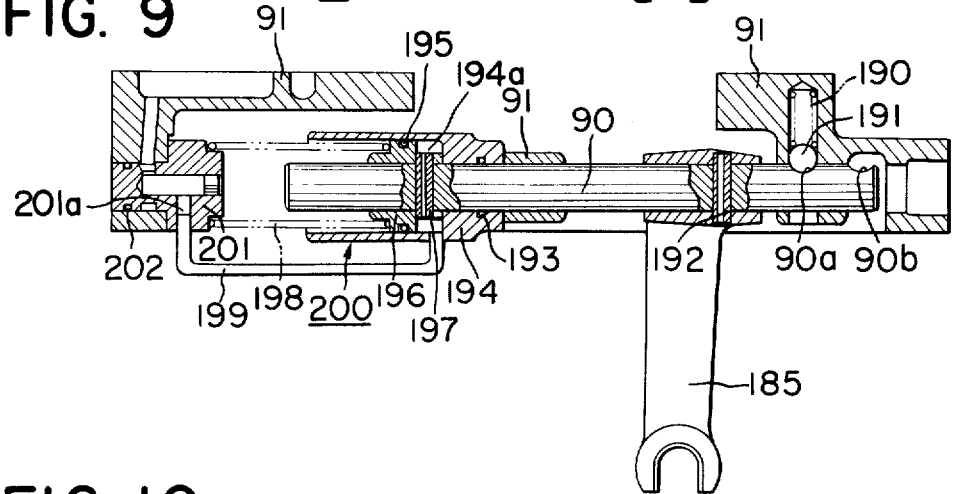
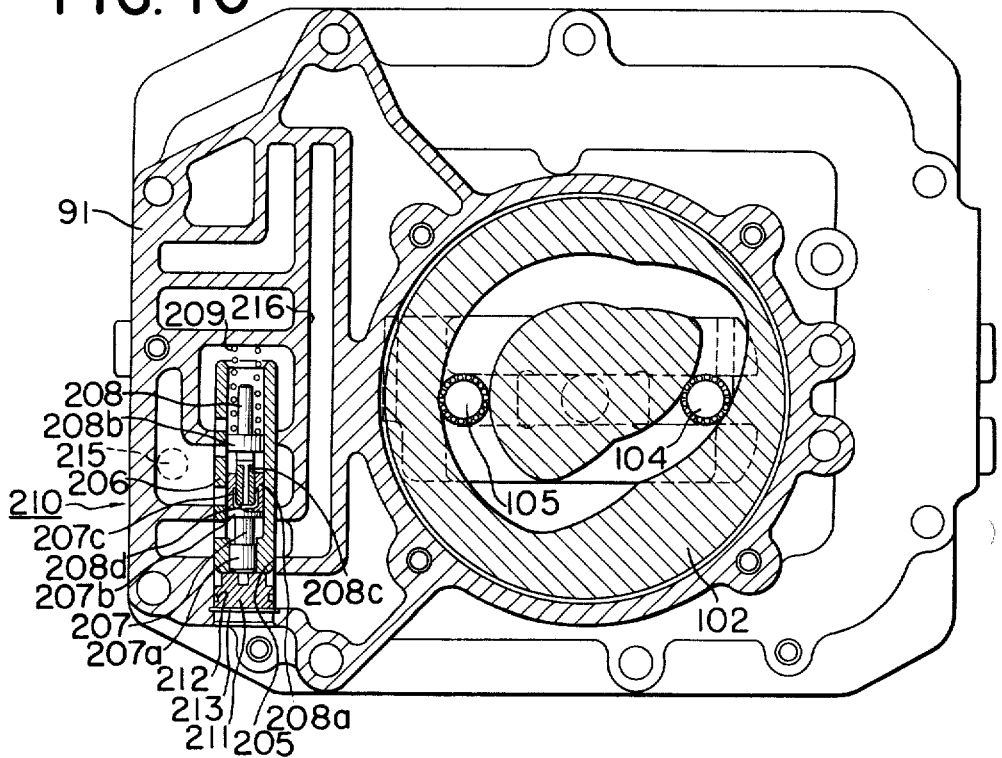

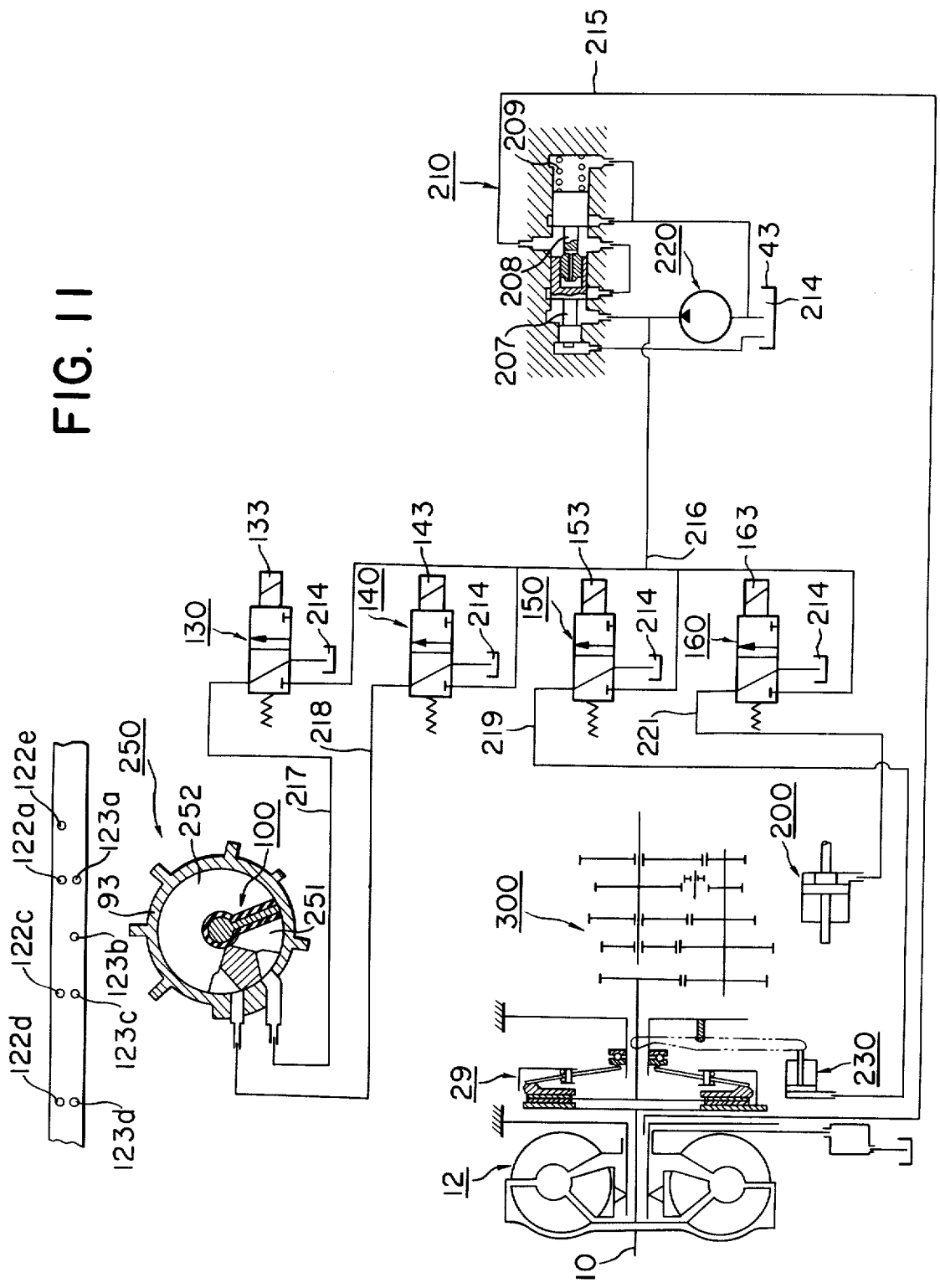

SYSTEM FOR CONTROLLING AUTOMATIC TRANSMISSION OF VEHICLE

BACKGROUND OF THE INVENTION

This invention relates generally to automotive power transmissions, and in particular to a novel and advanced control system for automatic transmissions of motor vehicles including trucks, buses and so forth in addition to passenger cars.

Various improvements have been made in automotive transmissions with a view to simpler driving techniques and the most economical use of the output torque of the prime mover of the vehicle. Nevertheless, considerably more refinements are desirable in most of the currently available transmissions for truly satisfactory vehicle performance.

For example, vehicles equipped with some multiple-speed transmissions, especially those having the so-called "emergency low" gear for trucks, can be started in other than the lowest or first gear when loaded with little or no cargo or passengers. In order to achieve this end automatically, which has not been possible heretofore, it is necessary to provide a system wherein the total payload of the vehicle is first detected, and the vehicle can be started in the lowest or first gear when its payload reaches a predetermined limit and in a higher gear when the payload falls short of the limit.

Also, in trucks and similar vehicles which must carry a widely varying range of payload, insufficiency in output torque or poor acceleration have often resulted when their transmissions are shifted automatically from one speed or torque ratio to another in relation only with vehicle speed, throttle opening, and so forth, while the vehicles are heavily loaded or are ascending steep hills.

Further, in the case of an automatic transmission provided with a clutch for disconnecting the input shaft and output shaft of the transmission during each gearshift operation, hunting between upshift and downshift has often occurred on hills, particularly when the vehicle is heavily loaded.

SUMMARY OF THE INVENTION

It is an object of the present invention to provide a novel and improved system for controlling an automatic transmission of a vehicle whereby an optimum speed and torque ratio is provided according to the speed of the vehicle.

Another object of the invention is to provide an automatic transmission control system designed to effect smooth gearshifts under the control of electric signals in response to the position of a manual shift lever or to the vehicle speed.

A further object of the invention is to provide an automatic transmission control system designed especially for trucks, buses, and similar automotive vehicles, whereby the vehicles can be automatically started from a standing position in the lowest or first gear when their payload reaches a predetermined limit and in a higher gear when the payload falls short of this limit.

A further object of the invention is to provide an automatic transmission control system whereby vehicle speeds at which shifts occur are automatically modified according to the electrically detected payload of the vehicle.

A further object of the invention is to provide an automatic transmission control system which automatically delays upshifts to higher vehicle speed when the electrically detected inclination of the road reaches a predetermined limit.

A further object of the invention is to provide an automatic transmission control system which automatically enlarges a hysteresis condition between upshift and downshift when the vehicle is ascending steep hills in order to prevent hunting of the transmission.

A further object of the invention is to provide an automatic transmission control system which requires a single servo means for upshifts and downshifts and another servo means for a reverse shift.

A further object of the invention is to provide an automatic transmission control system wherein a plurality of fork shafts are selectively moved to one of their operative positions by cam means to complete a desired one of a plurality of gear trains through the transmission, an electric signal being produced by the motion of each fork shaft thereby to positively retain the same in its operative position.

With these objects in view, the present invention provides, in a transmission comprising an input shaft, an output shaft, and a plurality of selectively employable gear trains positioned between the input shaft and the output shaft to transmit power through the transmission at different speed ratios, a system for controlling the transmission comprising gearshift means for completing a selected one of the gear trains, means for operating the gearshift means, vehicle speed detecting means for producing a signal according to the rotational speed of the output shaft, and gearshift control means for automatically controlling the operation of the gearshift means in response to the signal in order to transmit power through the transmission at an optimum speed ratio selected according to the rotational speed of the output shaft.

The novel features which are considered as being characteristic of this invention are set forth in the appended claims. The invention itself, however, together with additional objects and advantages thereof, will be best understood from the following detailed description when taken in conjunction with the accompanying drawings.

BRIEF DESCRIPTION OF DRAWINGS

In the drawings:

FIGS. 7, 8 and 9 are vertical sectional views, partly in side elevation, showing the shift forks and related parts in greater detail;

FIG. 10 is a horizontal sectional view taken along the plane of line X — X in FIG. 2;

FIG. 11 is a schematic diagram of a hydraulic circuit for the control of the automatic transmission of FIGS. 1 and 2;

DETAILED DESCRIPTION

Figure 1:
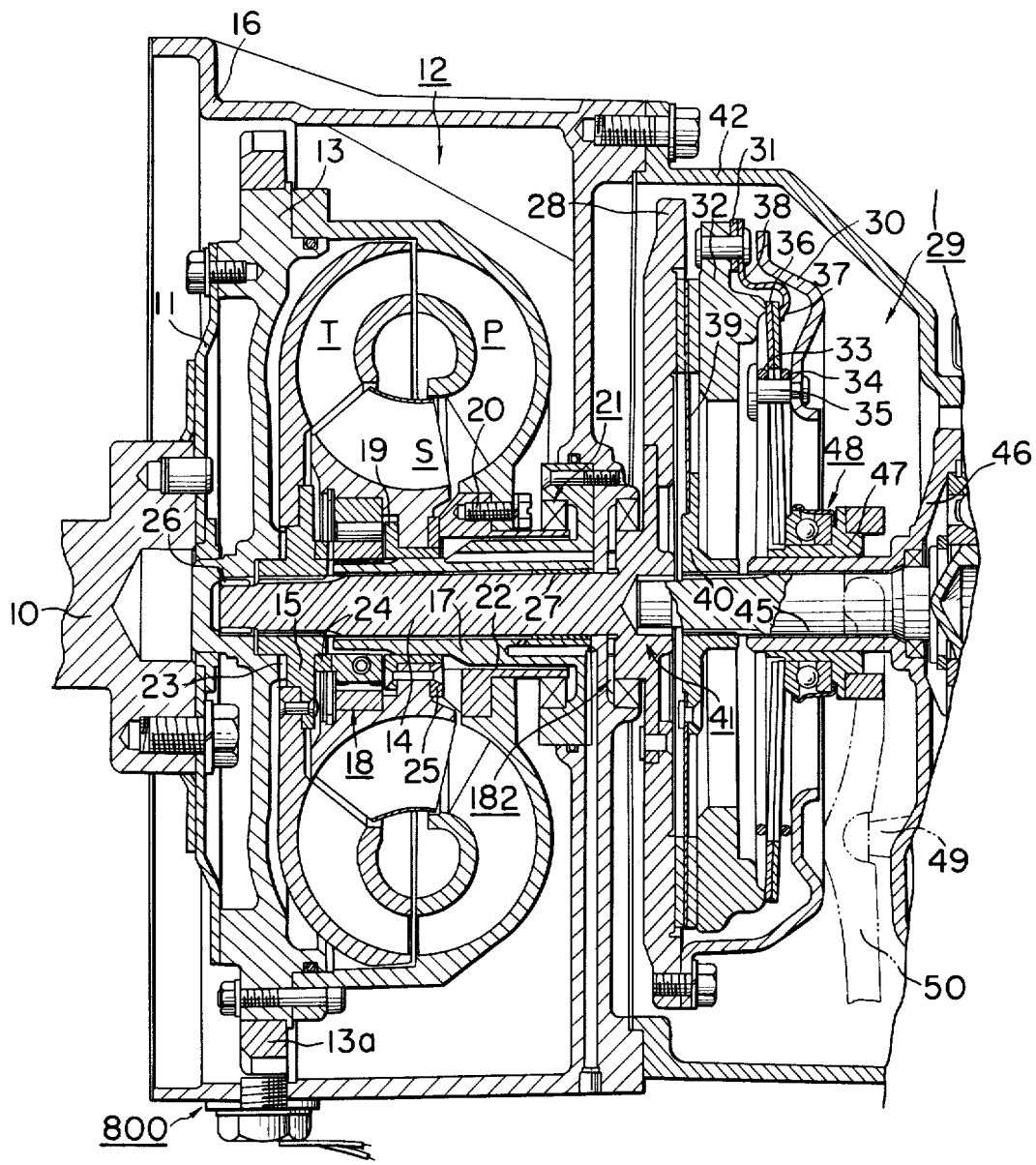
FIGS. 1 and 2 show, in combination, an axial section of an example of automatic transmission controlled by the system of the present invention.

Referring first to FIG. 1, an output shaft 10 of the prime mover of the vehicle such as an internal combustion engine, not shown, drives a torque converter 12 via a driving plate 11 which is bolted to the output shaft and torque converter as shown in the drawing. The torque converter illustrated in FIG. 1 is of the ordinary "three-element, one-stage, two-phase" type, although other types of torque converters are employable as well. The exemplified torque converter 12 comprises a front disk 13, a pump impeller P bolted to the front disk, a turbine runner T riveted to a turbine hub 15 splined to and mounted on an output shaft 14 of the torque converter, and a stator wheel S which is permitted to rotate only in the rotational direction of the output shaft 10 by a one-way clutch 18 splined to a stator shaft 17 bolted to a torque converter housing 16, and which is rotatably mounted on the stator shaft 17 via a bushing 19.

An extension sleeve 20 is fluid-tightly bolted to the pump impeller P, and coacts with an oil seal 21 fitted into the flange of the stator shaft 17 to seal the interior of the torque converter 12. A bushing 22 securely fitted into the extension sleeve 22 is mounted on the stator shaft 17 to support the torque converter 12. The possible axial play of the turbine runner T is prevented by a thrust washer 23 positioned between the front disk 13 and the turbine hub 15, by a thrust washer 24 positioned between the turbine hub 15 and the one-way clutch 18, and by a thrust washer 25 fixed in position by the same rivets as those used for securing the bushing 19 to the stator wheel S.

The output shaft 14 of the torque converter 12 is rotatably supported by a bearing 26 fitted into the front disk 13 and by a bushing 27 driven into the hollowed interior of the stator shaft 17. A thrust bearing 182 is provided between the flange of the stator shaft 17 and the torque converter housing 16. A sensor 800 for detecting the rotational speed of the front disk 13, and therefore that of the output shaft 10, is provided adjacent the teeth of a ring gear 13a fixedly mounted on the periphery of the front disk 13.

The torque converter output shaft 14 extends through the stator shaft 17 and the rear end of the torque converter housing 16, and is flanged on its projecting rear end. A flywheel 28 is riveted to this flange. Clutch means 29 of the known dry, single-plate type comprises the following components: a cover plate 30 bolted to the flywheel 28; a pressure plate 32 coupled to the cover plate 30 with three circumferentially spaced-apart straps 31; two diaphragm springs 36 and 37 supported by the cover plate 30 with pivot rings 33 and 34 and rivet 35 in order to urge the pressure plate 32 toward the flywheel 28; a retracting spring 38 urging the outer ends of these diaphragm springs into abutment with the pressure plate 32; a clutch disk 39 sandwiched between the flywheel 28 and the pressure plate 32; a transmission input shaft 45 splined to a clutch hub 40 fitted into the central aperture of the clutch disk 39 and supported by a bearing 41 fitted into the rear end of the torque converter output shaft 14 and by another bearing 44 within a transmission casing 43 provided on the back of a clutch housing 42 which is secured to the torque converter housing 16 (see also FIG. 2); a sleeve 47 axially slidably mounted on the hollowed cylindrical portion of a front cover 46 which is secured to the transmission casing 43 and through which extends the transmission input shaft 45; and a thrust bearing 48 fixedly mounted on the sleeve 47 in contact with the inner end of the diaphragm spring 37. As illustrated by the dot-and-dash lines in FIG. 1, a pin 49 is planted in the transmission casing 43 to pivotally support a lever 50 one end of which abuts on the flange of the sleeve 47 and the other end of which is associated with a clutch release servo cylinder 230 described later in relation with FIG. 11.

Figure 2:
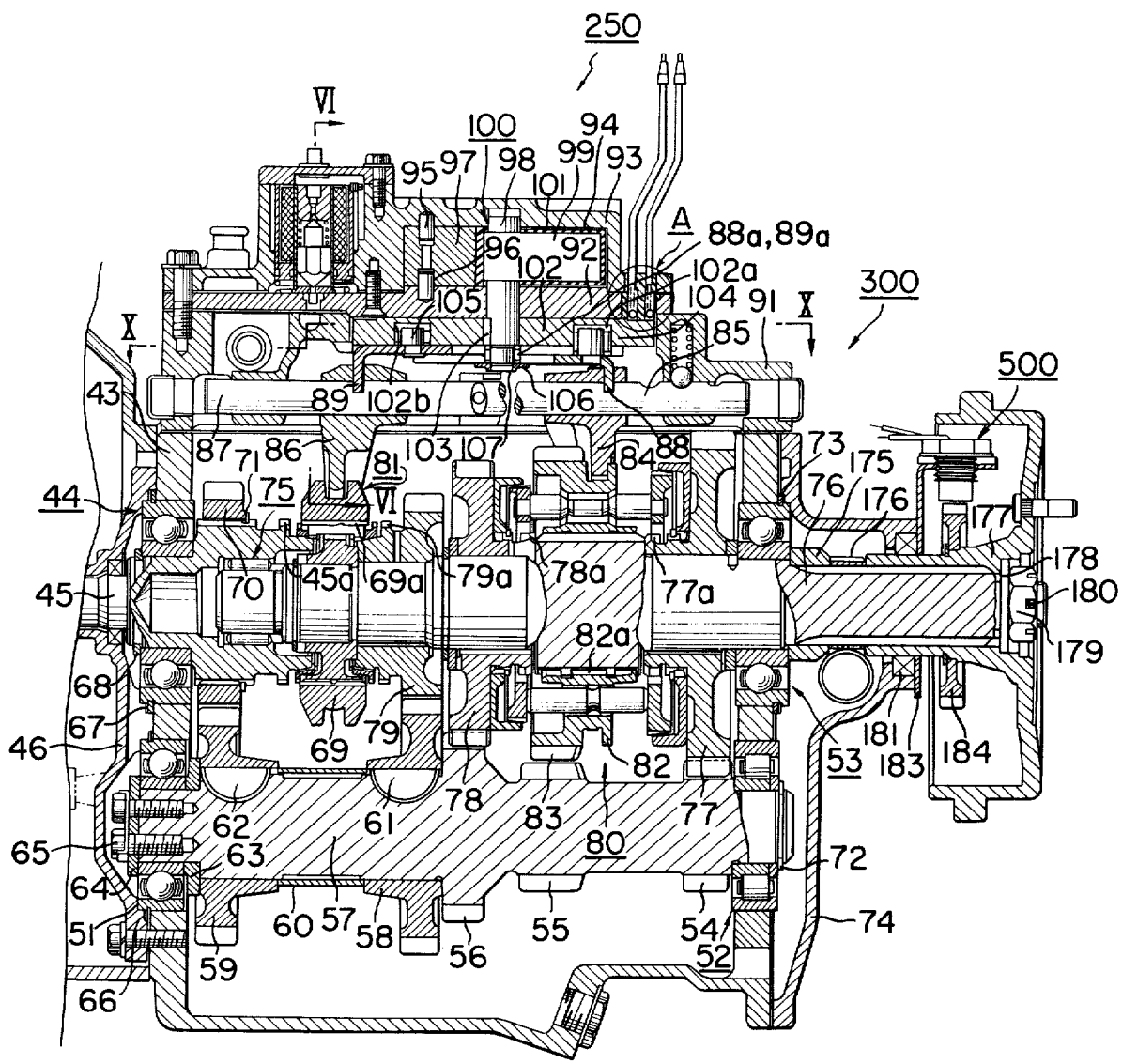

Referring now to FIG. 2 in order to describe the construction of a transmission 300, a bearing 51 is mounted below the bearing 44 within the transmission casing 43. Another bearing 52 is mounted concentric with the bearing 51, while still another bearing 53 is mounted concentric with the bearing 44. Rotatably supported by these bearings 51 and 52 is a countershaft 57 on which are formed a "low" counter gear 54, a "reverse" counter gear 55, and a "second" counter gear 56. Further on this countershaft 57, an "overdrive" counter gear 58 and a "drive" counter gear 59 are keyed at 61 and 62, respectively, a spacer 60 being interposed to provide a predetermined spacing therebetween. Another spacer 63 is interposed between the "drive" counter gear 59 and the bearing 51. Bolts 65 are screwed into the front end of the countershaft 57 via a washer 64. A snap ring 66 is received in a groove formed on the periphery of the bearing 51 to prevent the detachment of this bearing 51 and hence of the countershaft 57. The inner race of the bearing 52 is secured to the countershaft 57 with a snap ring 72.

The outer race of the aforesaid bearing 44 is secured to the transmission casing 43 with a snap ring 67 and the front cover 46. The inner race of this bearing is secured to the transmission input shaft 45 with a large diameter portion of the input shaft 45 and a snap ring 68. An input gear 70 is splined to the large diameter portion of the input shaft 45 and is retained in position by a snap ring 71. The input gear 70 is meshed with the "drive" counter gear 59. The bearing 53 is secured to the transmission casing 43 with a snap ring 73 and a rear cover 74.

A transmission output shaft 76 is rotatably supported by the bearing 53 and a roller bearing 75 accommodated in a hollow space on the back of the transmission input shaft 45. On this transmission output shaft 76 there are independently rotatably mounted a "low" gear 77, a "second" gear 78, and an "overdrive" gear 79 so as to be in mesh with the aforesaid "low" counter gear 54, "second" counter gear 56, and "overdrive" counter gear 58, respectively. Between the "low" gear 77 and the "second" gear 78 there is provided a pin-type synchronous engaging means 80 (hereinafter referred to simply as the "pin-type synchro means"). Further between the "overdrive" gear 79 and the rear end of the transmission input shaft 45 there is provided the so-called "Warner-type" synchronous engaging means 81 (hereinafter referred to as the "Warner-type synchro means").

A "reverse" gear 83 is formed on the periphery of a sleeve 82 of the pin-type synchro means 80, and splines 82a formed on the inner surface of the sleeve 82 are slidably engaged with the splines formed on the transmission output shaft 76. The splines 82a are so formed as to engage splines 77a on the small diameter portion of the "low" gear 77 when the sleeve 82 is moved backwardly, and to engage splines 78a on the small diameter portion of the "second" gear 78 when the sleeve 82 is moved forwardly. The "reverse" gear 83 is opposed to the "reverse" counter gear 55 when the sleeve 82 is in its neutral position. When a "reverse" idler gear, not shown, is shifted to its "reverse" position, the "reverse" gear 83 and the "reverse" counter gear 55 are engaged so that power is transmitted from the latter to the former. The inner splines 69a on a sleeve 69 of the Warner-type synchro means 81 are so formed as to engage splines 79a on the small diameter portion of the "overdrive" gear 79 when the sleeve 69 is moved backwardly, and to engage splines 45a on the transmission input shaft 45 when the sleeve 69 is moved forwardly.

A "low" and "second" shift fork 84 is fixedly mounted on a "low" and "second" shift fork shaft 85 with a low-speed fork plate 88. A "third" and "overdrive" shift fork 86 is fixedly mounted on a "third" and "overdrive" shift fork shaft 87 with a high-speed fork shift plate 89. The "low" and "second" shift fork shaft 85, the "third" and "overdrive" shift fork shaft 87, and a "reverse" shift fork shaft 90 (shown in FIG. 6) extend parallel to each other, with predetermined spacings therebetween, and are axially mounted in a cover 91 bolted to the transmission casing 43.

Between these shift fork shafts 85, 87 and 90 and the cover 91, there are provided suitable detent means for speed change purposes, as described later in greater detail.

In order to operate the aforesaid "low" and "second" shift fork shaft 85 and "third" and "overdrive" shift fork shaft 87, there are provided hydraulic servo means 250 explained hereinbelow. A cover plate 92 and a servo body 93 are mounted on the transmission casing cover 91 by use of the same bolts. A cylindrical servo chamber 94 is formed between these cover plate 92 and servo body 93. Within this servo chamber 92, a substantially sectorial partition 97 is pinned at 95 and 96 to the cover plate 92 and servo body 93. This partition 97 coacts with a servo rotor 100 to divide the servo chamber 94 into two pressure chambers. The servo rotor 100 comprises a shaft 98 extending through the center of the servo chamber 94 and projecting downwardly through the cover plate 92, and a vane member 99 formed substantially integral with the shaft 98 and covered with a rubber-made seal member 101. A cam plate 102 is keyed at 103 to the downwardly projecting portion of the shaft 98 for simultaneous rotation therewith. Cam grooves 102a and 102b are formed on the lower surface of the cam plate 102 to receive pins 104 and 105 supported by the low-speed fork plate 88 and the high speed fork plate 89, respectively. Below the cam plate 102, the fork plates 88 and 89 are engaged with each other through slots 88a and 89a. The downward motion of these fork plates 88 and 89 is prevented by means of a support plate 106 and a snap ring 107.

Figure 3:
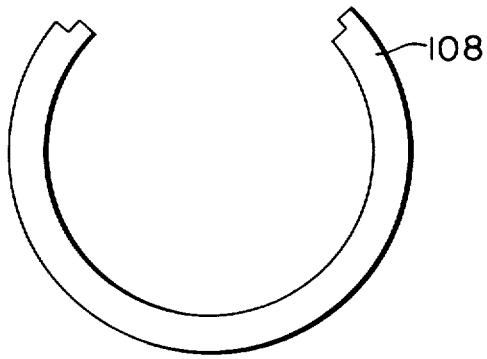
FIG. 3 is a plan view explanatory of the shape of an insulator provided along the periphery of a cam plate shown in FIG. 2.

An insulator 108 of the shape shown in FIG. 3 is provided along the periphery of the upper surface of the cam plate 102. The upper surface of this insulator 108 is of the same height as the upper surface of the cam plate 102.

Figure 4:
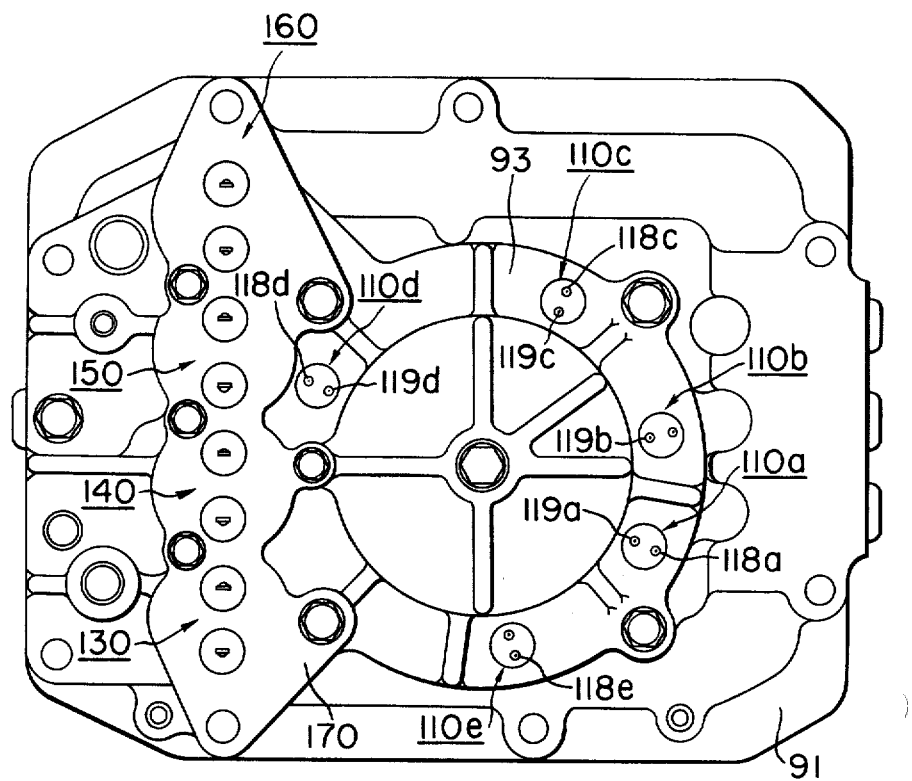
FIG. 4 is a plan view of a transmission casing cover.

As best illustrated in FIG. 4, the cover plate 92 and the servo body 93 are provided with five electrical switch assemblies 110a through 110e which are so circularly arranged around the center of the shaft 98 as to contact the insulator 108 buried in the cam plate 102. Switches 111a through 111e for upshifts are provided radially outside of the switch assemblies 110a through 110e, while switches 112a through 112d for downshifts are provided radially inside.

Figure 5:
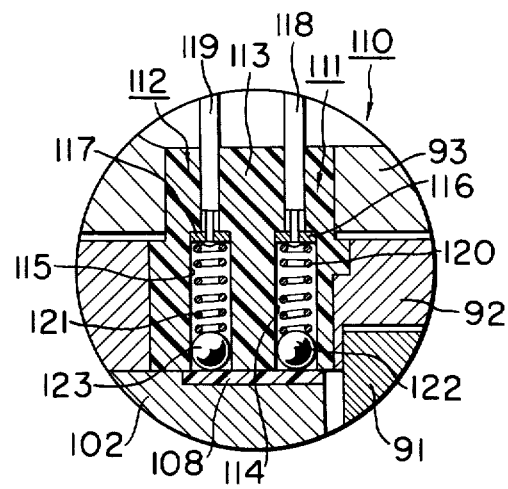
FIG. 5 is a vertical sectional view of one of electrical switch assemblies for shift detection.

The switch assembly 110 is illustrated in greater detail in FIG. 5. A pair of stepped bores 114 and 115 are formed through an insulator 113. Conductors 118 and 119 having plate members 116 and 117 of approximately the same diameter as the large diameter portions of the stepped bores 114 and 115 are inserted into these bores, the plate members 116 and 117 being soldered or otherwise attached on the ends of the conductors. Spring members 120 and 121 of electrically conducting material are accommodated in the large diameter portions of the bores 114 and 115, and are urged toward the plate members 116 and 117 by balls 122 and 123 of electrically conducting material which are kept in contact with the insulator 108 or with the exposed upper surface of the cam plate 102 as this cam plate rotates. Hence the conductors 118 and 119 are insulated when the balls 122 and 123 are contacted with the insulator 108, and are grounded when the balls are contacted with the cam plate 102.

Figure 6:
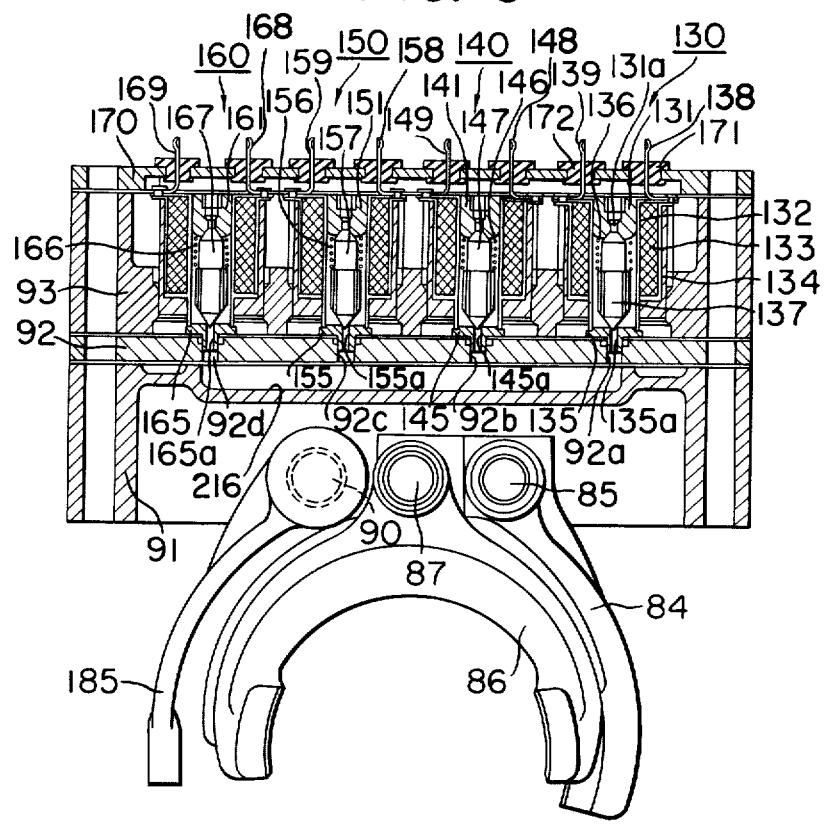
FIG. 6 is a vertical sectional view taken along the plane of line XI — XI in FIG. 2, the view being explanatory of the relative locations of shift forks and the arrangement of solenoid valves.

With reference to FIG. 6, the servo body 93 is provided with an upshift solenoid valve 130, a downshift solenoid valve 140, a clutch disengaging solenoid valve 150, and a "reverse" shift solenoid valve 160. The construction of the upshift solenoid valve 130 only is described hereinbelow as all of the other solenoid valves are constructed similarly. The upshift solenoid valve comprises an inner iron core 131, a bobbin 132 positioned outside of this inner iron core, a coil 133 wound on this bobbin, an outer iron core 134 positioned outside of this coil, a valve seat 135 fluid-tightly attached to the bottom of the bobbin 132, and a valve body 137 positioned between the inner iron core 131 and the valve seat 135 and urged by a spring 136 to close a supply port 135a formed through the center of the valve 135. A discharge port 131a is formed through the center of the inner iron core 131. Terminals 138 and 139 of the coil 133 project upwardly through rubber-made caps 171 and 172 received in the openings of a cover 170 of the servo body 93. The cover plate 92 is formed with port 92a through 92d therethrough which are communicated, on the one hand, with the supply ports 135a, 145a, 155a, 165a and, on the other hand, with a line pressure passage 173 formed between the transmission casing cover 91 and the cover plate 92.

Referring back to FIG. 2, a spacer 175, a speedometer drive gear 176, and a joint yoke 177 are mounted on the rear end of the transmission output shaft 76 and are retained in position by a washer 178 and a nut 179. Only the speedometer drive gear 176 is splined to the transmission output shaft. A cotter pin 180 may be provided to prevent the nut 179 from loosening. A seal member 181 is provided between the rear cover 74 and the joint yoke 177. Adjacently, there is provided a mount 183 for a sensor 500 hereinafter described in greater detail. A gear 184 is driven onto the joint yoke 177 for operation of the sensor 500.

The aforesaid three fork shafts are arranged in the order of the "low" and "second" shift fork shaft 85, the "third" and "overdrive" shift fork shaft 87, and the "reverse" shift fork shaft 90 as seen from the right in FIG. 6. As shown in FIG. 2 and in greater detail in FIGS. 7, 8 and 9, three bores 91a, 91b and 91c are formed in the transmission casing cover 91 above the fork shafts 85, 87 and 90. Received in these bores are springs 186, 188 and 190, and balls 187, 189 and 191, respectively, the balls being resiliently urged toward the respective fork shafts.

Figure 7:
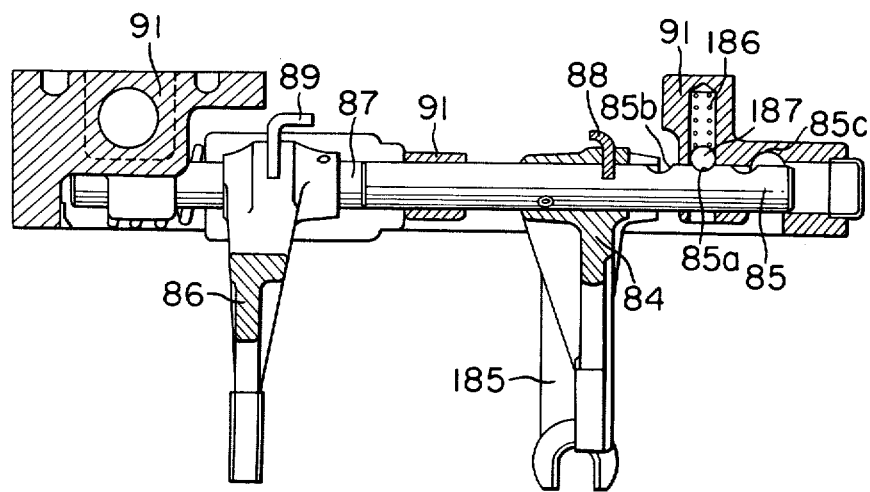
Figure 12A:
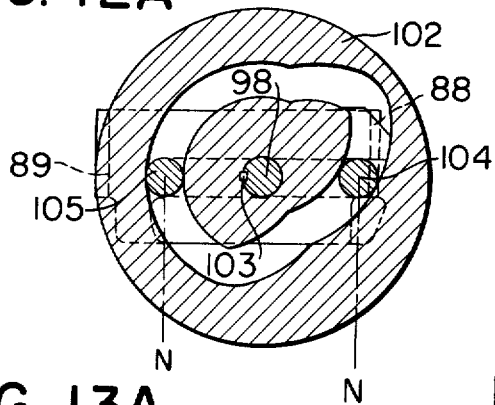
FIGS. 12, 13, 14, 15 and 16 are schematic plan views explanatory of the relative locations of the cam plate, fork plates, and switch assemblies in various operative positions to cause shifts in speed and torque ratios of the automatic transmission.
Figure 12B:
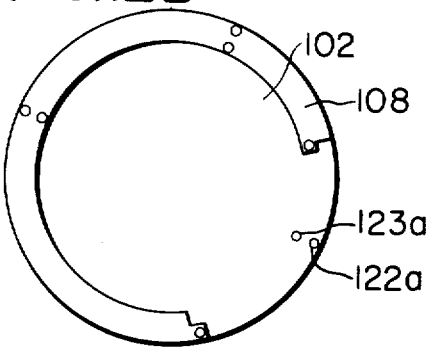

With reference to FIG. 7, three recesses 85a, 85b and 85c are formed on the "low" and "second" shift fork shaft 85 to provide the aforesaid detent means for this shaft. The recess 85a receives the ball 187 when the fork shaft 85 is neutral. The recess 85b receives the ball when the fork shaft is in its "low" position. The recess 85c receives the ball when the fork shaft is in its "second" position.

Similarly, as shown in FIG. 8, three recesses 87a, 87b and 87c are formed on the "third" and "overdrive" shift fork shaft 87 to receive the ball 189 when this fork shaft is in its neutral, "third" and "overdrive" positions, respectively.

Further as shown in FIG. 9, two recesses 90a and 90b are formed on the "reverse" shift fork shaft 90 to receive the ball 191 when this fork shaft is in its neutral and "reverse" positions, respectively.

In a suitable position on this "reverse" shift fork shaft 90, a "reverse" shift fork 185 is fixedly mounted with a spring pin 192. On the left hand side of the "reverse" shift fork shaft 90 as seen in FIG. 9, a servomotor 200 is provided for shifting this fork shaft to the "reverse" position. The servomotor 200 is comprised of a cylinder 194 fluid-tightly coupled to the fork shaft 90 with an O-ring 193, a piston 196 fluid-tightly received in this cylinder with an O-ring 195 and fixedly mounted on the end of the fork shaft with a spring pin 197, and a spring 198 resiliently urging this piston in the right hand direction as viewed in FIG. 9. A plug 201 is fluid-tightly fitted in the transmission casing cover 91 with an O-ring 202. A port 201a formed in this plug is communicated with a fluid chamber 194a on the right hand side of the piston 196, as seen in the drawing, via a conduit 199. Hence, upon application of fluid pressure to this chamber 194a, the "reverse" shift fork shaft 90 and therefore the "reverse" shift fork 185 are shifted to the "reverse" position. The shift fork is moved back to its neutral position as the fluid pressure is discharged from the chamber 194a.

Reference will now be made to FIG. 10 in order to describe the construction of a regulator valve 210 adapted for regulation of line pressure and torque converter pressure supplied to the above described servo means 200, 230 and 250 and to the torque converter 12, respectively. A sleeve 206 having a stepped bore therethrough is snugly received in an aperture 205 formed in the transmission casing cover 91. A first valve stem 207 and a second valve stem 208 are fluid-tightly but slidably received in the stepped bore of the sleeve 206. The first valve stem 207 includes a small diameter spool 207a, a large diameter spool 207b, and a bore 207c formed in the large diameter spool 207b. Resiliently urged by a spring 209, one of the ends of the second valve stem 208 is received in the bore 207c of the first valve stem 207. The second valve stem includes a small diameter spool 208a, a large diameter spool 208b, a bore 208c extending radially through the mid-part thereof, and another bore 208d communicating the radial bore 208c and the lower end of the valve stem. A plug 211 is tightly fitted in the open end of the aperture 205. An O-ring 212 on this plug fluid-tightly seals the aperture, and a snap ring 213 prevents the detachment of the plug and hence that of the first valve stem 207 and so forth.

FIG. 11 schematically illustrates an example of hydraulic circuit used in the present invention. A pump 220 driven by the prime mover of the vehicle supplies a fluid from a sump 214, which may be formed by part of the transmission casing 43, to the regulator valve 210. A suitably low torque converter pressure from this regulator valve is supplied through a passageway 215 to the supply port of the torque converter 12, while the line pressure from the regulator valve is supplied through a passageway 216 to the solenoid valves 130, 140, 150 and 160. It must be noted that this passageway is normally closed by these solenoid valves.

The solenoid valve 130 communicates the passageway 216 with a passageway 217 leading to an upshift fluid chamber 251 of the servo means 250 when an electric current flows to its solenoid 133. The solenoid valve 140 communicates the passageway 216 with a passageway 218 leading to a downshift fluid chamber 252 of the servo means 250 when an electric current flows to its solenoid 143. The solenoid valve 150 communicates the passageway 216 with a passageway 219 leading to the fluid chamber of the clutch release servo cylinder 230 when an electric current flows to its solenoid 153. The solenoid valve 160 communicates the passageway 216 with a passageway 221 leading to the fluid chamber of the servomotor 200 of the "reverse" shift fork shaft 90 when an electric current flows through its solenoid 163.

FIGS. 12A through 16A illustrate relationships between the cam of the cam plate 102 and the two fork plates 88 and 89 in the various shift positions. FIGS. 12B through 16B illustrate corresponding relationships between the insulator 108 of the cam plate 102 and the balls 122a through 122e and 123a through 123d of the seitch assemblies 110. The servo rotor 100 of the servo means 250 is shown in its neutral position in FIG. 11, in which condition the cam plate 102 keyed to the shaft 98 of the servo rotor simultaneous rotation therewith is in the position shown in FIGS. 12A and 12B. Both the low speed fork plate 88 (or the pin 104) and the high speed fork plate 89 (or the pin 105) are now in their neutral position, so that no power is conveyed through the transmission 300. Further, when the cam plate 102 is in the position of FIG. 12B, only the balls 122a and 123a of the first switch assembly 110a are grounded, while the other balls 122c, 122d, 122e, 123b, 123c and 123d are insulated by the insulator 108.

Figure 13A:
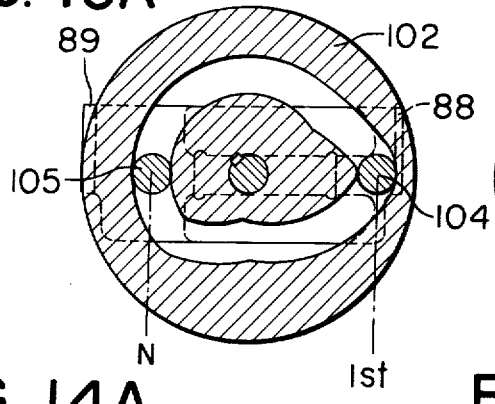
Figure 13B:
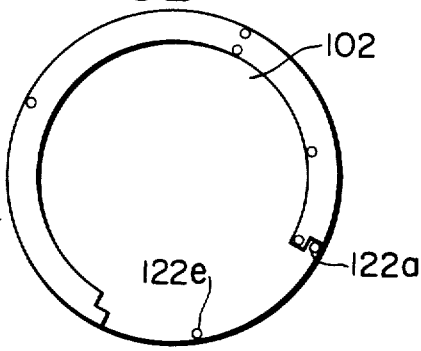

When the servo rotor 100 is revolved clockwise through an angle of about 35° to bring the cam plate 102 to the position shown in FIGS. 13A and 13B, the pin 104 and hence the low speed fork plate 88 are moved to the extreme right while the pin 105 and hence the high speed fork plate 89 are left in the neutral position. The ball 122a of the first switch assembly 110a and the ball 122e of the fifth switch assembly 110e are now grounded. Thus the transmission 300 provides the first speed.

Figure 14A:
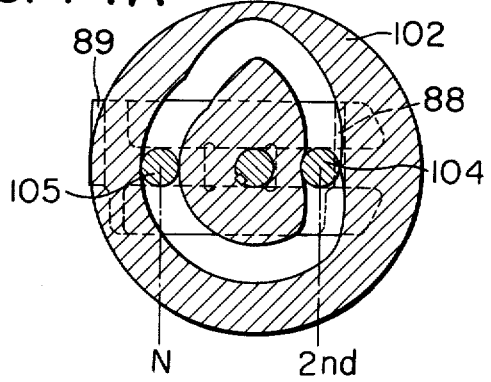
Figure 14B:
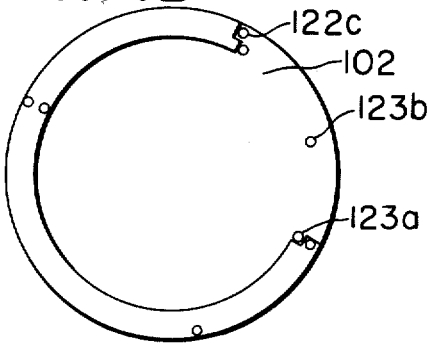

As the servo rotor 100 is revolved counterclockwise through an angle of about 90 degrees from its position of FIGS. 13A and 13B, the cam plate 102 attains the position shown in FIGS. 14A and 14B, so that the pin 104 and hence the low speed fork plate 88 is now moved leftward while the pin 105 and hence the high speed fork plate 89 are left in the neutral position. The ball 123a of the first switch assembly 110a, the ball 123b of the second switch assembly 110b, and the ball 122c of the third switch assembly 110c are grounded, and the transmission provides the second speed.

Figure 15A:
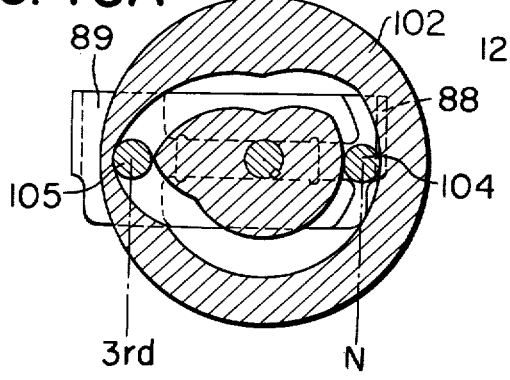
Figure 15B:
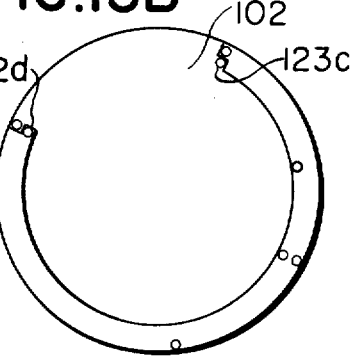
Figure 16:
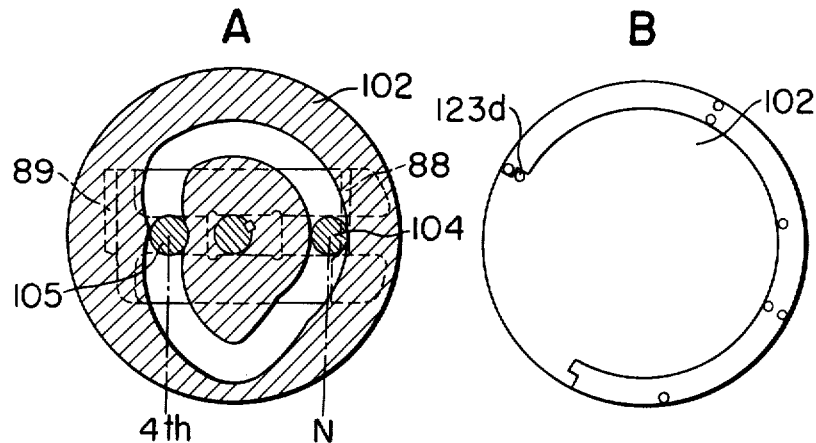

When the servo rotor 100 is revolved counterclockwise through another 90°, the cam plate 102 reaches the position shown in FIGS. 15A and 15B, where the pin 104 and hence the low speed fork plate 88 return to the neutral position while the pin 105 and hence the high speed fork plate 89 are moved to the extreme left. The ball 123c of the third switch assembly 110c and the ball 122d of the fourth switch assembly 110d are now grounded. The transmission provides the third speed.

When the servo rotor 100 is revolved counterclockwise through an additional 90°, the cam plate 102 reaches the position shown in FIGS. 16A and 16B, where the pin 105 and hence the high speed fork plate 89 are moved to the "overdrive" position shown in FIG. 16B while the pin 104 and hence the low speed fork plate 88 are left in the neutral position. Only the ball 123d of the fourth switch assembly 110d is now grounded. The transmission thus provides the fourth speed.

Figure 17:
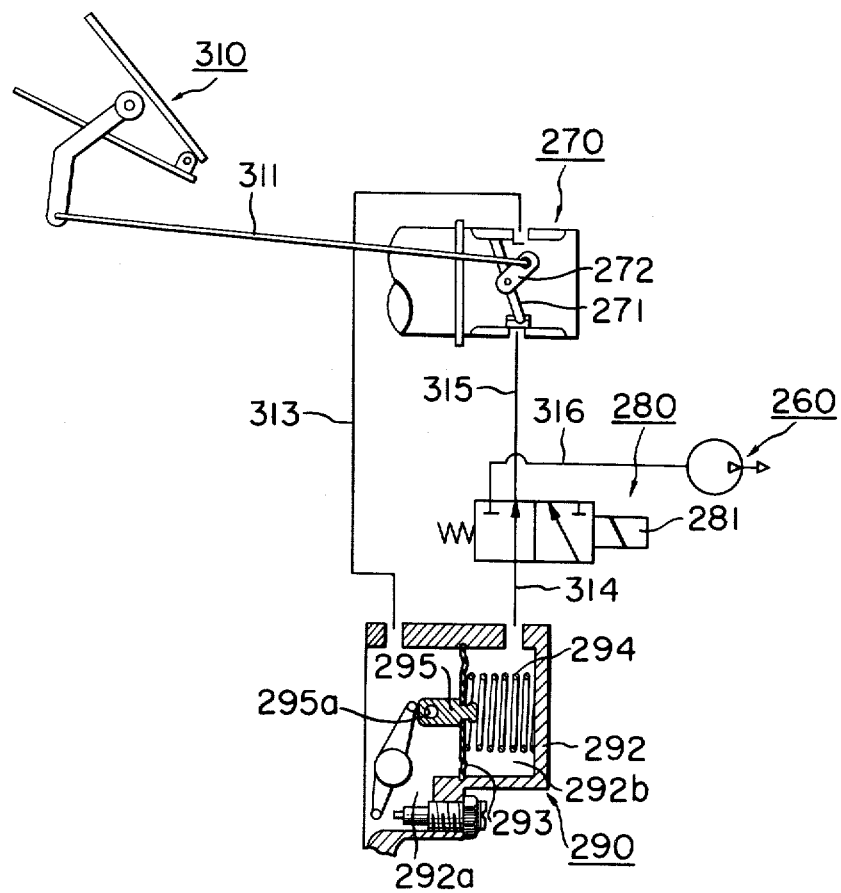
FIG. 17 is a schematic circuit diagram of fuel injection control means.

Described hereinbelow are the means for the control of fuel injection into the prime mover of the vehicle. With reference to FIG. 17, an accelerator pedal 310 is connected to a throttle valve adjusting lever 272 through a link 311 in order to operate a throttle valve 271 of a venturi 270 through which air is admitted into the prime mover such as an internal combustion engine. The fuel injection control means 290 may be mounted on the back of a fuel injection pump (not shown). The interior of an enclosure 292 of this fuel injection control means is partitioned into two operative chambers 292a and 292b by a diaphragm 293. The front chamber 292a is communicated to the atmosphere side of the venturi 270 via a conduit 313, while the rear chamber 292b is communicated to the manifold side of the venturi 270 via a conduit 314, a three-port, two position solenoid valve 280, and a conduit 315. The solenoid valve 280 normally keeps the conduits 314 and 315 in communication with each other, and communicates the conduit 314 with a conduit 316 leading to a vacuum pump 260 only when an electric current flows through its solenoid 281. The diaphragm 293 within the enclosure 292 is urged by a spring 294 toward the chamber 292a, that is, in the direction of maximum fuel injection. A connector 295 is fixedly attached at the center of the diaphragm 293, and is associated through its aperture 295a with a rack, not shown, adapted for the control of fuel injection.

Figure 18:
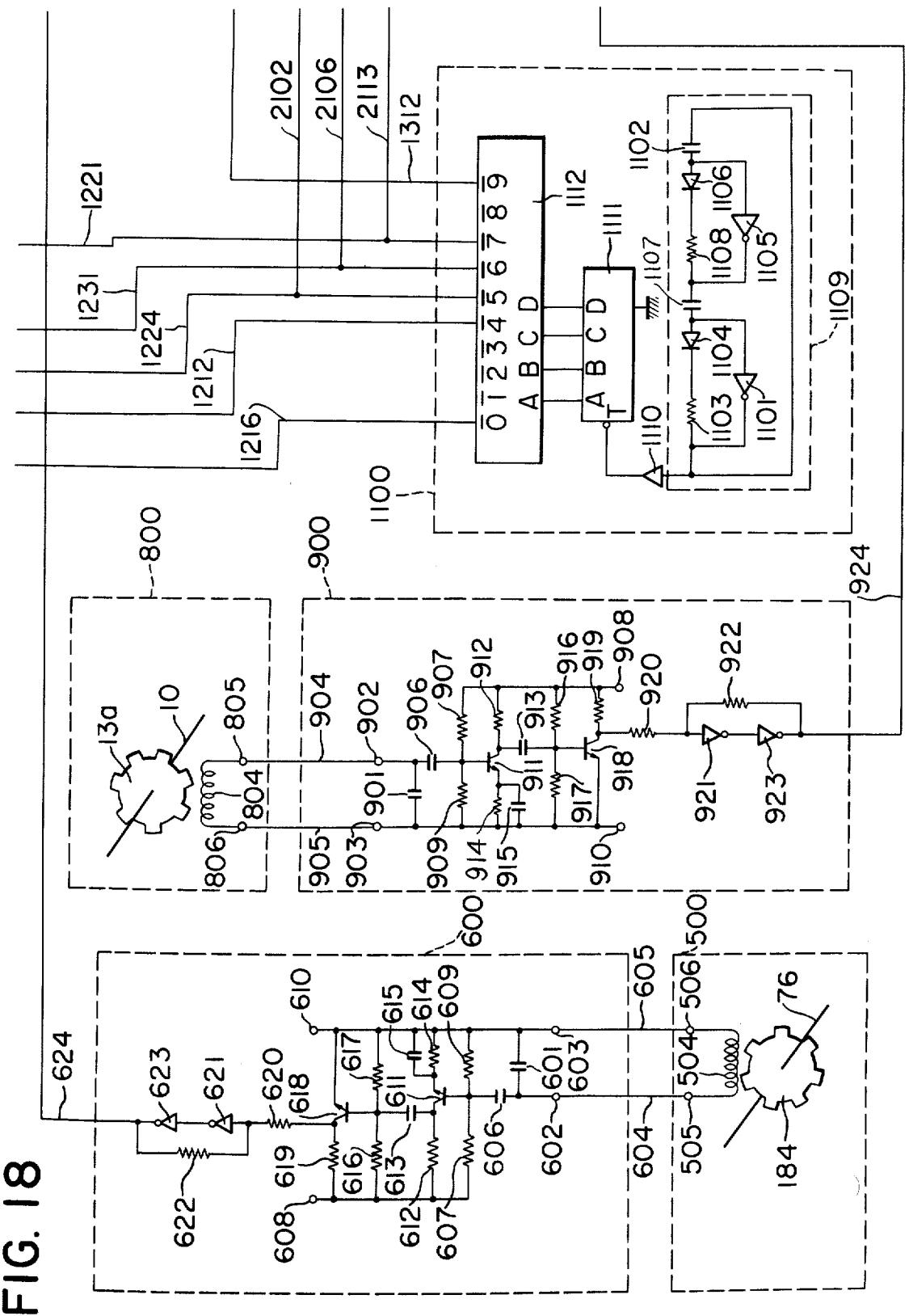
FIG. 18 is a diagram showing a vehicle speed detecting section, an engine speed detecting section, amplifying/shaping circuits provided respectively for these two sections, and a time base generating circuit.

Referring now to FIG. 18, a vehicle speed detecting section 500 includes the output shaft 76 of the transmission 300, the gear 184 fixedly mounted on the transmission output shaft, a coil 504 which generates AC voltage having a frequency proportional to the revolving speed of the gear 184, and a permanent magnet not shown in the drawing.

Terminals 505 and 506 of the coil 504 are connected through conductors 604 and 605 to the terminals 602 and 603 of a capacitor 601 provided in amplifying/shaping circuit 600. The terminal 602 is also connected to the input side of a capacitor 606, the output side of which is connected to a supply terminal 608 through a resistance 607, to a grounding terminal 610 through a resistance 609, and to a base terminal of a transistor 611. The collector terminal of this transistor is connected to the supply terminal 608 through a resistance 612 and to the input side of a capacitor 613, while the emitter terminal of the same transistor is connected to the grounding terminal 610 through resistance 614 and capacitor 615. The output side of the capacitor 613 is connected to the supply terminal 608 through a resistance 616, to the grounding terminal 610 through a resistance 617, and to the base terminal of a transistor 618. The collector terminal of this transistor 618 is connected to the supply terminal 608 through a resistance 619, to the input terminal of a NAND element 621 through a resistance 620, and to the output terminal of another NAND element 623 through resistances 620 and 622. The emitter terminal of the same transistor 618 is connected to the grounding terminal 610. The output terminal of the NAND element 621 is connected to the input terminal of the other NAND element 623, while the output terminal of this NAND element 623 is connected through a conductor 624 to one of the input terminals of a three-input NAND element 701 of a gate circuit 700 shown in FIG. 20.

In the amplifying/shaping circuit 600 of the above described construction, the AC voltage produced by the coil 504 of the vehicle speed detecting section 500, which has a frequency proportional to the rotational speed of the gear 184 and hence to the vehicle speed, is first amplified by the transistors 611 and 618, and is succeedingly shaped into pulses of appropriate form (hereinafter referred to as "wheel pulses") by the NAND elements 621 and 623. These wheel pulses are applied to one of the input terminals of the NAND element 701 of the gate circuit 700.

An engine speed detecting section 800 shown in FIG. 18 includes the engine crankshaft 10, the ring gear 13a mounted on the engine crankshaft, a coil 804 which generates AC voltage having a frequency proportionate to the revolving speed of the ring gear 13a, and a permanent magnet not shown in the drawing.

Terminals 805 and 806 of the coil 804 of the engine speed detecting section are connected through conductors 904 and 905 to the terminals 902 and 903 of a capacitor 901 provided in an amplifying/shaping circuit 900. The terminal 902 is also connected to the input side of a capacitor 906, the output side of which is connected to a supply terminal 908 through a resistance 907, to a grounding terminal 910 through a resistance 909, and to the base terminal of a transistor 911. The collector terminal of this transistor 911 is connected to the supply terminal 908 through a resistance 912 and to the input side of a capacitor 913, while the emitter terminal of the same transistor is connected to the grounding terminal 910 through a resistance 914 and capacitor 915. The output side of the capacitor 913 is connected to the supply terminal 908 through a resistance 916, to the grounding terminal 910 through a resistance 917, and to the base terminal of a transistor 918. The collector terminal of this transistor 918 is connected to the supply terminal 908 through a resistance 919, to the input terminal of a NAND element 921 through a resistance 920, and to the output terminal of another NAND element 923 through resistances 921 and 922. The emitter terminal of the same transistor 918 is connected to the grounding terminal 910. The output terminal of the NAND element 921 is connected to the input terminal of the other NAND element 923, while the output terminal of this NAND element 923 is connected through a conductor 924 to one of the input terminals of a three-input NAND element 1001 of a gate circuit 1000.

In the amplifying/shaping circuit 900 of the above described configuration, the AC voltage produced by the coil 804 of the engine speed detecting section 800, which has a frequency proportional to the rotational speed of the ring gear 13a and hence to the engine speed, is first amplified by the transistors 911 and 918, and is succeedingly shaped into pulses of appropriate form (hereinafter referred to as "engine pulses") by the NAND elements 921 and 923. These engine pulses are applied to one of the input terminals of the NAND element 1001 of the gate circuit 1000 for engine speed detection.

FIG. 18 also illustrates a time base generating circuit 1100. The output terminal of a NAND element 1101 is connected to the input side of a capacitor 1102 and to the output side of a diode 1104 through a resistance 1103. The output side of the capacitor 1102 is connected to the input terminal of a NAND element 1105 and to the input of a diode 1106. The output terminal of the NAND element 1105 is connected to the input side of a capacitor 1107 and to the output of the diode 1106 through a resistance 1108. The output side of the capacitor 1107 is connected to the input terminal of the NAND element 1101 and to the input side of the diode 1104. All these elements form an oscillator circuit generally indicated by the numeral 1109.

The output terminal of the NAND element 1101 of this oscillating circuit is connected to the input terminal of a waveform shaping NAND element 1110. The output terminal of this NAND element 1110 is connected to an input terminal T of a decimal counter 1111, while output terminals A, B, C and D of this decimal counter 1111 are connected to corresponding input terminals A, B, C and D of a binary/decimal decoder 1112.

The oscillator circuit 1109 in the time base generating circuit 1100 of the above described configuration operates as hereinbelow explained to produce control pulses of a predetermined frequency. If the output voltage of the NAND element 1101 suddenly rises from 0 to 5 volts, this high voltage is impressed to the input terminal of the NAND element 1105 through the capacitor 1102, so that the output voltage of this NAND element 1105 becomes zero. This zero output voltage affects the input terminal of the NAND element 1101 through the capacitor 1107 in such a manner that the output voltage of the NAND element 1101 is maintained at 5 volts. Since then the output voltage of the capacitor 1102 is discharged to the output side of the NAND element 1105 through the diode 1106 and resistance 1108, this output voltage decreases with the lapse of time.

As the output voltage of the capacitor 1102 becomes lower than about 1.5 volts, however, the output voltage of the NAND element 1105 suddenly rises from 0 to 5 volts. This high voltage is impressed on the input terminal of the NAND element 1101 through the capacitor 1107, so that the output voltage of this NAND element 1101 suddenly drops from 5 to 0 volt. This zero output voltage affects the input terminal of the NAND element 1105 through the capacitor 1102 in such a manner that the output voltage of this NAND element 1105 is maintained at 5 volts, while the output voltage of the NAND element 1101 is maintained at zero. In this instance, as in the precedingly described case, the output voltage of the capacitor 1107 is discharged to the output side of the NAND element 1101 through the diode 1104 and resistance 1103, so that this output voltage decreases with the lapse of time.

As the output voltage of the capacitor 1107 succeedingly becomes lower than about 1.5 volts, the output voltage of the NAND element 1101 suddenly rises from 0 to 5 volts. This high output voltage is impressed on the input terminal of the NAND element 1105 through the capacitor 1102, so that the output voltage of the NAND element 1105 drops from five to zero volt, while the output voltage of the NAND element 1101 is maintained at 5 volts. By the repetition of the above procedure, the oscillator circuit 1109 produces pulses of a predetermined frequency.

The pulses thus produced by the oscillator circuit are wave-form shaped at the NAND element 1110, and are succeedingly applied to the input terminal T of the decimal counter 1111, where every ten of the successively applied pulses is repetitively counted. Outputs from the output terminals A, B, C and D of this decimal counter are supplied to the corresponding input terminals A, B, C and D of the binary/decimal decoder 1112. Voltages produced from the output terminals 0, $\bar{1}$, $\bar{2}$, $\bar{3}$, $\bar{4}$, $\bar{5}$, $\bar{6}$, $\bar{7}$, $\bar{8}$ and $\bar{9}$ of the decoder 1112 vary according to the number of pulses counted by the counter 1111, as shown in Table 1 below. The letters H and L used in this table, as in all the other tables hereinafter presented, denote high and low voltages, respectively.

TABLE 1

| | | NUMBER OF PULSES RECEIVED BY COUNTER 1111 | | | | | | | | | |
|---|---|---|---|---|---|---|---|---|---|---|---|
| | | 0 | 1 | 2 | 3 | 4 | 5 | 6 | 7 | 8 | 9 |
| VOLTAGES AT OUTPUT TERMINALS OF DECODER 1112 | $\bar{0}$ | L | H | H | H | H | H | H | H | H | H |
| | $\bar{1}$ | H | L | H | H | H | H | H | H | H | H |
| | $\bar{2}$ | H | H | L | H | H | H | H | H | H | H |
| | $\bar{3}$ | H | H | H | L | H | H | H | H | H | H |
| | $\bar{4}$ | H | H | H | H | L | H | H | H | H | H |
| | $\bar{5}$ | H | H | H | H | H | L | H | H | H | H |
| | $\bar{6}$ | H | H | H | H | H | H | L | H | H | H |
| | $\bar{7}$ | H | H | H | H | H | H | H | L | H | H |
| | $\bar{8}$ | H | H | H | H | H | H | H | H | L | H |
| | $\bar{9}$ | H | H | H | H | H | H | H | H | H | L |

Figure 19:
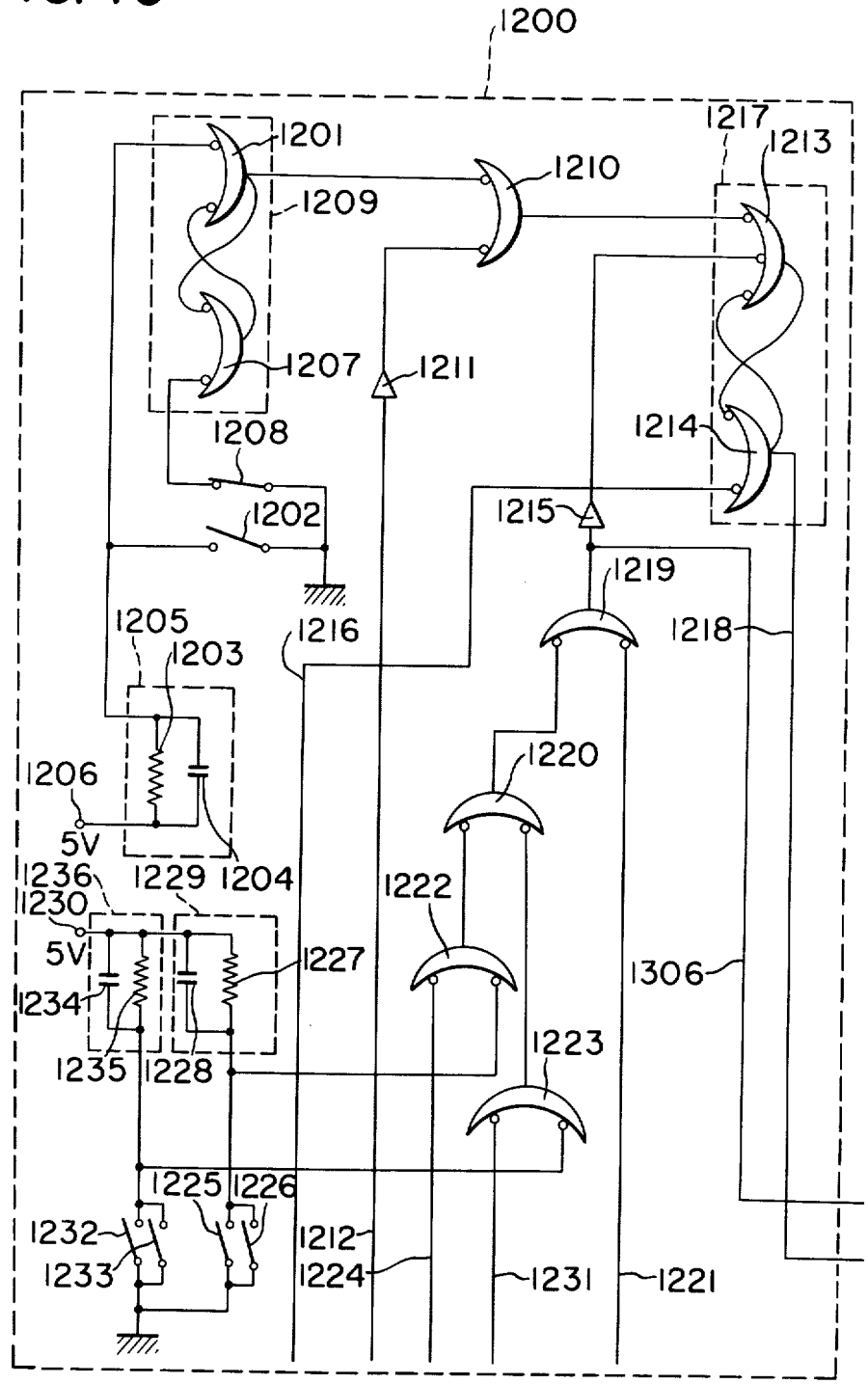
FIG. 19 is a diagram showing a vehicle speed gate control circuit.

FIG. 19 illustrates the configuration of a gate control circuit 1200 for vehicle speed. One of the input terminals of a two-input NAND element 1201 is grounded through a kickdown switch 1202 operated in intercoupled state with the accelerator pedal of the vehicle, and is also connected to a supply terminal 1206 through a chatter preventing circuit 1205 which includes a resistance 1203 and capacitor 1204. The other input terminal of the NAND element 1201 is connected to the output terminal of a two-input NAND element 1207. One of the input terminals of this NAND element 1207 is grounded through a kickdown switch 1208 operated in intercoupled state with the accelerator pedal, while the other input terminal thereof is connected to the output terminal of the NAND element 1201. These two NAND elements 1201 and 1207 constitute, in combination, a flip flop 1209.

The output terminal of this flip flop, or that of the NAND element 1201, is connected to one of the input terminals of a two-input NAND element 1210. The other input terminal of this NAND element 1210 is connected to the output terminal of a NAND element 1211. The input terminal of the NAND element 1211 is connected to the output terminal $\bar{4}$ of the decoder 1112 of the aforesaid time base generating circuit 1100 through a conductor 1212.

The output terminal of the NAND element 1210 is connected to one of the input terminals of a three-input NAND element 1213. The other two input terminals of this NAND element 1213 are connected to the output terminal of a two-input NAND element 1214 and to the output terminal of a NAND element 1215, respectively. One of the input terminals of the NAND element 1213, while the other input terminal is connected to the output terminal $\bar{0}$ of the decoder 1112 of the time base generating circuit 1100 through a conductor 1216. The NAND elements 1213 and 1214 constitute in combination a flip flop 1217. The output terminal of this flip flop is connected to one of the input terminals of the NAND element 701 of the gate circuit 700.

The input terminal of the NAND element 1215 is connected to the output terminal of a two-input NAND element 1219. One of the input terminals of this NAND element 1219 is connected to the output terminal of a two-input NAND element 1220, while the other input terminal is connected to the output terminal $\bar{7}$ of the decoder 1112 of the time base generating circuit 1100 through a conductor 1221. One of the input terminals of the NAND 1220 is connected to the output terminal of a two-input NAND element 1222, and the other input terminal to the output terminal of a two-input NAND element 1223. One of the input terminals of the NAND element 1222 is connected to the output terminal $\bar{5}$ of the decoder 1112 of the time base generating circuit 1100 through a conductor 1224. The other input terminal of this NAND element 1222 is, on the one hand, grounded through a switch 1225 responsive to the pay-load of the vehicle and a switch 1226 responsive to road inclination, and, on the other hand, connected to a supply terminal 1230 through a chatter preventing circuit 1229 comprising a resistance 1227 and capacitor 1228. The two switches 1225 and 1226 are connected in parallel with each other.

One of the input terminals of the NAND element 1223 is connected to the output terminal $\bar{6}$ of the decoder 1112 of the time base generating circuit 1100 through a conductor 1231. The other input terminal of the NAND element 1223 is, on the one hand, grounded through a switch 1232 responsive to the payload of the vehicle and a switch 1233 responsive to road inclination, and, on the other hand, connected to the supply terminal 1230 through a chatter preventing circuit 1236 comprising a resistance 1334 and capacitor 1235. the two switches 1232 and 1233 are connected in parallel with each other.

The aforesaid kickdown switch 1202 is kept open until the accelerator pedal is depressed to a predetermined kickdown position, and is closed when the accelerator pedal is depressed past the kickdown position. The other kickdown switch 1208 is kept closed until the accelerator pedal is depressed to another predetermined position lower than the said kickdown position, and is opened when the accelerator pedal is depressed past the predetermined position.

The switches 1225 and 1232 responsive to the payload of the vehicle are both kept open as long as the payload falls short of a first predetermined limit. Only the switch 1225 is closed while the payload is intermediate between the first predetermined limit and a second predetermined limit greater than the first limit. This switch 1225 is opened, and the switch 1232 closed, when the payload exceeds the second predetermined limit.

The switches 1226 and 1233 responsive to road inclination are both kept open as long as the angle of road inclination does not reach a first predetermined limit. Only the switch 1226 is closed while the angle of road inclination lies intermediate between the first predetermined limit and a second predetermined limit greater than the first limit. This switch 1226 is again opened, and the switch 1233 closed, when the angle exceeds the second predetermined limit.

In the gate control circuit 1200 of the above described configuration, the output voltage of the flip flop 1209 is kept low until the accelerator pedal is depressed to the predetermined kickdown position. As long as the accelerator pedal is not depressed, the kickdown switch 1202 is kept open, so that a high voltage is applied to one of the input terminals of the NAND element 1201. Since then the other kickdown switch 1208 is closed, a low voltage is applied to one of the input terminals of the NAND element 1207. The resultant high output voltage of this NAND element 1207 is applied to the other input terminal of the NAND element 1201. Thus, the output voltage of the NAND element 1201, or that of the flip flop 1209, is kept low.

As the accelerator pedal is depressed, the kickdown switch 1208 is first opened as aforesaid, and a high voltage is applied to one of the input terminals of the NAND element 1207. Since, however, a low voltage has been applied to the other input terminal of this NAND element 1207 from the output terminal of the NAND element 1201, the output voltage of the NAND element 1207 remains high. Thus the two input terminals of the NAND element 1201 are both subject to the high voltages, so that the output voltage of the flip flop 1209 is now high.

When the accelerator pedal is further depressed to or past the predetermined kickdown position, the kickdown switch 1202 is then supplied with a low voltage, so that the output voltage of this NAND element 1201, or that of the flip flop 1209, becomes high. In this instance, the output voltage of the NAND element 1207 becomes low because one of the input terminals of this NAND element is supplied with a high voltage by the opening of the kickdown switch 1208 and because the other input terminal thereof is also supplied with the high output voltage of the NAND element 1201.

As the accelerator pedal is released up to the kickdown position, the kickdown switch 1202 is opened, so that high voltage is again applied to one of the input terminals of the NAND element 1201. Since the other input terminal of the NAND element 1201 has been supplied with the low output voltage of the NAND element 1207, the output voltage of the NAND element 1201, or that of the flip flop 1209, is still high.

As the accelerator pedal is further released up to the other predetermined position, the kickdown switch 1208 is closed. A low voltage is now applied to one of the input terminals of the NAND element 1207, so that the output voltage of this NAND element becomes high. Since the two input terminals of the NAND element 1201 are both supplied with the high voltages, the output voltage of the flip flop 1209 becomes low.

As hereinbefore described, the output voltage of the flip flop 1209 is low while the accelerator pedal is not depressed to the kickdown position, and high while the accelerator pedal is depressed to or past the kickdown position. The output voltage is kept high until the accelerator pedal is released up to the aforesaid predetermined position where the kickdown switch 1208 is closed.

Proceeding to the description of change in the output voltage of the flip flop 1217, it will be assumed that a low voltage is produced from the output terminal $\overline{0}$ of the decoder 1112 of the time base generating circuit 1100, FIG. 18. This low output voltage affects one of the input terminals of the NAND element 1214 of the flip flop 1217 in such a manner that its output voltage becomes high. This high output voltage is applied to one of the input terminals of the NAND element 1213.

It will now be recalled that when the voltage of the output terminal $\overline{0}$ of the decoder 1112 is low, the voltages of the other output terminals $\overline{4}, \overline{5}, \overline{6}, \overline{7}$ and $\overline{9}$ of this decoder are all high. Thus, the output voltage of the NAND element 1211 is low because the high voltage is applied to its input terminal. This low output voltage of the NAND element 1211 is applied to one of the input terminals of the NAND element 1210, so that its output voltage is high regardless of the magnitude of the voltage applied to the other input thereof from the flip flop 1209. If, in this instance, the switches 1225 and 1232 responsive to vehicle payload and the switches 1226 and 1233 responsive to road inclination are all open, the output voltage of the NAND element 1222 is low because its two input terminals are both supplied with high voltages. The output voltage of the NAND element 1223 is also low because its two input terminals are both supplied with high voltages. The output voltage of the NAND element 1220 is high because its two input terminals are both supplied with low voltages. The output voltage of the NAND element 1219 is low because its two input terminals are both supplied with high voltages. The output voltage of the NAND element 1215 is high because its input terminal is supplied with a low voltage.

It is to be noted that the output voltage of the NAND element 1215 is high if any one of the switches 1225, 1226, 1232 and 1233 is closed while the voltage of the output terminal $\overline{0}$ of the decoder 1112, FIG. 18, is low. It will be supposed that the switch 1225 is closed by loading the vehicle as aforesaid. The output voltage of the NAND element 1222 is then high because its two input terminals are supplied with the high and low voltages, respectively. The output voltage of the NAND element 1223 is low because its two input terminals are both supplied with the high voltages. The output voltage of the NAND element 1220 is high because its two input terminals are supplied with the high and low voltages, respectively. The output voltage of the NAND element 1219 is low because its two input terminals are both supplied with the high voltages. This low output voltage of the NAND element 1219 is applied to the input terminal of the NAND element 1215, so that its output voltage is high as above noted.

The output voltage of this NAND element 1215 is also high when the switch 1226 is closed due to road inclination. When the switch 1232 or 1233 is closed, on the other hand, the output voltage of the NAND element 1222 is low because its two input terminals are both applied with the high voltages. The output voltage of the NAND element 1223 is high because its two input terminals are supplied with the high and low voltages, respectively. The output voltage of the NAND element 1220 is high because its two input terminals are supplied with the high and low voltages, respectively. The output voltage of the NAND element 1219 is low because its two input terminals are both supplied with the high voltages. This low output voltage of the NAND element 1219 is applied to the input terminal of the NAND element 1215, so that its output voltage is high as previously mentioned.

Thus, when the output terminal $\overline{0}$ of the decoder 1112 of the time base generating circuit 1100 provides a low voltage, all the input terminals of the NAND element 1213 of the flip flop 1217 are supplied with the high voltages. The NAND element 1213 provides a low output voltage, which is applied to the other input terminal of the NAND element 1214.

When the first control pulse is supplied to the input terminal T of the counter 1111 since the voltage of the output terminal $\overline{0}$ of the decoder 1112 has become low, the output terminal $\overline{1}$ of the decoder 1112 produces a low voltage, while its output terminal $\overline{0}$ now produces a high voltage. This high voltage is applied to one of the input terminals of the NAND element 1214 of the flip flop 1217, but the other input terminal thereof is being supplied with the low voltage, so that the output voltage of this NAND element 1214, or that of the flip flop 1217, is still high.

When the fourth control pulse is supplied to the input terminal T of the counter 1111 since the voltage of the output terminal $\overline{0}$ of the decoder 1112 has become low, the output terminal $\overline{4}$ of the decoder 1112 produces a low voltage, while all the other output terminals thereof produce high voltages. Since then this low voltage is applied to the input terminal of the NAND element 1211, the NAND element 1211 produces a high output voltage. This high output voltage is applied to one of the input terminals of the NAND element 1210, so that its output voltage varies depending upon the voltage supplied to the other input terminal from the flip flop 1209. If the output voltage of the flip flop 1209 is low, the output voltage of the NAND element 1210 remains high. However, if the output voltage of the flip flop 1209 is high, the output voltage of the NAND element 1210 becomes low when the output terminal $\overline{4}$ of the decoder 1112 produces a low voltage as aforesaid.

Thus, when the output terminal $\overline{4}$ of the decoder 1112 produces a low voltage, the output voltage of the flip flop 1217 remains high if, on the one hand, the output voltage of the flip flop 1209 is low, because then all the input terminals of the NAND element 1213 of the flip flop 1217 are supplied with the high voltages and its output voltage is still low. If, on the other hand, the output voltage of the flip flop 1209 is high, the output voltage of the flip flop 1217 becomes low because then one of the input terminals of the NAND element 1213 is supplied with a low voltage so that the resultaant high output voltage of this NAND element is applied to the other NAND element 1214.

In other words, when the voltage of the output terminal $\overline{4}$ of the decoder 1112 becomes low, the output voltage of the flip flop 1217 is kept high unless the accelerator pedal is depressed to or past the kickdown position after the kickdown switch 1208 has been closed. The output voltage of the flip flop 1217 becomes low if the accelerator is depressed to or past the kickdown position and is not released up to the position where the kickdown switch 1208 is closed.

In case where the output voltage of the flip flop 1217 remains high even when the voltage of the output terminal $\overline{4}$ of the decoder 1112 becomes low, this output voltage of the flip flop 1217 becomes low when two control pulses are supplied to the counter 1111 of the time base generating circuit 1100 to lower the voltage of the output terminal $\overline{6}$ of the decoder 1112, even if either the switch 1225 responsive to vehicle payload or the switch 1226 responsive to road inclination is closed. That is, if either the switch 1225 or 1226 is closed, a low voltage is applied to one of the input terminals of the NAND element 1222. The other input terminal of this NAND element 1222 is also supplied with a low voltage when the output terminal $\overline{5}$ of the decoder 1112 produces a low voltage, so that the output terminal of the NAND element 1222 becomes high. Since then all of the other output terminals of the decoder 1112 provide high voltages as aforesaid, the two input terminals of the NAND element 1223 are both supplied with the high voltages. The resultant low output voltage of the NAND element 1223 and the aforesaid high output voltage of the NAND element 1222 are both applied to the input terminals of the NAND element 1220, which then produces a high output voltage. The input terminals of the NAND element 1219 are both supplied with the high voltages. The low output voltages thus produced by this NAND element 1219 is then applied to the input terminal of the NAND element 1215. As a high output voltage is resultantly supplied from the NAND element 1215 to the NAND element 1213, the flip flop 1217 still produces a high output voltage.

As the next control pulse is supplied to the counter 1111 of the time base generating circuit 1100, with the result that the output terminal $\overline{6}$ of the decoder 1112 produces a low voltage, the output voltage of the NAND element 1222 remains high because its two input terminals are then supplied with high and low voltages, respectively. However, the output voltage of the NAND element 1223 becomes high because one of its terminals is supplied with the low voltage. These high output voltages of the NAND elements 1222 and 1223 are both applied to the NAND element 1220, so that is output voltage becomes low. This low output voltage of the NAND element 1220 is applied to one of the input terminals of the NAND element 1219 thereby making its output voltage high. The output voltage of the NAND element 1215 is thus made low, and this low output voltage is applied to one of the input terminals of the NAND element 1213, which then produces a high output voltage. Since the two input terminals of the NAND element 1214 are both supplied with the high voltages, the output voltage of the flip flop 1217 becomes low.

When the vehicle payload further increases in excess of the aforesaid second predetermined limit, or when the road inclination exceeds the second predetermined limit, thereby opening the switches 1225 and 1226, and closing the switch 1232 or 1233, the output voltage of the flip flop 1217 becomes low when the output terminal $\overline{5}$ of the decoder 1112 supplies a low voltage. When the switch 1232 or 1233 is closed as aforesaid, a low voltage is supplied to one of the input terminals of the NAND element 1223, so that its output voltage becomes high regardless of the magnitude of the voltage supplied to the other input terminal. Since a high voltage is supplied to one of the input terminals of the NAND element 1222 when the switches 1225 and 1226 are both opened as previously mentioned, the output voltage of this NAND element 1222 becomes high when the output terminal $\overline{5}$ of the decoder 1112 provides a low voltage, because this low voltage is supplied to the other input terminal thereof. These high output voltages of the NAND elements 1223 and 1222 are both supplied to the input terminals of the NAND element 1220, so that its output voltage becomes low. The output voltage of the NAND element 1219 becomes high because one of its input terminals is supplied with the low output voltage of the NAND element 1220. The output voltage of the NAND element 1215 becomes low, and this low output voltage is supplied to one of the three input terminals of the NAND element 1213, so that its output voltage becomes high. As the high voltages are thus supplied to the two input terminals of the NAND element 1214, the output voltage of the flip flop 1217 becomes low.

As long as the switches 1225, 1226, 1232 and 1233 are all open, the output voltage of the flip flop 1217 remains high even when the ouput terminals $\overline{5}$ and $\overline{6}$ of the decoder 1112 successively supply low voltages. In this instance, a high voltage is supplied to one of the input terminals of each of the NAND elements 1222 and 1223. Thus, when the output terminal $\overline{5}$ of the decoder 1112 provides a low voltage as aforesaid, the output voltage of the NAND element 1222 becomes high because the other of its input terminals is supplied with this low voltage from the output terminal $\overline{5}$, while the output voltage of the NAND element 1223 becomes low because high voltages are supplied to its two input terminals.

When the output terminal $\bar{6}$ of the decoder 1112 provides a low voltage, on the other hand, the output voltage of the NAND element 1222 becomes low because its two input terminals are then both supplied with high voltages, while the output voltage of the NAND element 1223 becomes high because one of its input terminals is supplied with the low voltage from the output terminal $\bar{6}$. In either case, the output voltage of the NAND element 1220 is high because a low voltage is supplied to either one of its two input terminals. The output voltage of the NAND element 1219 is low because its input terminals are both supplied with the high voltages. This low output voltage is supplied to the NAND element 1215, so that its output voltage is now high. Hence, the output voltage of the flip flop 1217 remains high.

In the case where the output voltage of the flip flop 1217 remains high even when the output terminals $\bar{4}$, $\bar{5}$ and $\bar{6}$ of the decoder 1112 successively provide low voltages, this output voltage of the flip flop 1217 becomes low when the seventh control pulse is supplied to the counter 1111 since a low voltage has been produced by the output terminal $\bar{0}$ of the decoder 1112. Then the output terminal $\bar{7}$ of the decoder 1112 provides a low voltage, which is supplied to one of the input terminals of the NAND element 1219. The resultant high output voltage of this NAND element 1219 is supplied to the NAND element 1215, and a low output voltage of the latter is applied to one of the three input terminals of the NAND element 1213, which then produces a high output voltage. Hence, the two input terminals of the NAND element 1215 are both supplied with the high voltages, so that the output voltage of the flip flop 1217 becomes low as previously noted.

As discussed hereinbefore, the output voltage of the flip flop 1217 becomes low and again high only when the output terminal $\bar{0}$ of the decoder 1112 provides a low voltage during the successive supply of pulses to the counter 1111 of the time base generating circuit 1100. The foregoing discussions are summarized in the following Table 2.

TABLE 2

| | NUMBER OF PULSES RECEIVED BY COUNTER 1111 0 1 2 3 4 5 6 7 8 9 |
|---|---|
| WHEN ACCELERATOR PEDAL IS DEPRESSED TO KICKDOWN POSITION AND IS NOT RELEASED UP TO POSITION WHERE SWITCH 1208 IS CLOSED | H H H H L L L L L L |
| WHEN VEHICLE PAYLOAD LIES INTERMEDIATE BETWEEN 1ST AND 2ND PREDETERMINED LIMITS OR WHEN ROAD INCLINATION LIES INTERMEDIATE BETWEEN 1ST AND 2ND PREDETERMINED LIMITS (ACCELERATOR PEDAL NOT DEPRESSED TO KICKDOWN POSITION) | H H H H H H L L L L |
| WHEN VEHICLE PAYLOAD EXCEEDS 2ND PREDETERMINED LIMIT OR WHEN ROAD INCLINATION EXCEEDS 2ND PREDETERMINED LIMIT (ACCELERATOR PEDAL NOT DEPRESSED | H H H H H L L L L L |

TABLE 2-Continued

| | NUMBER OF PULSES RECEIVED BY COUNTER 1111 0 1 2 3 4 5 6 7 8 9 |
|---|---|
| TO KICKDOWN POSITION) WHEN VEHICLE PAYLOAD DOES NOT REACH 1ST PREDETERMINED LIMIT OR WHEN ROAD INCLINATION DOES NOT REACH 1ST PREDETERMINED LIMIT (ACCELERATOR PEDAL NOT DEPRESSED TO KICKDOWN POSITION) | H H H H H H H L L L |

Figure 20:
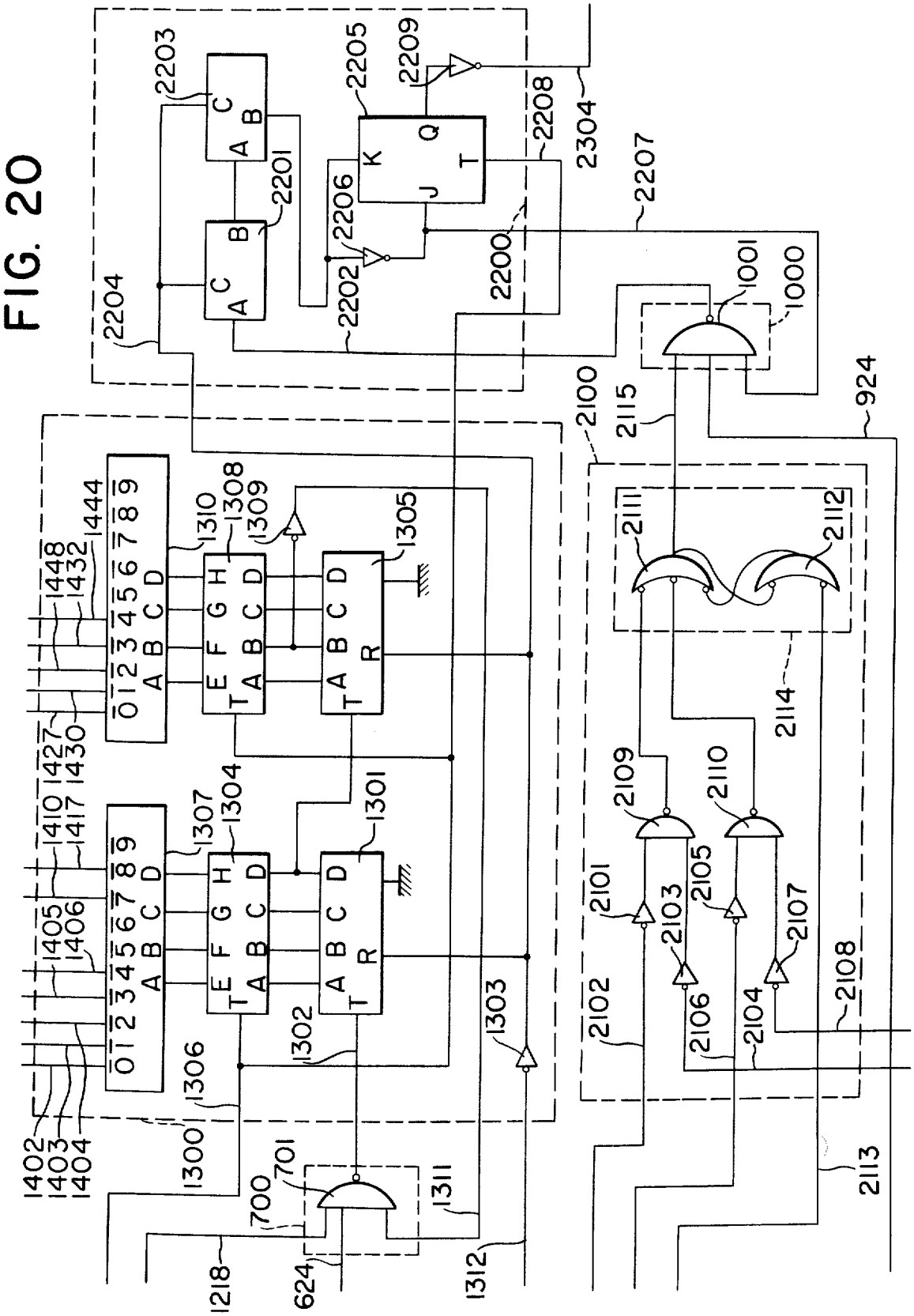
FIG. 20 is a diagram showing a vehicle speed gate circuit, a counting circuit, an engine speed gate control circuit, and an engine speed control circuit.

A counting circuit 1300 is shown in FIG. 20. An input terminal T of a decimal counter 1301 provided therein is connected through a conductor 1302 to the output terminal of the NAND element 701 in the aforesaid gate circuit 700, while its reset terminal R is connected to the output terminal of a NAND element 1303. Output terminals A, B, C and D of the counter 1301 are connected to input terminals A, B, C and D of a register 1304, respectively. Only the output terminal D of the counter 1301 is further connected to an input terminal T of another decimal counter 1305. A clock input terminal T of the register 1304 is connected to the output terminal of the NAND element 1219 of the vehicle speed gate control circuit 1200, FIG. 19, through a conductor 1306. Output terminals E, F, G and H of the register 1304 are connected to input terminals A, B, C and D of a binary/decimal decoder 1307, respectively. A reset terminal R of the decimal counter 1305 is connected to the output terminal of the NAND element 1303, its output terminals A, B, C and D of a register 1308, respectively, and its output terminal B further to the input terminal of a NAND element 1309. A clock input terminal T of the register 1308 is connected to the aforesaid conductor 1306 and thence to the output terminal of the NAND element 1219 of the vehicle speed gate control circuit 1200, while its output terminals E, F, G and H are connected to input terminals A, B, C and D of a binary/decimal decoder 1310, respectively. The output terminal of the NAND element 1309 is connected to one of the input terminals of the NAND element 701 of the vehicle speed gate circuit 700 through a conductor 1311. The input terminal of the NAND element 1303 is connected to the output terminal $\bar{9}$ of the decoder 1112 of the time base generating circuit 1100, FIG. 18, through a conductor 1312.

The counter 1301 repetitively counts every 10 of the pulses successively supplied to its input terminal T as long as a low voltage is being supplied to its reset terminal R. Outputs of this counter 1301 are supplied from its output terminals A, B, C and D to the corresponding input terminals A, B, C and D of the decoder 1307 via the register 1304 when a high voltage is applied to the clock input terminal T of the register. Voltages produced from the output terminals $\bar{0}, \bar{1}, \bar{2}, \bar{3}, \bar{4}, \bar{5}, \bar{6}, \bar{7}, \bar{8}$ and $\bar{9}$ of the decoder 1307 vary according to the number of pulses counted by the counter 1301, just like the voltage produced from the output terminals of the decoder 1112 of FIG. 18. A voltage produced from the output terminal D of the counter 1301 changes its magnitude every time this counter receives ten pulses through its input terminal T, so that one pulse is supplied to the input terminal T of the counter 1305 every time the counter 1301 receives ten pulses.

As long as a low voltage is supplied to its reset terminal R, the counter 1305 also repetitively counts every ten of the pulses impressed on its input terminal T. Outputs of this counter 1305 are supplied from its output terminals A, B, C and D to the corresponding input terminals A, B, C and D of the decoder 1310 through the register 1308 when a high voltage is applied to the clock input terminal T of this register. Voltages produced from the output terminals $\bar{0}, \bar{1}, \bar{2}, \bar{3}, \bar{4}, \bar{5}, \bar{6}, \bar{7}, \bar{8}$ and $\bar{9}$ of the decoder 1310 vary according to the number of pulses counted by the counter 1305, just as the voltages produced from the output terminals of the decoder 1307 vary according to the number of pulses counted by the counter 1301. The numbers of pulses counted by these two counters 1301 and 1305 are reset to zero upon application of a high voltage to the reset terminal R of each counter. A voltage produced from the output terminal B of the counter 1305 is low while this counter is receiving from zero to the third pulse and is high while the counter is receiving from the fourth to the eighth pulse.

When the number of pulses counted by the counters 1301 and 1305 is zero, and when the output terminal $\bar{0}$ of the decoder 1112 of the time base generating circuit 1100, FIG. 18, produces a low voltage, the output voltage of the flip flop 1217 of the gate control circuit 1200 shown in FIG. 19 becomes high. This high voltage is supplied to one of the input terminals of the NAND element 701 of the gate circuit 700. Since one of the other two terminals of the NAND element 701 is now being supplied with a high voltage from the output terminal of the NAND element 1309 because the number of pulses counted by the counter 1305 is zero as previously mentioned, the output from this NAND element 701 changes from a low to a high voltage as the input supplied to its remaining input terminal from the amplifying/shaping circuit 600 changes from a high to a low voltage.

Thus, the aforementioned wheel pulses formed by the vehicle speed detecting section 500 and the amplifying/shaping circuit 600 are permitted to pass through the gate circuit 700 into the counter 1301 of the counting circuit 1300. No conduction takes place through this gate circuit 700 when the output voltage of the flip flop 1217 of the gate control circuit 1200 becomes low or when the output voltage of the NAND element 1309 becomes low. When either one of the output voltages of the flip flop 1217 and the NAND element 1309 thus becomes low, the output voltage of the NAND element 701 of the gate circuit 700 remains high regardless of the wheel pulses from the amplifying/shaping circuit 600. Thus, after permitting conduction when the output terminal $\bar{0}$ of the decoder 1112 provides a low voltage, the gate circuit 700 prevents conduction when, ordinarily, the seventh control pulse is supplied to the counter 1111 of the time base generating circuit 1100 since the output terminal $\bar{0}$ of its decoder 1112 has produced a low voltage. As the output terminal $\bar{7}$ of the decoder 1112 thus produces a low voltage, the output voltage of the flip flop 1217 becomes low, so that no conduction is now permitted through the gate circuit 700.

If either one or both of the switches 1225 and 1226 are closed due to vehicle payload or road inclination, no conduction takes place through the gate circuit 700 when the sixth control pulse is supplied to the counter 1111 of the time base generating circuit 1100 since the output terminal $\bar{0}$ of its decoder 1112 has produced a low voltage. As the output terminal $\bar{6}$ of the decoder 1112 thus produces a low voltage, the output voltage of the flip flop 1217 of the gate control circuit 1200 becomes low.

If the vehicle payload or road inclination further increases so that the switch 1225 or 1226 is opened, and that one or both of the switches 1232 and 1233 are closed, no conduction takes place through the gate circuit 700 when the fifth control pulse is supplied to the counter 1111 of the time base generating circuit 1100 since the output terminal $\bar{0}$ of its decoder 1112 has produced a low voltage. As the output terminal $\bar{5}$ of the decoder 1112 thus produces a low voltage, the output voltage of the flip flop 1217 of the gate control circuit 1200 becomes low.

If the accelerator pedal of the vehicle is depressed in excess of the kickdown position and is not released up to the position where the kickdown switch 1208 of FIG. 19 is closed, no conduction takes place through the gate circuit 700 when the fourth control pulse is supplied to the counter 1111 of the time base generating circuit 1100 since the output terminal $\bar{0}$ of its decoder 1112 has produced a low voltage. As the output terminal $\bar{4}$ of the decoder 1112 thus produces a low voltage, the output voltage of the flip flop 1217 of the gate control circuit 1200 becomes low.

The wheel pulses which pass through the gate circuit 700 while this circuit remains conductive are supplied to the counter 1301 of the counting circuit 1300, where they are counted as aforesaid. Outputs from this counter 1301 are supplied to the register 1304, and thence to the decoder 1307 when the output terminal $\bar{7}$ of the decoder 1112 of the time base generating circuit 1100 produces a low voltage so that the resultant high output voltage of the NAND element 1219 of the gate circuit 1200 is supplied to the clock input terminal T of the register 1304. If the number of wheel pulses supplied to the counter 1301 through the gate circuit 700 while this gate circuit remains conductive is, for example, four, only the output terminal $\bar{4}$ of the decoder 1307 produces a low voltage, while all the other output terminals thereof produce high voltages.

Upon application of the tenth wheel pulse to the counter 1301 through the gate circuit 700 during conduction of this gate circuit, the pulse number being counted by the counter 1301 is reset to zero, or one pulse is supplied from its output terminal D to the counter 1305, so that the pulse number counted by this latter counter 1305 is now one. When the voltage of the output terminal $\bar{7}$ of the decoder 1112 of the time base generating circuit 1100 becomes low so that a high voltage is supplied to the clock terminals of the registers 1304 and 1308, outputs from the counters 1301 and 1308 are supplied to the decoders 1307 and 1310 via the registers 1304 and 1308, respectively. The output terminal $\bar{0}$ of the decoder 1307 thereupon produces a low voltage, while all of the other output terminals thereof produce high voltages, and the output terminal $\bar{1}$ of the other decoder 1310 produces a low voltage, while all of the other output terminals thereof produce high voltages.

If 20 pulses are supplied to the counter 1301 during conduction of the gate circuit 700, two pulses will be supplied from its output terminal D to the counter 1304. If 30 pulses are supplied to the counter 1301 during conduction of the gate circuit 700, three pulses will be supplied to the counter 1304. If 40 pulses are supplied to the counter 1301 through the gate circuit 700, the output terminal B of the counter 1305 will produce a high voltage, so that the NAND element 1309 will produce a low output voltage. No conduction will then be permitted through the gate circuit 700.

Figure 21:
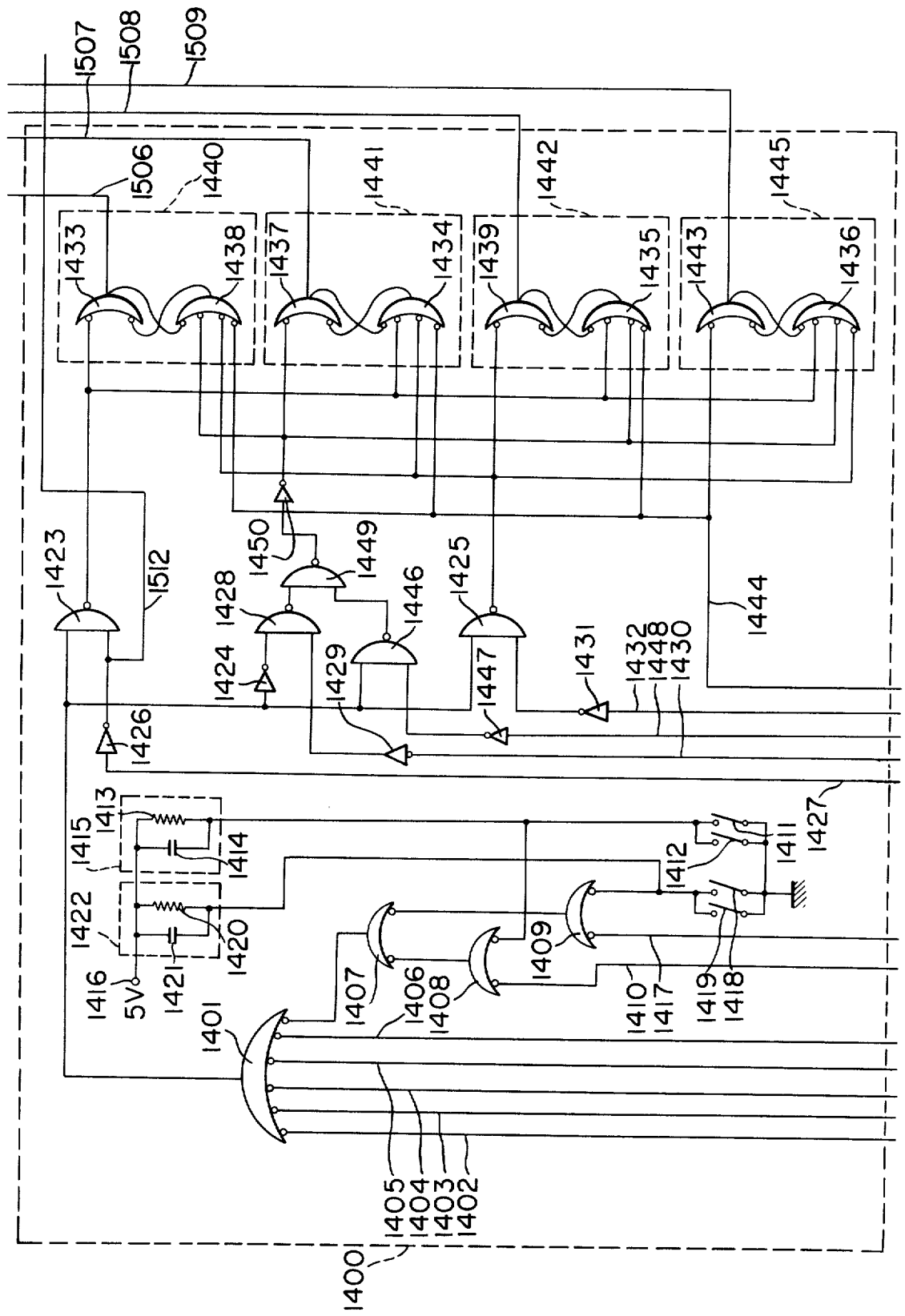
FIG. 21 is a diagram showing a hysteresis control circuit adapted for the control of vehicle speeds at which shifts occur.

FIG. 21 illustrates the configuration of a hysteresis control circuit 1400 which is also used for the setting of vehicle speed at speed change points. Five of the six input terminals of a NAND element 1401 are connected through conductors 1402, 1403, 1404, 1405 and 1406 to the output terminals $\bar{0}$, $\bar{1}$, $\bar{2}$, $\bar{3}$ and $\bar{4}$ of the decoder 1307 of the counting circuit 1300, FIG. 20, and the remaining one terminal thereof is connected to the output terminal of a two-input NAND element 1407. One of the input terminals of the NAND element 1407 is connected to the output terminal of a two-input NAND element 1408, and the other input terminal thereof is connected to the output terminal of a two-input NAND element 1409. One of the input terminals of the NAND element 1408 is connected to the output terminal $\bar{7}$ of the decoder 1307 of the aforesaid counting circuit 1300 through a conductor 1410.

The other input terminal of this NAND element 1408 is, on the one hand, grounded through a switch 1411 responsive to vehicle payload and a switch 1412 responsive to road inclination, and, on the other hand, connected to a supply terminal 1416 through a chatter preventing circuit 1415 comprising a resistance 1413 and capacitor 1414. The two switches 1411 and 1412 are connected in parallel with each other. One of the input terminals of the NAND element 1409 is connected to the output terminal $\bar{8}$ of the decoder 1307 of the counting circuit 1300 through a conductor 1417. The other input terminal of the NAND element 1409 is, on the one hand, grounded through a switch 1418 responsive to vehicle payload and a switch 1419 responsive to road inclination, and, on the other hand, connected to the supply terminal 1416 through a chatter preventing circuit 1422 comprising a resistance 1420 and capacitor 1421. The two switches 1418 and 1419 are connected in parallel with each other.

The output terminal of the six-input NAND element 1401 is connected to one of the input terminals of a two-input NAND element 1423, to the input terminal of a NAND element 1424, and to one of the input terminals of each of two-input NAND elements 1425 and 1446. The other input terminal of the NAND element 1423 is connected to the output terminal of a NAND element 1426, while the input terminal of this NAND element 1426 is connected to the output terminal $\bar{0}$ of the decoder 1310 of the counting circuit 1300, FIG. 20, through a conductor 1427. The output terminal of the NAND element 1424 is connected to one of the input terminals of a two-input NAND element 1428, the other input terminal of which is connected to the output terminal of a NAND element 1429. The input terminal of this NAND element 1429 is connected to the output terminal $\bar{2}$ of the decoder 1310 of the counting circuit 1300 through a conductor 1430. The other input terminal of the NAND element 1425 is connected to the output terminal of a NAND element 1431, the input terminal of which is connected to the output terminal $\bar{3}$ of the decoder 1310 of the counting circuit 1300 through a conductor 1432. The other input terminal of the NAND element 1446 is connected to the output terminal of a NAND element 1447, the input terminal of which is connected to the output terminal $\bar{2}$ of the decoder 1310 of the counting circuit 1300 through a conductor 1448.

The output terminal of the NAND element 1423 is connected to one of the input terminals of a two-input NAND element 1433 and to one of the input terminals of each of four-input NAND elements 1434, 1435 and 1436. The output terminal of the NAND element 1428 is connected to one of the input terminals of a two-input NAND element 1449. The output terminal of the NAND element 1446 is connected to the other input terminal of the NAND element 1449. The output terminal of this NAND element 1449 is connected to the input terminal of a NAND element 1450, the output terminal of which is connected to one of the input terminals of a two-input NAND element 1437 and to one of the input terminals of each of four-input NAND elements 1435, 1436 and 1438. The output terminal of the NAND element 1425 is connected to one of the input terminals of a two-input NAND element 1439 and to one of the input terminals of each of the NAND elements 1434, 1436 and 1438.

The output terminal of the NAND element 1433 is connected to one of the input terminals of the NAND element 1438, while the output terminal of this NAND element 1438 is connected to the remaining input terminal of the NAND element 1433. These two NAND elements 1433 and 1438 are thus combined to form a flip flop 1440. Similarly, the output terminal of the NAND element 1437 is connected to one of the input terminals of the NAND element 1434, while the output terminal of this NAND element 1434 is connected to the remaining input terminal of the NAND element 1437. Thus, these two NAND elements 1437 and 1434 are also combined to form a flip flop 1441.

The output terminal of the NAND element 1439 is connected to one of the input terminals of the NAND element 1435, while the output terminal of this NAND element 1435 is connected to the remaining input terminal of the NAND element 1439. These two NAND elements 1439 and 1435 also form a flip flop 1442. One of the input terminals of a two-input NAND element 1443 is connected to one of the input terminals of each of the NAND elements 1434, 1435 and 1438, and is also connected to the output terminal 4 of the decoder 1310 of the counting circuit 1300 through a conductor 1444. The output terminal of this NAND element 1443 is connected to one of the input terminals of the NAND element 1436, while the output terminal of the NAND element 1436 is connected to the remaining input terminal of the NAND element 1443. These two NANS elements 1443 and 1436 are also thus combined to form a flip flop 1445.

The switch 1411 is closed until the payload of the vehicle reaches a first predetermined limit, and is opened when the vehicle payload exceeds the first predetermined limit. The switch 1418 is kept open until the vehicle payload reaches the first predetermined limit, is closed when the vehicle payload lies intermediate between the first and a second predetermined limit, and is again opened when the vehicle payload exceeds the second predetermined limit.

The switch 1412 is closed until the inclination of the road reaches a first predetermined limit, and is opened when the road inclination exceeds the first predetermined limit. The switch 1419 is kept open until the road inclination reaches the first predetermined limit, is closed when the road inclination lies intermediate between the first and a second predetermined limit, and is again opened when the road inclination exceeds the second predetermined limit.

Described hereinbelow are changes in the output voltages of the flip flops 1440, 1441, 1442 and 1445 when switches 1411, 1412, 1418, and 1419 are open. If the number of wheel pulses supplied to the counter 1301 of the counting circuit 1300, FIG. 20, through the gate circuit 700 during the conduction thereof is less than 4, either one of the output terminals $\overline{0}, \overline{1}, \overline{2}, \overline{3}$ and $\overline{4}$ of the decoder 1307 of the counting circuit 1300 produces a low voltage, and the output terminal $\overline{0}$ of the other decoder 1310 produces a low voltage, while all the other output terminals thereof produce high voltages. The output voltage of the NAND element 1401 of the hysteresis control circuit 1400, FIG. 21, is now high because one of its input terminals is supplied with the low voltage. This high output voltage is supplied to the input terminal of the NAND element 1424, so that its output voltage is low. The output voltage of the NAND element 1426 is also high because its input terminal is supplied with the low voltage from the output terminal $\overline{0}$ of the decoder 1310. The output voltages of the NAND elements 1429, 1431 and 1447 are all low because their input terminals are supplied with high voltages. The output voltage of the NAND element 1423 is high because its two input terminals are both supplied with the high voltages. The output voltage of the NAND element 1428 is low because its two input terminals are both supplied with the low voltages. The output voltage of the NAND element 1425 is high because its two input terminals are supplied with the high and low voltages, respectively. The output voltage of the NAND element 1446 is high because its two input terminals are supplied with the high and low voltages, respectively. The output voltage of the NAND element 1449 is low because its two input terminals are both supplied with the high voltages. This low output voltage is supplied to the input terminal of the NAND element 1450, so that this NAND element produces a high output voltage.

The low output voltage of the NAND element 1423 is applied to one of the input terminals of the NAND element 1433 of the flip flop 1440 and furrher to one of the input terminals of each of the NAND element 1434 of the flip flop 1441, the NAND element 1435 of the flip flop 1442, and the NAND element 1436 of the flip flop 1445, so that all of these NAND elements produce high output voltages. Hence, the output voltage of the flip flop 1440 is high. The output voltage of the flip flop 1441 is low because the two input terminals of its NAND element 1437 are both supplied with the high voltages. The output voltage of the flip flop 1442 is also high because the two input terminals of its NAND element 1439 are both supplied with the high voltages. The output voltage of the flip flop 1445 is also low because the two input terminals of its NAND element 1443 are both supplied with the high voltages.

It is to be noted that the low output voltage of the NAND element 1433 of the flip flop 1440 is supplied to one of the input terminals of the NAND element 1438 thereof. The output voltage of this NAND element 1438 is low because all of its input terminals are thus supplied with the high voltages. This low output voltage of the NAND element 1438 is supplied to one of the input terminals of the NAND element 1433. As a result, if the number of wheel pulses supplied to the counter 1301 of the counting circuit 1300 during conduction of the gate circuit 700 is in the range of 5 to 9, the output voltage of the NAND element 1401 becomes low because then all its input terminals are supplied with high voltages. This low output voltage is supplied to one of the input terminals of the NAND element 1423, which then produces a high output voltage. Although this high voltage is supplied to one of the input terminals of the NAND element 1433 of the flip flop 1440, the other input terminal thereof is still supplied with the low output voltage of the NAND element 1438, so that the output voltage of the NAND element 1433, or that of the flip flop 1440, remains high.

In this case, the output voltages of the other flip flops 1441, 1442 and 1445 are also kept low as hereinafter explained. If the number of wheel pulses impressed to the counter 1301 of the counting circuit 1300 during conduction of the gate circuit 700 ranges from 5 to 9 as above mentioned, the output terminal $\overline{0}$ of the decoder 1310 of the counting circuit 1300 produces a low voltage, while the output terminals $\overline{1}, \overline{2}, \overline{3}$ and $\overline{4}$ produce high voltages. The output voltages of the NAND elements 1425 and 1450 are still high, so that, even though the NAND element 1423 now produces a high output voltage, the output voltages of the NAND element 1434, 1435 and 1436 are kept high because one of the input terminals of each of these NAND elements is still supplied with the low output voltage of the NAND element 1437, 1435 or 1443. Hence, the output voltages of the NAND elements 1437, 1439 and 1443, or those of the flip flops 1441, 1442 and 1445, are kept low because the two input terminals of each of these NAND elements are both supplied with the high voltages.

When the number of wheel pulses supplied to the counter 1301 of the counting circuit 1300 during conduction of the gate circuit 700 is in the range of from 10 to 14, one of the output termihals $\overline{0}, \overline{1}, \overline{2}, \overline{3}$ and $\overline{4}$ of the decoder 1307 of the counting circuit 1300 produce a low voltage, and the output terminal $\overline{1}$ of the other decoder 1310 produces a low voltage, while all the other output terminals thereof produce high voltages. As a result, the output voltage of the NAND element 1401 becomes high; the output voltage of the NAND element 1424 becomes low; the output voltage of the NAND element 1426 becomes low; and the output voltage of the NAND element 1429 becomes high. However, the output voltage of the NAND element 1423 remains high because one of its input terminals is supplied with the low voltage. The output voltages of the NAND elements 1428 and 1446 are also high because their input terminals are supplied with the low voltages. Thus, the output voltage of the NAND element 1449 remains low, and the output voltage of the NAND element 1450 remains high. The output voltage of the NAND element 1425 also remains high because one of its input terminals is supplied with the low voltage. Hence the output voltages of the flip flops 1440, 1441, 1442 and 1445 remain unchanged in magnitude.

When the number of wheel pulses supplied to the counter 1301 of the counting circuit 1300 during conduction of the gate circuit 700 is in the range of 15 to 19, one of the output terminals $\overline{5}, \overline{6}, \overline{7}, \overline{8}$ and $\overline{9}$ of the decoder 1307 of the counting circuit 1300 produces a low voltage. The output voltage of the NAND element 1401 thus becomes low, while the output voltage of the NAND element 1424 becomes high. The output voltage of the NAND element 1428 becomes low because its two input terminals are both supplied with the high voltages. As a result, the output voltage of the NAND element 1449 becomes high, and the output voltage of the NAND element 1450 becomes low. The output voltages of the NAND elements 1423 and 1425 are still high because their input terminals are supplied with low voltages. As the output voltage of the NAND element 1450 becomes low as aforesaid, the output voltage of the NAND element 1438 of the flip flop 1440 becomes high because the low output voltage of the NAND element 1450 is supplied to one of its input terminals. Since the two input terminals of the NAND element 1433 are both supplied with the high voltages, the output voltage of the flip flop 1440 becomes low. The output voltage of the flip flop 1441 becomes high because one of the input terminals of its NAND element 1437 is supplied with the low voltage. The output voltages of the flip flops 1442 and 1445 are kept low because the input terminals of their NAND elements 1439 and 1443 are supplied with the high voltages. It will be apparent that the output voltage of the NAND element 1434 of the flip flop 1441 becomes low because its input terminals are all supplied with high voltages.

When the number of wheel pulses supplied to the counter 1301 of the counting circuit 1300 during conduction of the gate circuit 700 is in the range of 20 to 24, one of the output terminals $\overline{0}, \overline{1}, \overline{2}, \overline{3}$ and $\overline{4}$ of the decoder 1307 of the counting circuit 1300 produces a low voltage, and the output terminal $\overline{2}$ of the other decoder 1310 produces a low voltage, while all of the other output terminals produce high voltages. As a result, the output voltage of the NAND element 1401 becomes high; the output voltage of the NAND element 1424 becomes low; the output voltage of the NAND element 1429 becomes low; and the output voltage of the NAND element 1447 becomes high. The output voltages of the NAND elements 1423 and 1425 are kept high because their input terminals are supplied with the low voltages. The output voltage of the NAND element 1428 becomes high because its input terminals are supplied with the low voltages. The output voltage of the NAND element 1446 becomes low because its input terminals are both supplied with the high voltages. The output voltage of the NAND element 1449 remains high because its input terminals are supplied with the high and low voltages, respectively, so that the output voltage of the NAND element 1450 is high. Hence the output voltage of the flip flop 1441 remains high. The output voltages of the other flip flops 1440, 1442 and 1445 are also kept low because the input terminals of their NAND elements 1433, 1439 and 1443 are supplied with high voltages.

When the number of wheel pulses supplied to the counter 1301 of the counting circuit 1300 during conduction of the gate circuit 700 is in the range of 25 to 29, one of the output terminals $\overline{5}, \overline{6}, \overline{7}, \overline{8}$ and $\overline{9}$ of the decoder 1307 of the counting circuit 1300 produces a low voltage. The output voltage of the NAND element 1401 becomes low, and the output voltage of the NAND element 1424 becomes high. However, the output voltages of the NAND elements 1423, 1425, 1428 and 1446 are kept high because their input terminals are supplied with the low voltages, so that the output voltages of the flip flops 1440, 1441, 1442 and 1445 remain unchanged in magnitude.

When the number of wheel pulses supplied to the counter 1301 of the counting circuit 1300 during conduction of the gate circuit 700 is in the range of 30 to 34, one of the output terminals $0, \overline{1}, \overline{2}, \overline{3}$ and $\overline{4}$ of the decoder 1307 of the counting circuit 1300 produces a low voltage, and the output terminal $\overline{3}$ of the other decoder 1310 also produces a low voltage, while all the other output terminals thereof produce high voltages. The output voltage of the NAND element 1401 becomes high; the output voltage of the NAND element 1424 becomes low; the output voltage of the NAND element 1431 becomes high; and the output voltage of the NAND element 1447 becomes low. The output voltages of the NAND elements 1423, 1428 and 1446 are kept high because their input terminals are supplied with the low voltages. The output voltage of the NAND element 1450 also remains high. The output voltage of the NAND element 1425 becomes low because its input terminals are both supplied with the high voltages. This low output voltage is supplied to one of the input terminals of the NAND element 1439 of the flip flop 1442, so that the output voltage of this NAND element 1439, or that of the flip flop 1442, becomes low. The low output voltage of the NAND element 1425 is also supplied to one of the input terminals of the NAND element 1434 of the flip flop 1441, so that the output voltage of this NAND element 1434 becomes high. Since the input terminals of the NAND element 1437 are thus both supplied with the high voltages, the output voltage of the flip flop 1441 becomes low. The output voltages of the other flip flops 1440 and 1445 are kept low because the input terminals of their NAND elements 1433 and 1443 are both supplied with the high voltages. It will be noted that, in this case, the output voltage of the NAND element 1435 of the flip flop 1442 becomes low because all of its input yerminals are supplied with the high voltages.

When the number of wheel pulses supplied to the counter 1301 of the counting circuit 1300 during conduction of the gate circuit 700 is in the range of 35 to 39, one of the output terminals $\overline{5}, \overline{6}, \overline{7}, \overline{8}$ and $\overline{9}$ of the decoder 1307 of the counting circuit 1300 produces a low voltage. Then the output voltage of the NAND element 1401 becomes low, while the output voltage of the NAND element 1425 becomes high. This high output voltage of the NAND element 1425 is supplied to one of the input terminals of the NAND element 1439 of the flip flop 1442, but the other input terminal of the NAND element 1439 is supplied with the low output voltage of the NAND element 1435, so that the output voltage of the NAND element 1439, or that of the flip flop 1442, remains high. The output voltages of the other flip flops 1440, 1441 and 1445 are also kept low because the input terminals of their NAND elements 1433, 1437 and 1443 are suppplied with the high voltages.

When the number of wheel pulses supplied to the counter 1301 of the counting circuit 1300 during conduction of the gate circuit 700 is 40, the output terminal $\overline{4}$ of the decoder 1310 of the counting circuit 1300 produces a low voltage, while all the other output terminals produce high voltages. The output terminal $0$ of the other decoder 1307 also produces a low voltage. As the output terminal $\overline{4}$ of the decoder 1310 produces a low voltage, this low voltage is supplied to one of the input terminals of the NAND element 1443 of the flip flop 1445, so that the output voltage of this flip flop 1445 becomes high. One of the input terminals of the NAND element 1435 of the flip flop 1442 is also supplied with the low voltage, so that the output voltage of this NAND element 1435 becomes high. Since all the output terminals other than $\overline{4}$ of the decoder 1310 now produce high voltages, the output voltages of the NAND elements 1426, 1429, 1431 and 1447 become low, while the output voltages of the NAND elements 1423, 1425 and 1450 remain high. Hence, the output voltages of the flip flops 1440 and 1441 remain low because the input terminals of their NAND elements 1433 and 1437 are both supplied with the high voltages. However, the output voltage of the flip flop 1442 becomes low because the input terminals of its NAND element 1439 are both supplied with the high voltages. It is to be noted that in this case, the output voltage of the NAND element 1436 of the flip flop 1445 is low because all its input terminals are supplied with the high voltages.

The foregoing discussions are summarized in Table 3 given below.

While the number of wheel pulses supplied to the counter 1301 of the counting circuit 1300 during conduction of the gate circuit 700 increases in the above described cases, the following considerations are given to the opposite cases where the number of wheel pulses decreases.

When the number of wheel pulses supplied to the counter 1301 during conduction of the gate circuit 700 is from 39 to 36, the output terminal $\overline{3}$ of the decoder 1310 of the counting circuit 1300 produces a low voltage while all the other output terminals thereof produce high voltages. Also, one of the output terminals $\overline{5}$, $\overline{6}$, $\overline{7}$, $\overline{8}$ and $\overline{9}$ of the other decoder 1307 produces a low voltage while all the other output terminals thereof produce high voltages. As a result, the output voltage of the NAND element 1401 becomes low; the output voltage of the NAND element 1424 becomes low; and the output voltage of the NAND element 1431 becomes high. However, the output voltages of the NAND elements 1423, 1425 and 1450 are kept high because their input terminals are supplied with the low voltages. Thus, the output voltage of the NAND element 1436 becomes low because all of its input terminals are supplied with the high voltages. This low output voltage is supplied to one of the input terminals of the NAND element 1443, so that the output voltage of the flip flop 1445 remains high. The output voltages of the other flip flops 1440, 1441 and 1442 also remain low because the input terminals of their NAND element 1433, 1437 and 1439 are all supplied with the high voltages.

When the number of wheel pulses supplied to the counter 1301 of the counting circuit 1300 during conduction of the gate circuit 700 is from 34 to 30, one of the output terminals $\overline{0}$, $\overline{1}$, $\overline{2}$, $\overline{3}$ and $\overline{4}$ of the decoder 1307 of the counting circuit 1300 produces a low voltage. The output voltage of the NAND element 1401 becomes high, and the output voltage of the NAND element 1425 becomes low because its input terminals are both supplied with the high voltages. This low output voltage is supplied to one of the input terminals of the NAND element 1439, so that the output voltage of the flip flop 1442 becomes high. The output voltage of

TABLE 3

| | Number of wheel pulses received by counter 1301 of counting circuit 1300 | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 |
| Output voltage of flip flop 1440 | H | H | H | H | H | H | H | H | H | H | H | H | H | H | H | L | L | L | L | L | L | L | L | L | L | L | L | L | L | L | L | L | L | L | L | L | L | L | L | L | L |
| Output voltage of flip flop 1441 | L | L | L | L | L | L | L | L | L | L | L | L | L | L | L | H | H | H | H | H | H | H | H | H | H | H | H | H | H | H | H | L | L | L | L | L | L | L | L | L | L |
| Output voltage of flip flop 1442 | L | L | L | L | L | L | L | L | L | L | L | L | L | L | L | L | L | L | L | L | L | L | L | L | L | L | L | L | L | L | H | H | H | H | H | L | L | L | L | L | L |
| Output voltage of flip flop 1445 | L | L | L | L | L | L | L | L | L | L | L | L | L | L | L | L | L | L | L | L | L | L | L | L | L | L | L | L | L | L | L | L | L | L | L | H | H | H | H | H | H | the NAND element 1436 of the flip flop 1445 also becomes high because one of its input terminals is supplied with the low voltages. Hence the output voltage of the flip flop 1445 becomes low because the input terminals of its NAND element 1443 are both supplied with the high voltages. The output voltages of the other flip flops 1440 and 1441 are kept low because the output voltages of the NAND elements 1423 and 1450 are now both high and because the input terminals of the NAND elements 1433 and 1437 are both supplied with the high voltages.

When the number of wheel pulses supplied to the counter 1301 of the counting circuit 1300 during conduction of the gate circuit 700 is from 29 to 25, the output terminal $\overline{2}$ of the decoder 1310 of the counting circuit 1300 produces a low voltage while all the other output terminals thereof produce high voltages. Also, one of the output terminals $\overline{5}, \overline{6}, \overline{7}, \overline{8}$ and $\overline{9}$ of the other decoder 1307 produces a low voltage while all the other output terminals thereof produce high voltages. As a result, the output voltage of the NAND element 1401 becomes low; the output voltage of the NAND element 1431 also becomes low; and the output voltage of the NAND element 1425 becomes high. The output voltages of the NAND elements 1423 and 1450 are kept high because their input terminals are supplied with the low voltages. The output voltage of the NAND element 1435 of the flip flop 1442 is now low because its input terminals are all supplied with the high voltages. This low output voltage is supplied to one of the input terminals of the other NAND element 1439, so that the output voltage of the flip flop 1442 remains high. The output voltages of the other flip flops 1440, 1441 and 1445 are also kept low because the input terminals of their NAND elements 1433, 1437 and 1443 are all supplied with the high voltages.

When the number of wheel pulses supplied to the counter 1301 of the counting circuit 1300 during conduction of the gate circuit 700 is from 24 to 20, one of the output terminals $\overline{0}, \overline{1}, \overline{2}, \overline{3}$ and $\overline{4}$ of the decoder 1307 of the counting circuit 1300 produces a low voltage. The output voltage of the NAND element 1401 becomes high, while the output voltage of the NAND element 1424 becomes low. The output voltages of the NAND elements 1423, 1425 and 1428 are kept high because their input terminals are supplied with the low voltages. The output voltage of the NAND element 1446 becomes low because its input terminals are both supplied with the high voltages. This low output voltage is supplied to one of the input terminals of the NAND element 1449, so that its output voltage becomes high. The output voltage of the NAND element 1450 thus becomes low, and this low output voltage is supplied to one of the input terminals of the NAND element 1437 of the flip flop 1441 and to one of the input terminals of the NAND element 1435 of the flip flop 1442. As a result, the output voltage of the flip flop 1441 becomes high, while the output voltage of the flip flop 1442 becomes low. The output voltage of the flip flop 1440 remains iow because the output voltage of the NAND element 1423 is now kept low and because the input terminals of the NAND element 1433 are both supplied with the high voltages. The output voltage of the flip flop 1445 also remains low because the output terminal $\overline{4}$ of the decoder 1310 produces a high voltage.

When the number of wheel pulses supplied to the counter 1301 of the counting circuit 1300 during conduction of the gate circuit 700 is from 19 to 15, the output terminal $\overline{1}$ of the decoder 1310 of the counting circuit 1300 produces a low voltage while all the other output terminals thereof produce high voltages. Also, one of the output terminals $\overline{5}, \overline{6}, \overline{7}, \overline{8}$ and $\overline{9}$ of the decoder 1307 produces a low voltage while all the other output terminals thereof produce high voltages. The output voltage of the NAND element 1429 now becomes high, while the output voltage of the NAND element 1447 becomes low. The output voltage of the NAND element 1401 also becomes low, so that the output voltage of the NAND element 1424 becomes high. Thus, the output voltage of the NAND element 1428 becomes low because its input terminals are both supplied with the high voltages, while the output voltage of the NAND element 1446 becomes high because its input terminals are both supplied with the low voltages. However, the output voltage of the NAND element 1449 remains high because its input terminals are supplied with the high and low voltages, respectively, so that the output voltage of the NAND element 1450 remains low. The output voltages of the NAND elements 1423 and 1425 also remains high because their input terminals are supplied with the low voltages. Hence the output voltages of the flip flops 1440, 1441, 1442 and 1445 remain unchanged in magnitude.

When the number of wheel pulses supplied to the counter 1301 of the counting circuit 1300 during conduction of the gate circuit 700 is from 14 to 10, one of the output terminals of 0-1-2-3- and 4- the decooder 1307 of the counting circuit 1300 produces a low voltage while the remaining output terminals thereof produce high voltages. The output voltage of the NAND element 1401 becomes high, so that the output voltage of the NAND element 1424 becomes low. The output voltage of the NAND element 1428 becomes high, while the output voltage of the NAND element 1446 becomes high. Thus, the output voltage of the NAND element 1449 becomes low, and the output voltage of the NAND element 1450 becomes high. Since, however, the output voltages of the NAND elements 1423 and 1425 are kept high because their input terminals are supplied with the low voltages, the output voltages of the flip flops 1440, 1441, 1442 and 1445 all remain unchanged in magnitude.

When the number of wheel pulses supplied to the counter 1301 of the counting circuit 1300 during conduction of the gate circuit 700 is from 9 to 5, the output terminal $\overline{0}$ of the decoder 1310 of the counting circuit 1300 produces a low voltages while all the other output terminals thereof produce high voltages. Also, one of the output terminals $\overline{5}, \overline{6}, \overline{7}, \overline{8}$ and $\overline{9}$ of the other decoder 1307 produces a low voltage while the remaining output terminals produce high voltages. As a result, the output voltage of the NAND element 1429 becomes low; the output voltage of the NAND element 1426 becomes high; the output voltage of the NAND element 1426 becomes high; the output voltage of the NAND element 1401 becomes low; and the output voltage of the NAND element 1424 becomes high. However, the output voltages of the NAND elements 1428 and 1446 are kept high because their input terminals are supplied with the low voltages. The output voltage of the NAND element 1450 remains high, and the output voltages of the NAND elements 1423 and 1425 also remain high because their input terminals are supplied with the low voltages. Hence the output voltages of the flip flops 1440, 1441, 1442 and 1445 remain unchanged in magnitude.

When the number of wheel pulses supplied to the counter 1301 of the counting circuit 1300 during conduction of the gate circuit 700 is 4 or less, one of the output terminals $\overline{0}, \overline{1}, \overline{2}, \overline{3}$ and $\overline{4}$ of the decoder 1307 of the counting circuit 1300 produces a low voltage while the remaining output terminals thereof produce high voltages. The output voltage of the NAND element 1401 becomes high, so that the output voltage of the NAND element 1424 becomes low. The output voltage of the NAND element 1423 becomes low because its input terminals are both supplied with the high voltages. This low output voltage is supplied to one of the input terminals of the NAND element 1433 of the flip flop 1440, so that the output voltage of this flip flop 1440 becomes high. The low output voltage of the NAND element 1423 is also supplied to one of the input terminals of the NAND element 1434 of the flip flop 1441, so that the output voltage of this NAND element 1434 becomes high. In this instance, the output voltages of the NAND elements 1428 and 1446 are kept high because their input terminals are supplied with the low voltages, and, as a result, the output voltage of the NAND element 1450 is also kept high. Hence the input terminals of the NAND element 1437 of the flip flop 1441 are both supplied with the high voltages, so that the output voltage of this flip flop 1441 becomes low. The output voltage of the flip flop 1442 remains low because the output voltage of the NAND element 1425 is now high. The output voltage of the flip flop 1445 also remains low because the output terminal $\overline{4}$ of the decoder 1310 of the counting circuit 1300 produces a high voltage as aforesaid.

Described hereinbelow are the variations in the output voltages of the flip flops 1440, 1441, 1442 and 1445 in two cases where: (1) the switches 1411 and 1412 are both open while either one or both of the switches 1418 and 1419 are closed; and (2) the switches 1418 and 1419 are both open while either one or both of the switches 1411 and 1412 are closed.

In the first case, the output voltage of the NAND element 1409 remains high because its input terminal is supplied with a low voltage. Thus, the output voltage of the NAND element 1401 is high not only when one of the output terminals $\overline{0}, \overline{1}, \overline{2}, \overline{3}$ and $\overline{4}$ of the decoder 1307 of the counting circuit 1300 produces a low voltage but when the output terminal $\overline{7}$ of the decoder 1307 produces a low voltage, because then the output voltage of the NAND element 1408 is high and the output voltage of the NAND element 1407 is low. Accordingly, in the case where the number of wheel pulses supplied to the counter 1301 of the counting circuit 1300 during conduction of the gate circuit 700 increases, the output voltages of the flip flops 1440, 1441, 1442 and 1445 vary in the same way as in the case where the switches 1411, 1412, 1418 and 1419 are all open. In the case where the number of wheel pulses decreases, the output voltage of the flip flop 1442 becomes high and the output voltage of the flip flop 1445 becomes low when the pulse number becomes 37; the output voltage of the flip flop 1441 becomes high and the output voltage of the flip flop 1442 becomes low when the pulse number becomes 27; the output voltage of the flip flop 1440 becomes high and the output voltage of the flip flop 1441 becomes low when the pulse number becomes 7.

In the second case, the output voltage of the NAND element 1408 remains high because its input terminal is supplied with a low voltage. Thus, the output voltage of the NAND element 1401 is high not only when one of the output terminals $\overline{0}, \overline{1}, \overline{2}, \overline{3}$ and $\overline{4}$ of the decoder 1307 of the counting circuit 1300 produces a low voltage but when the output terminal $\overline{8}$ of the decoder 1307 produces a low voltage, because then the output voltage of the NAND element 1409 is high and the output voltage of the NAND element 1407 low. Accordingly, in the case where the number of wheel pulses supplied to the counter 1301 of the counting circuit 1300 during conduction of the gate circuit 700 increases, the output voltages of the flip flops 1440, 1441, 1442 and 1445 vary in the same way as in the case where the switches 1441, 1412, 1418 and 1419 are all open. In the case where the number of wheel pulses decreases, on the other hand, the output voltage of the flip flop 1442 becomes high and the output voltage of the flip flop 1445 becomes low when the pulse number becomes 38; the output voltage of the flip flop 1441 becomes high and the output voltage of the flip flop 1442 becomes low when the pulse number becomes 28; and the output voltage of the flip flop 1440 becomes high and the output voltage of the flip flop 1441 becomes low when the pulse number becomes 8.

The foregoing considerations are summarized in Table 4.

TABLE 4

| | | NUMBER OF WHEEL PULSES RECEIVED BY COUNTER 1301 OF COUNTING CIRCUIT 1300 | | | | | | | | | | | | | | | | | | |
|---|---|---|---|---|---|---|---|---|---|---|---|---|---|---|---|---|---|---|---|---|
| | | 40 | 39 | 38 | 37 | 36 | 35 | 34 | 33 | 32 | 31 | 30 | 29 | 28 | 27 | 26 | 25 | 24 | 23 | 22 | 21 |
| WHEN SWITCHES 1418 AND 1419 ARE OPEN AND ONE OR BOTH OF SWITCHES 1411 AND 1412 ARE CLOSED | OUTPUT VOLTAGE OF FLIP FLOP 1440 | L | L | L | L | L | L | L | L | L | L | L | L | L | L | L | L | L | L | L | L |
| | OUTPUT VOLTAGE OF FLIP FLOP 1441 | L | L | L | L | L | L | L | L | L | L | L | H | H | H | H | H | H | H | H | H |
| | OUTPUT VOLTAGE OF FLIP FLOP 1442 | L | L | H | H | H | H | H | H | H | H | H | H | L | L | L | L | L | L | L | L |
| | OUTPUT VOLTAGE OF FLIP FLOP 1445 | H | H | L | L | L | L | L | L | L | L | L | L | L | L | L | L | L | L | L | L |
| WHEN SWITCHES 1411 AND 1412 ARE OPEN AND ONE OR BOTH OF SWITCHES 1418 AND 1419 ARE CLOSED | OUTPUT VOLTAGE OF FLIP FLOP 1440 | L | L | L | L | L | L | L | L | L | L | L | L | L | L | L | L | L | L | L | L |
| | OUTPUT VOLTAGE OF FLIP FLOP 1441 | L | L | L | L | L | L | L | L | L | L | L | L | H | H | H | H | H | H | H | H |
| | OUTPUT VOLTAGE OF FLIP FLOP 1442 | L | L | L | H | H | H | H | H | H | H | H | H | L | L | L | L | L | L | L | L |
| | OUTPUT VOLTAGE OF FLIP FLOP 1445 | H | H | H | L | L | L | L | L | L | L | L | L | L | L | L | L | L | L | L | L |
| WHEN ALL OF SWITCHES 1411, 1412, 1418 AND 1419 ARE OPEN | OUTPUT VOLTAGE OF FLIP FLOP 1440 | L | L | L | L | L | L | L | L | L | L | L | L | L | L | L | L | L | L | L | L |
| | OUTPUT VOLTAGE OF FLIP FLOP 1441 | L | L | L | L | L | L | L | L | L | L | L | L | L | L | L | H | H | H | H | H |
| | OUTPUT VOLTAGE OF FLIP FLOP 1442 | L | L | L | L | L | L | H | H | H | H | H | H | H | H | H | L | L | L | L | L |
| | OUTPUT VOLTAGE OF FLIP FLOP 1445 | H | H | H | H | H | H | L | L | L | L | L | L | L | L | L | L | L | L | L | L |

TABLE 4 (Continued)

| | | NUMBER OF WHEEL PULSES RECEIVED BY COUNTER 1301 OF COUNTING CIRCUIT 1300 | | | | | | | | | | | | | | | | | | | | |
|---|---|---|---|---|---|---|---|---|---|---|---|---|---|---|---|---|---|---|---|---|---|---|
| | | 20 | 19 | 18 | 17 | 16 | 15 | 14 | 13 | 12 | 11 | 10 | 9 | 8 | 7 | 6 | 5 | 4 | 3 | 2 | 1 | 0 |
| WHEN SWITCHES 1418 AND 1419 ARE OPEN AND ONE OR BOTH OF SWITCHES 1411 AND 1412 ARE CLOSED | OUTPUT VOLTAGE OF FLIP FLOP 1440 | L | L | L | L | L | L | L | L | L | L | L | L | H | H | H | H | H | H | H | H | H |
| | OUTPUT VOLTAGE OF FLIP FLOP 1441 | H | H | H | H | H | H | H | H | H | H | H | H | L | L | L | L | L | L | L | L | L |
| | OUTPUT VOLTAGE OF FLIP FLOP 1442 | L | L | L | L | L | L | L | L | L | L | L | L | L | L | L | L | L | L | L | L | L |
| | OUTPUT VOLTAGE OF FLIP FLOP 1445 | L | L | L | L | L | L | L | L | L | L | L | L | L | L | L | L | L | L | L | L | L |
| WHEN SWITCHES 1411 AND 1412 ARE OPEN AND ONE OR BOTH OF SWITCHES 1418 AND 1419 ARE CLOSED | OUTPUT VOLTAGE OF FLIP FLOP 1440 | L | L | L | L | L | L | L | L | L | L | L | L | H | H | H | H | H | H | H | H | H |
| | OUTPUT VOLTAGE OF FLIP FLOP 1441 | H | H | H | H | H | H | H | H | H | H | H | H | L | L | L | L | L | L | L | L | L |
| | OUTPUT VOLTAGE OF FLIP FLOP 1442 | L | L | L | L | L | L | L | L | L | L | L | L | L | L | L | L | L | L | L | L | L |
| | OUTPUT VOLTAGE OF FLIP FLOP 1445 | L | L | L | L | L | L | L | L | L | L | L | L | L | L | L | L | L | L | L | L | L |
| WHEN ALL OF SWITCHES 1411, 1412, 1418 AND 1419 ARE OPEN | OUTPUT VOLTAGE OF FLIP FLOP 1440 | L | L | L | L | L | L | L | L | L | L | L | L | L | L | L | H | H | H | H | H | H |
| | OUTPUT VOLTAGE OF FLIP FLOP 1441 | H | H | H | H | H | H | H | H | H | H | H | H | H | H | H | L | L | L | L | L | L |
| | OUTPUT VOLTAGE OF FLIP FLOP 1442 | L | L | L | L | L | L | L | L | L | L | L | L | L | L | L | L | L | L | L | L | L |
| | OUTPUT VOLTAGE OF FLIP FLOP 1445 | L | L | L | L | L | L | L | L | L | L | L | L | L | L | L | L | L | L | L | L | L |

Figure 22:
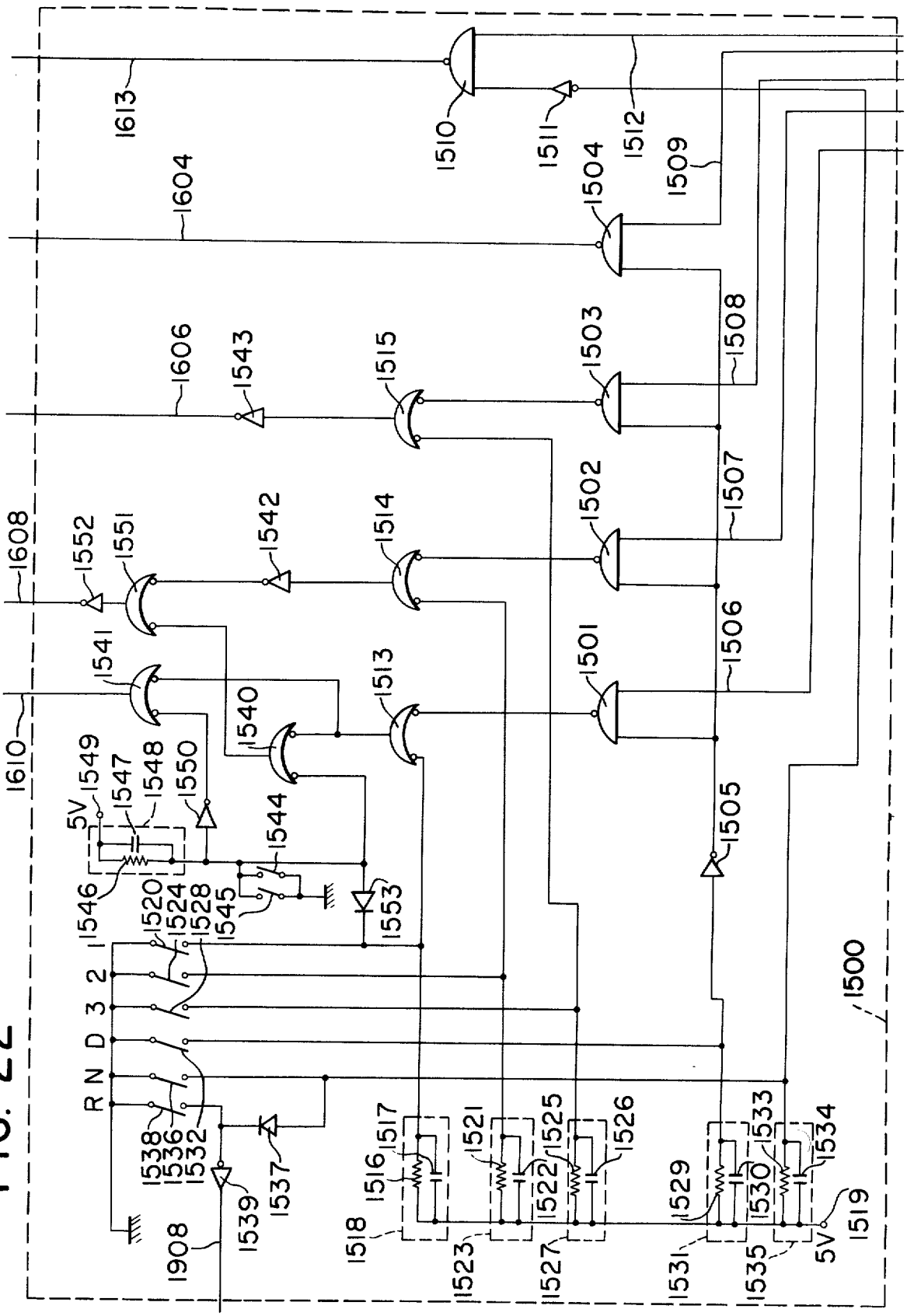
FIG. 22 is a diagram showing a manual shift sensing circuit.

FIG. 22 illustrates the configuration of a manual shift sensing circuit 1500. One of the input terminals of each of its two-input NAND elements 1501, 1502, 1503 and 1504 is connected to the output terminal of a NAND element 1505. The other input terminals of these two-input NAND elements are connected to the output terminals of the flip flops 1440, 1441, 1442 and 1445 of the hysteresis control circuit 1400, FIG. 21, via conductors 1506, 1507, 1508 and 1509, respectively. One of the input terminals of a two-input NAND element 1510 is connected to the output terminal of a NAND element 1511, while the other input terminal thereof is connected to the output terminal of the NAND element 1426 of the hysteresis control circuit 1400 via a conductor 1512. The output terminals of the NAND elements 1501, 1502 and 1503 are connected to one of the input terminals of two-input NAND elements 1513, 1514 and 1515, respectively.

The other input terminal of the NAND element 1513 is connected to a supply terminal 1519 through a chatter preventing circuit 1518 comprising a resistance 1516 and capacitor 1517 and is also grounded through a "low" switch 1502. The other input terminal of the NAND element 1514 is connected to the supply terminal 1519 through a chatter preventing circuit 1523 comprising a resistance 1521 and capacitor 1522, and is also grounded through a "second" switch 1524. The other input terminal of the NAND element 1515 is connected to the supply terminal 1519 through a chatter preventing circuit 1527 comprising a resistance 1525 and capacitor 1526, and is also grounded through a "third" switch 1528. The input terminal of the NAND elements 1505 is also connected to the supply terminal 1519 through a chatter preventing circuit 1531 comprising a resistance 1529 and capacitor 1530, and is also grounded through a "drive" switch 1532. The input terminal of the NAND element 1511 is connected to the supply terminal 1519 through a chatter preventing circuit 1535 comprising a resistance 1533 and capacitor 1534, is also grounded through a "neutral" switch 1536, and is further connected to the input terminal of a diode 1537. The output terminal of this diode 1537 is grounded through a "reverse" switch 1538 and is also connected to the input terminal of a NAND element 1539.

The output terminal of the NAND element 1513 is connected to one of the input terminals of a two-input NAND element 1540 and also to one of the input terminals of a two-input NAND element 1541. The output terminals of the NAND elements 1514 and 1515 are connected to the input terminals of NAND elements 1542 and 1543, respectively. The other input terminal of the NAND element 1540 and the input terminal of a NAND element 1550 are grounded through a switch 1544 responsive to the payload of the vehicle and another switch 1545 responsive to the inclination of the road, are connected to a supply terminal 1549 through a chatter preventing circuit 1548 comprising a resistance 1546 and capacitor 1547, and are further grounded through a diode 1553 and the "first" switch 1520. The output terminal of the NAND element 1540 is connected to one of the input terminals of a two-input NAND element 1551, the other input terminal of which is connected to the output terminal of the NAND element 1542. The output terminal of this NAND element 1551 is connected to the input terminal of a NAND element 1552.

The aforesaid "low" switch 1520, "second" switch 1524, "third" switch 1528, "drive" switch 1532, "neutral" switch 1536, and "reverse" switch 1538 are associated with the manual shift lever of the vehicle, in such a manner that when the manual shift lever is moved to the "second" position, for instance, the "second" switch 1524 is closed while all the other switches are left open.

The switch 1544 responsive to vehicle payload may be of such a type that one of its contacts is attached to the axle of the vehicle and the other contact to the vehicle chassis. Normally spaced apart from each other, the contact pair is closed when the vehicle payload exceeds a predetermined limit thereby moving one or the other of the contacts. This switch 1544 may also be provided for the known road sensing valve. The other switch 1545 responsive to the inclination of the road may be of such a type that one of its contacts is attached to a stationary part of the vehicle so as to be inclined with the vehicle, while the other contact is always kept vertical by means of a weight or the like irrespective of the inclination of the vehicle. Being normally open, this switch 1545 is closed only when the road inclination reaches a predetermined limit thereby causing one of the contacts to move into contact with the other. Alternatively, the known mercury switch may be used for this switch 1545.

In the circuit 1500 of the above described configuration, when either or both of the switch 1544 responsive to vehicle payload and the switch 1545 responsive to road inclination are closed, and when the "drive" switch 1532 is also closed, a low voltage is supplied to the input terminal of the NAND element 1550, so that the output voltage of this NAND element remains high. The output voltage of the NAND element 1540 also remains high because the low voltage is supplied to one of its input terminals. The output voltage of the NAND element 1505 also remains high because the "drive" switch 1532 is now closed as aforesaid. The output voltage of the NAND element 1539 remains low because the "reverse" switch 1538 is opened and because a high voltage is thus supplied to its input terminal. Since the "neutral" switch 1536 is now opened, the output voltage of the NAND element 1511 remains low. This low input voltage is supplied to one of the input terminals of the NAND element 1510, so that its output voltage remains high.

When, in this instance, the output voltage of the flip flop 1440 of the hysteresis control circuit 1400, FIG. 21, is high and the output voltages of the other flip flops 1441, 1442 and 1445 are low, the output voltage of the NAND element 1501 becomes low because then its input terminals are both supplied with the high voltages. The output voltages of the NAND elements 1502, 1503 and 1504 become high because the low output voltages of the above noted flip flops are supplied to their input terminals. The output voltage of the NAND element 1513 becomes high because the low output voltage of the NAND element 1501 is supplied to one of its input terminals. The output voltages of the NAND elements 1514 and 1515 become low because the "second" switch 1524 and "third" switch 1528 are both opened and because their input terminals are thus supplied with the high voltages. The output voltage of the NAND element 1541 becomes low because its input terminals are both supplied with the high voltages. The output voltage of the NAND element 1543 becomes high because its input terminal is supplied with the low output voltage of the NAND element 1515. The output voltage of the NAND element 1542 becomes high because its input terminal is supplied with the low output voltage of the NAND element 1514. The output voltage of the NAND element 1551 becomes low because its input terminals are both supplied with the high voltages. This low output voltage is supplied to the input terminal of the NAND element 1522, so that its output voltage becomes high.

When, in the above instance, the output voltage of the flip flop 1441 of the hysteresis control circuit 1400 is high and the output voltages of the other flip flops 1440, 1442 and 1445 are low, the output voltage of the NAND element 1502 becomes low because its input terminals are both supplied with the high voltages. The output voltages of the NAND elements 1501, 1503 and 1504 become high because their input terminals are supplied with the low voltages. The output voltage of the NAND element 1514 thus becomes high, while the output voltages of the NAND elements 1513 and 1515 become low because their input terminals are supplied with the high voltages. The low output voltage of the NAND element 1513 is supplied to one of the input terminals of the NAND element 1541, which then produces a high output voltage. The output voltage of the NAND element 1543 also becomes high because its input terminal is supplied with the low output voltage of the NAND element 1515. The output voltage of the NAND element 1542 becomes low because its input terminal is supplied with the high output voltage of the NAND element 1514. This low output voltage is supplied to one of the input terminals of the NAND element 1551, which then supplies a high output voltage to the input terminal of the NAND element 1552, so that this NAND element 1552 produces a low output voltage.

When the output voltage of the flip flop 1442 of the hysteresis control circuit 1400 is high and the output voltages of the other flip flops 1440, 1441 and 1445 are low, the output voltage of the NAND element 1503 becomes low because its input terminals are both supplied with the high voltages. The output voltages of the NAND elements 1501, 1502 and 1504 become high because their input terminals are supplied with the low voltages. The low output voltage of the NAND element 1503 is supplied to one of the input terminals of the NAND element 1515, so that its output voltage becomes high. The output voltage of the NAND element 1543 thus becomes low. The output voltages of the NAND elements 1541 and 1552 become high because the output voltages of the NAND elements 1501 and 1502 are now both high.

When the output voltage of the flip flop 1445 of the hysteresis control circuit 1400 is high and the output voltages of the other flip flops 1440, 1441 and 1442 are low, the output voltage of the NAND element 1504 becomes low because its input terminals are both supplied with the high voltages. The output voltages of the NAND elements 1501, 1502 and 1503 becomes high because their input terminals are supplied with the low voltages. Hence the output voltages of the NAND elements 1541, 1552 and 1543 all become high.

It will now be supposed that the switch 1544 responsive to vehicle payload and the switch 1545 responsive to road inclination are both opened, and that the "drive" switch 1532 is closed. Then the output voltage of the NAND element 1550 becomes low because its input terminal is supplied with a high voltage. This low output voltage is supplied to one of the input terminals of the NAND element 1541, so that its output voltage remains high. The output voltage of the NAND element 1505 is now high because the "drive" switch 1532 is now closed.

When, in this instance, the output voltage of the flip flop 1440 of the hysteresis control circuit 1400 is high and the output voltages of the other flip flops 1441, 1442 and 1445 are low, the output voltage of the NAND element 1501 becomes low, while the output voltages of the NAND elements 1502, 1503 and 1504 become high, as previously mentioned. Thus, the output voltages of the NAND elements 1514 and 1515 become low, and the output voltages of the NAND elements 1542 and 1543 become high. Only the output voltage of the NAND element 1513 becomes high. The output voltage of the NAND element 1540 becomes low because its input terminals are both supplied with the high voltages, so that the output voltage of the NAND elements 1551 becomes high and the output foltage of the NAND element 1552 becomes low.

When, in the above instance, the output voltage of the flip flop 1441 of the hysteresis control circuit 1400 is high and the output voltages of the other flip flops 1440, 1442 and 1445 are low, the output voltage of the NAND element 1552 becomes low, while the output voltages of the NAND elements 1543 and 1504 become high, as is already apparent.

When the output voltage of the flip flop 1442 is high and the output voltages of the other flip flops 1440, 1441 and 1445 are low, the output voltage of the NAND element 1543 becomes low, while the output voltages of the NAND elements 1504 and 1552 become high.

When the output voltage of the flip flop 1445 is high and the output voltages of the other flip flops 1440, 1441 and 1442 are low, the output voltage of the NAND element 1504 becomes low, while the output voltages of the NAND elements 1543 and 1552 becomes high.

When the shift lever is set in either of the "low," "second," "third," "neutral" and "reverse" positions, the "drive" switch 1532 is opened. Then the output voltage of the NAND element 1505 becomes low because then a high voltage is supplied to its input terminal. This low output voltage of the NAND element 1505 is supplied to the input terminals of the NAND elements 1501, 1502, 1503 and 1504, so that the output voltages of these NAND elements are kept high regardless of the magnitudes of the output voltages of the flip flops 1440, 1441, 1442 and 1445 of the hysteresis control circuit 1400.

When now the manual shift lever is set in the "low" position, the "low" switch 1520 is closed, so that a low voltage is supplied to one of the input terminals of the NAND element 1540 and to the input terminal of the NAND element 1550, thereby causing these NAND elements to produce high output voltages. The output voltage of the NAND element 1541 becomes low because its input terminals are both supplied with the high voltages. Since not only the "drive" switch 1532 but the "second" switch 1524, "third" switch 1528, "neutral" switch 1536 and "reverse" switch 1538 are now all opened, the output voltages of the NAND elements 1510, 1543 and 1552 in addition to the NAND element 1504 become high. The output voltage of the NAND element 1539 becomes low.

When the manual shift lever is set in the "second" position, the "second" switch 1524 is closed. The output voltage of the NAND element 1514 now becomes high because a low voltage is supplied to one of its input terminals. As a result, the NAND element 1542 produces a low output voltage, which is supplied to one of the input terminals of the NAND element 1551. Since the output voltage of this NAND element 1551 thus becomes high, the NAND element 1552 produces a low output voltage. In this case, the output voltages of the NAND elements 1504, 1510, 1541 and 1543 become high because the switches 1520, 1528, 1532 and 1536 are opened.

When the manual shift lever is set in the "third" position, the "third" switch 1528 is closed. The output voltage of the NAND element 1515 becomes high because a low voltage is supplied to one of its input terminals. This high output voltage is supplied to the input terminal of the NAND element 1543, which then produces a low output voltage. In this case, the output voltages of the NAND elements 1504, 1510, 1541 and 1552 become high because the switches 1520, 1524, 1532 and 1536 are open, while the output voltage of the NAND element 1539 becomes low because the switch 1538 is open.

When the manual shift lever is set in the "neutral" position, the "neutral" switch 1536 is closed. A low voltage is supplied to the input terminal of the NAND element 1511, so that this NAND element produces a high output voltage. Thus, when the output voltage of the NAND element 1426 of the hysteresis control circuit 1400 is high, that is, when the number of wheel pulses supplied to the counter 1301 of the counting circuit 1300 through the gate circuit 700 of FIG. 20 is less than 10, the input terminals of the NAND element 1510 are both supplied with the high voltages, so that the output voltage of this NAND element 1510 becomes low. However, when the number of wheel pulses supplied to the counter 1301 of the counting circuit 1300 is 10 or more, the output voltage of the NAND element 1426 of the hysteresis control circuit 1400 becomes low, so that the output voltage of the NAND element 1510 becomes high. It is to be noted that in this case, the output voltages of the NAND elements 1504, 1541, 1543 and 1552 become high as the switches 1520, 1524, 1528 and 1532 are opened, while the output voltage of the NAND element 1539 becomes low as the switch 1538 is opened.

When the manual shift lever is set in the "reverse" position, the "reverse" switch 1538 is closed. A low voltage is now supplied to the input terminal of the NAND element 1539, so that this NAND element produces a high output voltage. A low voltage is also supplied to the input terminal of the NAND element 1511, so that the NAND element produces a high output voltage. Hence, the output voltage of the NAND element 1510 is low in the case where the number of wheel pulses supplied to the counter 1301 through the gate circuit 700 is less than 10.

The foregoing discussions are summarized in Table 5.

TABLE 5

| | "DRIVE" SWITCH 1532 CLOSED ||||||||
|---|---|---|---|---|---|---|---|---|
| | SWITCHES 1544 AND 1545 OPEN |||| ONE OR BOTH OF SWITCHES 1544 AND 1545 CLOSED ||||
| | OUTPUT VOLTAGE OF FLIP FLOP 1440 IS HIGH AND OUTPUT VOLTAGES OF FLIP FLOPS 1441,1442 AND 1445 ARE LOW | OUTPUT VOLTAGE OF FLIP FLOP 1441 IS HIGH AND OUTPUT VOLTAGES OF FLIP FLOPS 1440, 1442 AND 1445 ARE LOW | OUTPUT VOLTAGE OF FLIP FLOP 1442 IS HIGH AND OUTPUT VOLTAGE OF FLIP FLOPS 1440,1441 AND 1445 ARE LOW | OUTPUT VOLTAGE OF FLIP FLOP 1445 IS HIGH AND OUTPUT VOLTAGES OF FLIP FLOPS 1440,1441 AND 1442 ARE LOW | OUTPUT VOLTAGE OF FLIP FLOP 1440 IS HIGH AND OUTPUT VOLTAGES OF FLIP FLOPS 1441,1442 AND 1445 ARE LOW | OUTPUT VOLTAGE OF FLIP FLOP 1441 IS HIGH AND OUTPUT VOLTAGES OF FLIP FLOPS 1440,1442 AND 1455 ARE LOW | OUTPUT VOLTAGE OF FLIP FLOP 1442 IS HIGH AND OUTPUT VOLTAGES OF FLIP FLOPS 1440,1441 AND 1445 ARE LOW | OUTPUT VOLTAGE OF FLIP FLOP 1445 IS HIGH AND OUTPUT VOLTAGES OF FLIP FLOPS 1440,1441 AND 1442 ARE LOW |
| OUTPUT VOLTAGE OF NAND ELEMENT 1504 | H | H | H | L | H | H | H | L |
| OUTPUT VOLTAGE OF NAND ELEMENT 1510 | H | H | H | H | H | H | H | H |
| OUTPUT VOLTAGE OF NAND ELEMENT 1539 | L | L | L | L | L | L | L | L |
| OUTPUT VOLTAGE OF NAND ELEMENT 1541 | L | H | H | H | H | H | H | H |
| OUTPUT VOLTAGE OF NAND ELEMENT 1543 | H | H | L | H | H | H | L | H |
| OUTPUT VOLTAGE OF NAND ELEMENT 1552 | H | L | H | H | L | L | H | H |

TABLE 5 (Continued)

| | "FIRST" SWITCH 1520 CLOSED | "SECOND" SWITCH 1524 CLOSED | "THIRD" SWITCH 1528 CLOSED | "NEUTRAL" SWITCH 1536 CLOSED || "REVERSE" SWITCH 1538 ||
|---|---|---|---|---|---|---|---|
| | | | | OUTPUT VOLTAGE OF NAND ELEMENT 1426 IS HIGH | OUTPUT VOLTAGE OF NAND ELEMENT 1426 IS LOW | OUTPUT VOLTAGE OF NAND ELEMENT 1426 IS HIGH | OUTPUT VOLTAGE OF NAND ELEMENT 1426 IS LOW |
| OUTPUT VOLTAGE OF NAND ELEMENT 1504 | H | H | H | H | H | H | H |
| OUTPUT VOLTAGE OF NAND ELEMENT 1510 | H | H | H | L | H | L | H |
| OUTPUT VOLTAGE OF NAND ELEMENT 1539 | L | L | L | L | L | H | H |
| OUTPUT VOLTAGE OF NAND ELEMENT 1541 | L | H | H | H | H | H | H |
| OUTPUT VOLTAGE OF NAND ELEMENT 1543 | H | H | L | H | H | H | H |
| OUTPUT VOLTAGE OF NAND ELEMENT 1552 | H | L | H | H | H | H | H |

Figure 23:
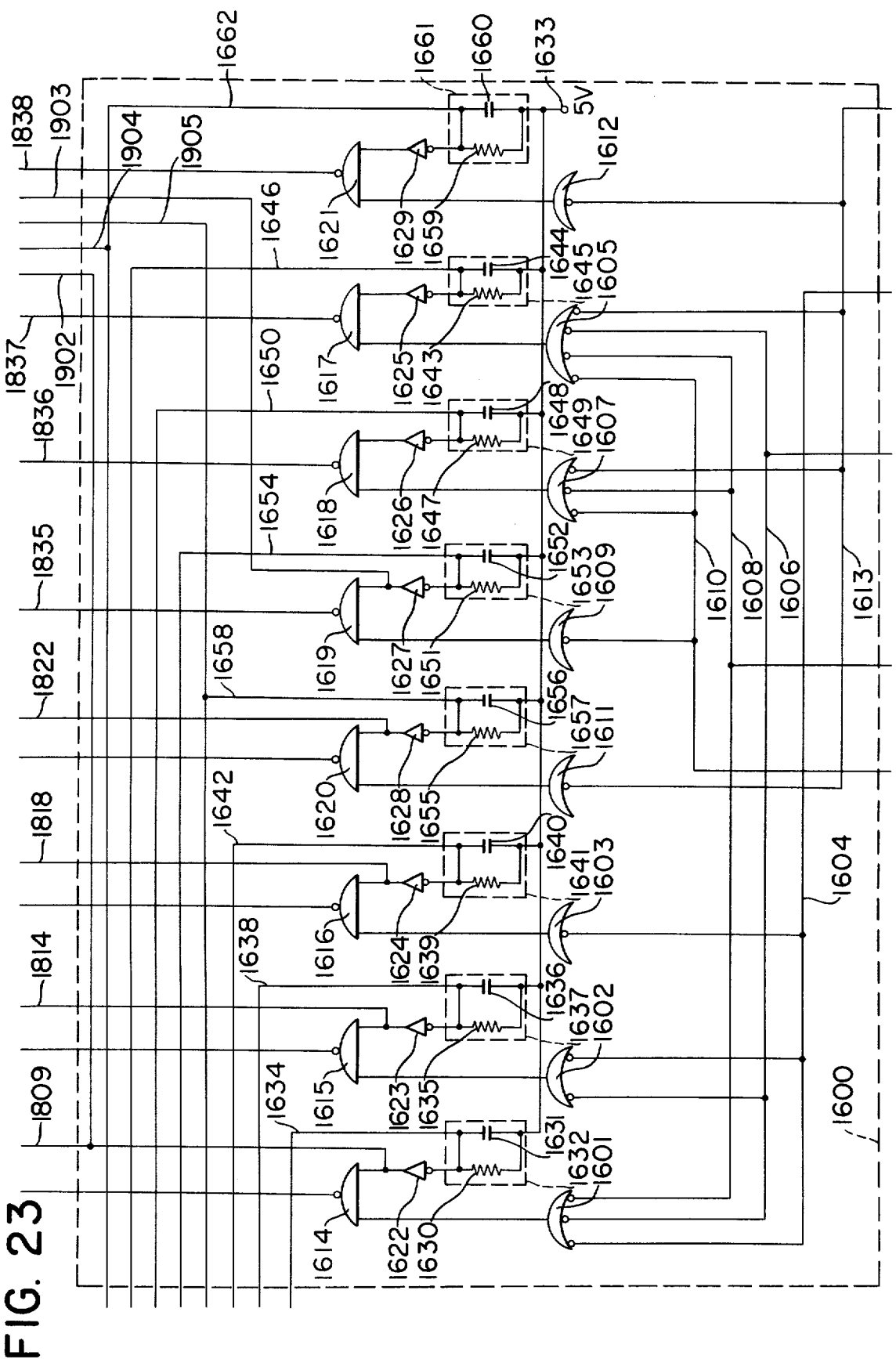
FIG. 23 is a diagram showing an up-and-down shift sensing circuit.

FIG. 23 illustrates the configuration of an up-and-down sensing circuit. One of the input terminals of each of a three-input NAND element 1601, two-input NAND element 1602 and the input terminal of a NAND element 1603 are connected to the output terminal of the NAND element 1504 of the above described manual shift sensing circuit 1500 of FIG. 22 through a conductor 1604. The other input terminals of the NAND elements 1601 and 1602 and one of the input terminals of a four-input NAND element 1605 are connected to the output terminal of the NAND element 1543 of the manual shift sensing circuit 1500 through a conductor 1606. The remaining input terminal of the NAND element 1601, one of the input terminals of a three-input NAND element 1607, and one of the other input terminals of the NAND element 1605 are connected to the output terminal of the NAND element 1552 of the manual shift sensing circuit 1500 through a conductor 1608. One of the other input terminals of each of the NAND elements 1605 and 1607 and the input terminal of a NAND element 1609 are connected to the output terminal of the NAND element 1541 of the manual shift sensing circuit 1500 through a conductor 1610. The remaining input terminals of the NAND elements 1605 and 1607 and the input terminals of NAND elements 1611 and 1612 are connected to the output terminal of the NAND element 1510 of the manual shift sensing circuit 1500 through a conductor 1613.

The output terminal of the NAND element 1601 is connected to one of the input terminals of a two-input NAND element 1614. The output terminal of the NAND element 1602 is connected to one of the input terminals of a two-input NAND element 1615. The output terminal of the NAND element 1603 is connected to one of the input terminals of a two-input NAND element 1616. The output terminal of the NAND element 1605 is connected to one of the input terminals of a two-input NAND element 1617. The output terminal of the NAND element 1607 is connected to one of the input terminals of a two-input element 1618. The output terminal of the NAND element 1609 is connected to one of the input terminals of a two-input NAND element 1619. The output terminal of the NAND element 1611 is connected to one of the input terminals of a two-input NAND element 1620. The output terminal of the NAND element 1612 is connected to one of the input terminals of a two-input NAND element 1621.

The other input terminal of the NAND element 1614 is connected to the output terminal of a NAND element 1622. The other input terminal of the NAND element 1615 is connected to the output terminal of a NAND element 1623. The other input terminal of the NAND element 1616 is connected to the output terminal of a NAND element 1624. The other input terminal of the NAND element 1617 is connected to the output terminal of a NAND element 1625. The other input terminal of the NAND element 1618 is connected to the output terminal of a NAND element 1626. The other input terminal of the NAND 1619 is connected to the output terminal of a NAND element 1627. The other input terminal of the NAND element 1620 is connected to the output terminal of a NAND element 1628. The other input terminal of the NAND element 1621 is connected to the output terminal of a NAND element 1629.

Figure 26:
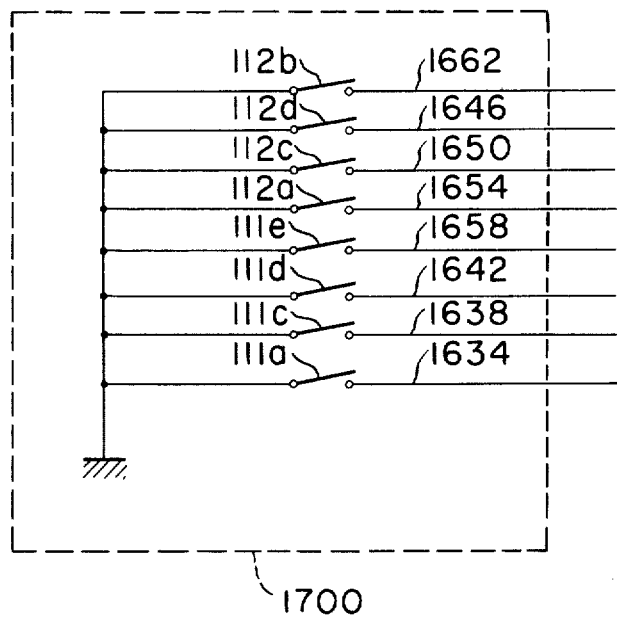
FIG. 26 is a circuit diagram of a gear position detecting section.

The input terminal of the NAND element 1622 is connected to a supply terminal 1633 through a chatter preventing circuit 1632 comprising a resistance 1630 and capacitor 1631 and is also grounded through a conductor 1634 and a switch 111*a* of a gear position detecting section 1700 shown in FIG. 26. The input terminal of the NAND element 1623 is connected to the supply terminal 1633 through a chatter preventing circuit 1637 comprising a resistance 1635 and capacitor 1636 and is also grounded through a conductor 1638 and a switch 111*c* of the gear position detecting section 1700. The input terminal of the NAND element 1624 is connected to the supply terminal 1633 through a chatter preventing circuit 1641 comprising a resistance 1639 and capacitor 1640 and is also grounded through a conductor 1642 and a switch 111*d* of the gear position detecting section 1700. The input terminal of the NAND element 1625 is connected to the supply terminal 1633 through a chatter preventing circuit 1645 comprising a resistance 1643 and capacitor 1644 and is also grounded through a conductor 1646 and a switch 112*d* of the gear position detecting section 1700. The input terminal of the NAND element 1626 is connected to the supply terminal 1633 through a chatter preventing circuit 1649 comprising a resistance 1647 and capacitor 1648 and is also grounded through a conductor 1650 and a switch 112*c* of the gear position detecting section 1700. The input terminal of the NAND element 1627 is connected to the supply terminal 1633 through a chatter preventing circuit 1653 comprising a resistance 1651 and capacitor 1652 and is also grounded through a conductor 1654 and a switch 112*a* of the gear position detecting section 1700. The input terminal of the NAND element 1628 is connected to the supply terminal 1633 through a chatter preventing circuit 1657 comprising a resistance 1655 and capacitor 1656 and is also grounded through a conductor 1658 and a switch 111*e* of the gear position detecting section 1700. The input terminal of the NAND element 1629 is connected to the supply terminal 1633 through a chatter preventing circuit 1661 comprising a resistance 1659 and capacitor 1660 and is also grounded through a conductor 1662 and a switch 112*b* of the gear position detecting section 1700 of FIG. 26 operate in response to the gear positions. When the gear position is in "first," the switches 111*a* and 111*e* are closed while the other switches are open. When the gear position is in "second," the swtiches 111*c*, 112*a* and 112*b* are closed while the other switches are open. When the gear position is in "third," the switches 111*d* and 112*c* are closed while the others are open. When the gear position is in "overdrive," the switch 112*d* is closed while the others are open. When the gear position is in "neutral," in the switches 111*a* and 112*a* are closed while the others are open.

With the above described configuration of the circuit 1600 in mind, it will be supposed that the output voltage of the NAND element 1541 of the manual shift sensing circuit 1500 is low, and that the output voltages of the NAND elements 1504, 1510, 1543 and 1552 are high. The low output voltage of the NAND element 1541 is supplied to the input terminals of the NAND elements 1605, 1607 and 1609, so that the output voltages of these NAND elements become high. The output voltages of the NAND elements 1601, 1602, 1603, 1611 and 1612 become low because their input terminals are supplied with the high voltages. These low output voltages are supplied to the NAND elements 1614, 1615, 1616, 1620 and 1621, so that their output voltages become high regardless of the conditions of the switches of the gear position detecting section 1700, that is, regardless of the gear positions. However, the output voltages of the NAND elements 1617, 1618 and 1619 are subject to change depending upon the gear positions, as hereinbelow described in detail.

If the gear position is in "low," the switches 111*a* and 111*e* of the gear position detecting section 1700 are closed while all of the other switches are open, so that the output voltages of the NAND elements 1625, 1626 and 1627 become low because the switches 112*d*, 112*c* and 112*a* associated therewith are now open and because high voltages are resultantly supplied to their input terminals. Hence, the output voltages of the NAND elements 1617, 1618 and 1619 are high because their input terminals are supplied with the low voltages.

When the gear position is in "second," so that the switches 111*c*, 112*a* and 112*b* of the gear position detecting section 1700 are closed while the other switches are open, the output voltage of the NAND element 1627 becomes high because now the switch 112*a* is closed and because a low voltage is supplied to its input terminal. The output voltage of the NAND element 1619 becomes low because its input terminals are both supplied with the high voltages. The output voltages of the NAND element 1617 and 1618 become high because the switches 112*d* and 112*c* are now open and because the output voltages of the NAND elements 1625 and 1626 become low.

When the gear position is in "third," so that the switches 111*d* and 112*c* of the gear position detecting section 1700 are closed while all the other switches are open, the input terminal of the NAND element 1626 is supplied with a low voltage because the switch 112*c* is closed as aforesaid. Thus, the output voltage of this NAND element 1626 becomes high. The output voltage of the NAND element 1618 becomes low because its input terminals are both supplied with the high voltages. The output voltages of the NAND element 1625 and 1627 becomes low because the switches 112d and 112a are opened, so that the output voltages of the NAND elements 1617 and 1619 become high.

When the gear position is in "overdrive," so that the switch 112d of the gear position detecting section 1700 is closed while all the other switches are open, the input terminal of the NAND element 1625 is supplied with a low voltage because of the closure of the switch 112d. Thus the output voltage of this NAND element 1625 becomes high. The output voltage of the NAND element 1617 becomes low because its input terminals are both supplied with the high voltages. The output voltages of the NAND elements 1626 and 1627 become low because the switches 112c and 112a are now both open, so that the output voltages of the NAND elements 1618 and 1619 become high.

When the gear position is in "neutral," so that the switches 111a and 112a of the gear position detecting section 1700 are closed while all the other switches are open, the output voltage of the NAND element 1619 becomes high because the switch 112a is closed. The output voltages of the NAND elements 1617 and 1618 become high because the switches 112d and 112c are open.

In the case where the output voltage of the NAND element 1552 of the manual shift sensing circuit 1500 is low, while the output voltages of the NAND elements 1504, 1510, 1541 and 1543 are high, the output voltages of the NAND element 1601, 1605 and 1607 become high because their input terminals are supplied with the low voltage. The output voltages of the NAND elements 1602, 1603, 1609, 1611 and 1612 become low because their input terminals are all supplied with the high voltages. Hence, the output voltages of the NAND elements 1615, 1616, 1619, 1620 and 1621 are kept high regardless of the gear position, because their input terminals are supplied with the low voltages. However, the output voltages of the NAND elements 1614, 1617 and 1618 are subject to change according to the gear positions, as hereinafter described in detail.

When the gear position is in "low," a low voltage is supplied to the input terminal of the NAND element 1622 because then the switch 111a of the gear position detecting section 1700 is closed. The output voltage of this NAND element 1622 thus becomes high. The output voltage of the NAND element 1614 becomes low because its input terminals are both supplied with the high voltages. The output voltages of the NAND elements 1625 and 1626 become low because the switches 112d and 112c are now open, so that the output voltages of the NAND elements 1617 and 1618 become high.

When the gear position is in "second," the output voltages of the NAND elements 1622, 1625 and 1626 become low because the switches 111c, 112d and 112c are now open. Hence the output voltages of the NAND elements 1614, 1617 and 1618 all become high.

When the gear position is in "third," a low voltage is supplied to the input terminal of the NAND element 1626 because then the switch 112c is closed. The output voltage of this NAND element 1626 thus becomes high. The output voltage of the NAND element 1618 becomes low because its input terminals are both supplied with the high voltages. The output voltages of the NAND elements 1622 and 1625 become low because the switches 111a and 112d are now open, so that the output voltages of the NAND elements 1614 and 1617 become high.

When the gear position is in "overdrive," a low voltage is supplied to the input terminal of the NAND element 1625 because then the switch 112d is closed. The output voltage of this NAND element 1625 thus becomes high. The output voltage of the NAND element 1617 becomes low because its input terminals are both supplied with the high voltages. The output voltages of the NAND elements 1622 and 1626 become low because the switches 111a and 112c are now open, so that the output voltages of the NAND elements 1614 and 1618 become high.

When the gear position is in "neutral," the output voltage of the NAND element 1622 becomes high because the switch 111a is closed. The output voltages of the NAND elements 1615 and 1617 become high because the swtiches 111c and 112d are now open.

In the case where the output voltage of the NAND element 1504 of the manual shift sensing circuit 1500 is low while the output voltages of the NAND elements 1510, 1541, 1543 and 1552 are high, the output voltages of the NAND elements 1601, 1602 and 1603 become high because their input terminals are supplied with the low voltage. The output voltages of the NAND elements 1605, 1607, 1609, 1611 and 1612 become low because their input terminals are all supplied with the high voltages. Hence the output voltages of the NAND elements 1617, 1618, 1619, 1620 and 1621 are kept high regardless of the gear positions because their input terminals are supplied with the low voltages. However, the output voltages of the NAND elements 1614, 1615 and 1616 change as hereinafter described according to the gear positions.

When the gear position is in "low," the output voltage of the NAND element 1622 become high because then the switch 111a of the gear position detecting section 1700 is closed. The output voltage of the NAND element 1614 becomes low because its input terminals are both supplied with the high voltages. The output voltages of the NAND elements 1623 and 1624 become low because the switches 111c and 111d are now open, so that the output voltages of the NAND elements 1615 and 1616 become high.

When the gear position is in "second," the output voltage of the NAND element 1623 becomes high because when the switch 111c of the gear position detecting section 1700 is closed. Thus, the output voltage of the NAND element 1615 becomes low because its input terminals are both supplied with the high voltages. The output voltages of the NAND elements 1622 and 1624 become low because the switches 111a and 111d are now open, so that the output voltages of the NAND elements 1614 and 1616 become high.

When the gear position is in "third," the output voltage of the NAND element 1624 become high because then the switch 111d is closed. The output voltage of the NAND element 1616 thus becomes low because its input terminals are both supplied with the high voltages. The output voltages of the NAND elements 1622 and 1623 become low because the switches 111a and 111c are now open, so that the output voltages of the NAND elements 1614 and 1615 become high.

When the gear position is in "overdrive," the output voltages of the NAND elements 1622, 1623 and 1624 become low because then the switches 111a, 111c and 111d of the gear position detecting section 1700 are open. Thus, the output voltages of the NAND elements 1614, 1615 and 1616 all become high.

When the gear position is in "neutral," the output voltage of the NAND element 1622 becomes high because then the switch 111a is closed, so that the output voltage of the NAND element 1614 becomes low. The output voltages of the NAND elements 1623 and 1624 become low because the switches 111c and 111d are now open. Hence the output voltages of the NAND elements 1615 and 1616 become high.

In the case where the output voltage of the NAND element 1510 of the manual shift sensing circuit 1500 is low while the output voltages of the NAND elements 1504, 1541, 1543 and 1552 are all high, the output voltages of the NAND elements 1605, 1607, 1611 and 1612 become high because their input terminals are supplied with the low voltage. The output voltages of the NAND elements 1601, 1602, 1603 and 1609 become low because their input terminals are supplied with the high voltages. Hence the output voltages of the NAND elements 1614, 1615, 1616 and 1619 are kept high regardless of the gear positions because their input terminals are supplied with the low voltages. However, the output voltages of the NAND elements 1617, 1618, 1620 and 1621 are subject to change depending upon the gear positions.

When the gear position is in "low," the output voltage of the NAND element 1628 becomes high because then the switch 111e of the gear position detecting section 1700 is closed. The output voltage of the NAND element 1620 thus becomes low because its input terminals are both supplied with the high voltages. The output voltages of the NAND elements 1625, 1626 and 1629 become low because the switches 112d, 112c and 112b are now open, so that the output voltages of the NAND elements 1617, 1618 and 1621 become high.

When the gear position is in "second," the output voltage of the NAND element 1629 becomes high because then the switch 112b of the gear position detecting section 1700 is closed. The output voltage of the NAND element 1621 thus becomes low because its input terminals are both supplied with the high voltages. The output voltages of the NAND elements 1625, 1626 and 1628 become low because the switches 112d, 112c and 11e are open, so that the output voltages of the NAND elements 1617, 1618 and 1620 become high.

When the gear position is in "third," the output voltage of the NAND element 1626 becomes high because then the switch 112c of the gear position detecting section 1700 is closed. The output voltage of the NAND element 1618 thus becomes low because its input terminals are both supplied with the high voltages. The output voltages of the NAND elements 1625, 1628 and 1629 become low because the switches 112d, 111e and 112b are now open, so that the output voltages of the NAND elements 1617, 1620 and 1621 become high.

When the gear position is in "overdrive," the output voltage of the NAND element 1625 becomes high because then the switch 112d of the gear position detecting section 1700 is closed. The output voltage of the NAND element 1617 thus becomes low because its input terminals are both supplied with the high voltages. The output voltages of the NAND elements 1626, 1628 and 1629 become low because the switches 112c, 111e and 112b are now open, so that the output voltages of the NAND elements 1618, 1620 and 1621 become high.

When the gear position is in "neutral," the output voltages of the NAND elements 1626, 1628 and 1629 becomd low because then the switches 112c, 111e and 112b of the gear position detecting section 1700 are open. Thus, the output voltages of the NAND elements 1618, 1620 and 1621 all become high.

These discussions are summarized in Table 6.

TABLE 6

| | OUTPUT VOLTAGE OF NAND ELEMENT 1541 IS LOW AND OUTPUT VOLTAGES OF NAND ELEMENTS 1504, 1510,1543 AND 1552 ARE HIGH | | | | | OUTPUT VOLTAGE OF NAND ELEMENT 1552 IS LOW AND OUTPUT VOLTAGES OF NAND ELEMENTS 1504, 1510, 1541 AND 1543 ARE HIGH | | | | | OUTPUT VOLTAGE OF NAND ELEMENT 1543 IS LOW AND OUTPUT VOLTAGES OF NAND ELEMENTS 1504, 1510, 1541 AND 1552 ARE HIGH | | | | |
|---|---|---|---|---|---|---|---|---|---|---|---|---|---|---|---|
| | LOW GEAR | SECOND GEAR | THIRD GEAR | OVER-DRIVE | NEU-TRAL | LOW GEAR | SECOND GEAR | THIRD GEAR | OVER-DRIVE | NEU-TRAL | LOW GEAR | SECOND GEAR | THIRD GEAR | OVER-DRIVE | NEU-TRAL |
| OUTPUT VOLTAGE OF NAND ELEMENT 1614 | H | H | H | H | H | L | H | H | H | L | L | H | H | H | L |
| OUTPUT VOLTAGE OF NAND ELEMENT 1615 | H | H | H | H | H | H | H | H | H | H | H | L | H | H | H |
| OUTPUT VOLTAGE OF NAND ELEMENT 1616 | H | H | H | H | H | H | H | H | H | H | H | H | H | H | H |
| OUTPUT VOLTAGE OF NAND ELEMENT 1617 | H | H | H | L | H | H | H | H | L | H | H | H | H | L | H |
| OUTPUT VOLTAGE OF NAND ELEMENT 1618 | H | H | L | H | H | H | H | L | H | H | H | H | H | H | H |
| OUTPUT VOLTAGE OF NAND ELEMENT 1619 | H | L | H | H | L | H | H | H | H | H | H | H | H | H | H |
| OUTPUT VOLTAGE OF NAND ELEMENT 1620 | L | H | H | H | H | H | H | H | H | H | H | H | H | H | H |
| OUTPUT VOLTAGE OF NAND ELEMENT 1621 | H | H | H | H | H | H | H | H | H | H | H | H | H | H | H |

TABLE 6 (Continued)

|  | OUTPUT VOLTAGE OF NAND ELEMENT 1504 IS LOW AND OUTPUT VOLTAGES OF NAND ELEMENTS 1510, 1541, 1543 AND 1552 ARE HIGH | | | | | OUTPUT VOLTAGE OF NAND ELEMENT 1510 IS LOW AND OUTPUT VOLTAGES OF NAND ELEMENTS 1504, 1541, 1543 AND 1552 ARE HIGH | | | | |
|---|---|---|---|---|---|---|---|---|---|---|
|  | LOW GEAR | SECOND GEAR | THIRD GEAR | OVER-DRIVE | NEU-TRAL | LOW GEAR | SECOND GEAR | THIRD GEAR | OVER-DRIVE | NEU-TRAL |
| OUTPUT VOLTAGE OF NAND ELEMENT 1614 | L | H | H | H | L | H | H | H | H | H |
| OUTPUT VOLTAGE OF NAND ELEMENT 1615 | H | L | H | H | H | H | H | H | H | H |
| OUTPUT VOLTAGE OF NAND ELEMENT 1616 | H | H | L | H | H | H | H | H | H | H |
| OUTPUT VOLTAGE OF NAND ELEMENT 1617 | H | H | H | H | H | H | H | H | L | H |
| OUTPUT VOLTAGE OF NAND ELEMENT 1618 | H | H | H | H | H | H | H | L | H | H |
| OUTPUT VOLTAGE OF NAND ELEMENT 1619 | H | H | H | H | H | H | H | H | H | H |
| OUTPUT VOLTAGE OF NAND ELEMENT 1620 | H | H | H | H | H | L | H | H | H | H |
| OUTPUT VOLTAGE OF NAND ELEMENT 1621 | H | H | H | H | H | H | L | H | H | H |

Figure 24:
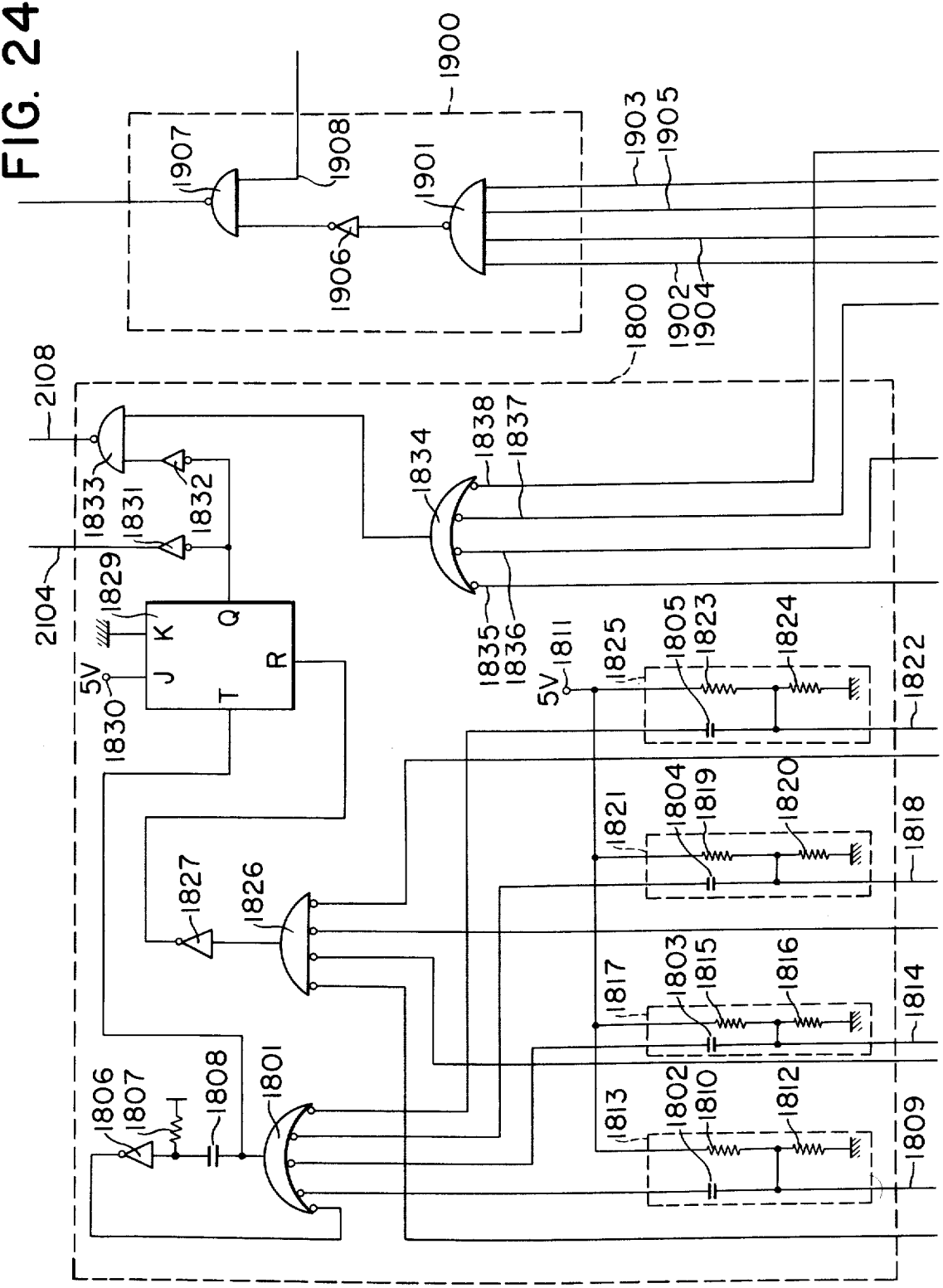
FIG. 24 is a diagram showing an up-and-down control circuit and a reverse control circuit.

FIG. 24 illustrates the configuration of an up-and-down control circuit 1800. The input terminals of a five-input NAND element 1801 provided therein are connected to the output sides of capacitors 1802, 1803, 1804 and 1805 and to the output terminal of a NAND element 1806, respectively. The input terminal of this NAND element 1806 is, on the one hand, grounded through a resistance 1807 and, on the other hand, connected to the output side of a capacitor 1808. The input side of the capacitor 1808 is connected to the output terminal of the NAND element 1801.

The input side of the capacitor 1802 is connected to the output terminal of the NAND element 1622 of the up-and-down shift sensing circuit 1600 of FIG. 23 through a conductor 1809, is connected to a supply terminal 1811 through a resistance 1810, and is further grounded through another resistance 1812. A differentiating circuit 1813 is thus formed by the capacitor 1802 and resistances 1810 and 1812.

The input side of the capacitor 1803 is also connected to the output terminal of the NAND element 1623 of the up-and-down shift sensing circuit 1600 through a conductor 1814, is connected to the supply terminal 1811 through a resistance 1815, and is further grounded through a resistance 1816. A differentiating circuit 1817 is thus formed by the capacitor 1803 and resistances 1815 and 1816.

The input side of the capacitor 1804 is connected to the output terminal of the NAND element 1624 of the up-and-down shift sensing circuit 1600 through a conductor 1818, is connected to the supply terminal 1811 through a resistance 1819, and is further grounded through a resistance 1820. A differentiating circuit 1821 is thus formed by the capacitor 1804 and resistances 1819 and 1820.

The input side of the capacitor 1805 is connected to the output terminal of the NAND element 1628 of the up-and-down shift sensing circuit 1600 through a conductor 1822, is connected to the supply terminal 1811 through a resistance 1823, and is further grounded through a resistance 1824. A differentiating circuit 1825 is thus formed by the capacitor 1805 and resistances 1823 and 1824.

The input terminals of a four-input NAND element 1826 are connected to the output terminals of the NAND elements 1614, 1615, 1616 and 1620, respectively, while its output terminal is connected to the input terminal of a NAND element 1827. The output terminal of this NAND element 1827 is connected to a reset input terminal R of a JK flip flop 1829. An input terminal T of the JK flip flop 1829 is connected to the output terminal of the NAND element 1801; its input terminal J is connected to a supply terminal 1830; its input terminal K is grounded; and its output terminal Q is connected to the input terminals of NAND elements 1831 and 1832. The output terminal of the NAND element 1832 is connected to one of the input terminals of a two-input NAND element 1833, the other input terminal of which is connected to the output terminal of a four-input NAND element 1834. The input terminals of this NAND element 1834 are connected to the output terminals of the NAND elements 1617, 1618, 1619 and 1621 of the up-and-down shift sensing circuit 1600 through conductors 1835, 1836, 1837 and 1838, respectively.

The up-and-down control circuit 1800 being configured as hereinbefore described, the output voltage of the NAND element 1826 becomes high when either of the NAND elements 1614, 1615, 1616 and 1620 of the up-and-down shift sensing circuit 1600 produces a low output voltage. As a result, the NAND element 1827 supplies a low voltage to the reset terminal R of the JK flip flop 1829, so that its output terminal Q produces a high voltage. This high voltage is supplied to the input terminals of the NAND elements 1831 and 1832, which then produce low/output voltages. The low output voltage of the NAND element 1832 is further supplied to one of the input terminals of the NAND element 1833, so that this NAND element 1833 produce a high output voltage.

When the output voltage of one of the NAND elements 1622, 1623, 1624 and 1628 of the up-and-down shift sensing circuit 1600 becomes low upon closure of the corresponding switch of the gear position detecting section 1700, one of the differentiating circuits 1813, 1817, 1821 and 1825 supplies a low voltage to the input terminal of the NAND element 1801. The resultant high output voltage of the NAND element 1806 through the capacitor 1808. The low voltage thus produced by this NAND element 1806 is again supplied to one of the input terminals of the NAND element 1801, so that the output voltage of this NAND element 1801 remains high. In this instance, however, the output voltage of the capacitor 1808 is discharged through the resistance 1807. Upon lapse of a length of time predetermined by the capacity of the capacitor 1808 and the ohmic value of the resistance 1807, therefore, the NAND element 1806 produces a high output voltage. All the input terminals of the NAND element 1801 are now supplied with high voltages, so that the output voltage of this NAND element again becomes low. While the output voltage of the NAND element 1801 is kept high, this high voltage is supplied to the input terminal T of the JK flip flop 1829, so that its output terminal Q produces a low voltage. As this low voltage is supplied to the input terminals of the NAND elements 1831 and 1832, these NAND elements produce high voltages.

When the output voltage of either of the NAND elements 1617, 1618, 1619 and 1621 of the up-and-down shift sensing circuit 1600 becomes low, this low voltage is supplied to the corresponding input terminal of the NAND element 1834, so that its output voltage becomes high. If, the NAND element 1833 produces a low voltage because its input terminals are both supplied with the high voltages.

FIG. 24 also illustrates the configuration of a reverse control circuit 1900. One of the input terminals of a four-input NAND element 1901 provided therein is connected to the output terminal of the NAND element 1622 through a conductor 1902 and the aforesaid conductor 1809. Another input terminal of the NAND element is connected to the output terminal of the NAND element 1627 through a conductor 1903. The other two input terminals of this NAND element 1901 are grounded through conductors 1904 and 1622 and the switch 112b of the gear position detecting section 1700 and through conductors 1905 and 1658 and the switch 111e of the gear position detecting section 1700, respedtively. The output terminal of the NAND element 1901 is connected to the input terminal of a NAND element 1906, while the output terminal of this NAND element 1906 is connected to one of the input terminals of a two-input NAND element 1907, the other input terminal of which is connected to the output terminal of the NAND element 1539 of the manual shift sensing circuit 1500, FIG. 22, through a conductor 1908.

In the reverse control circuit 1900 of the above configuration, all of the input terminals of the NAND element 1901 are supplied with high voltages when the switches 111a and 112a of the gear position detecting section 1700 are closed and the switches 111e and 112b open, that is, when the gear position is in "neutral." Hence the NAND element 1901 produces a low voltage. This low voltage is supplied to the input terminal of the NAND element 1906, so that the latter produces a high voltage. If, in this instance, the output voltage of the NAND element 1539 of FIG. 22 is high, the input terminals of the NAND element 1907 will both be supplied with the high voltages. The NAND element 1907 thus produces a low voltage.

When the gear position is not in "neutral," low voltages are supplied to the input terminals of the NAND element 1901, as may be clear from the above described operations of the switches of the gear position detecting section 1700. The resultant high output voltage of this NAND element 1901 is supplied to the input terminal of the NAND element 1906, which then produces a low voltage. Hence the output voltage of the NAND element 1907 is kept high regardless of the output voltage of the NAND element 1539.

Figure 25:
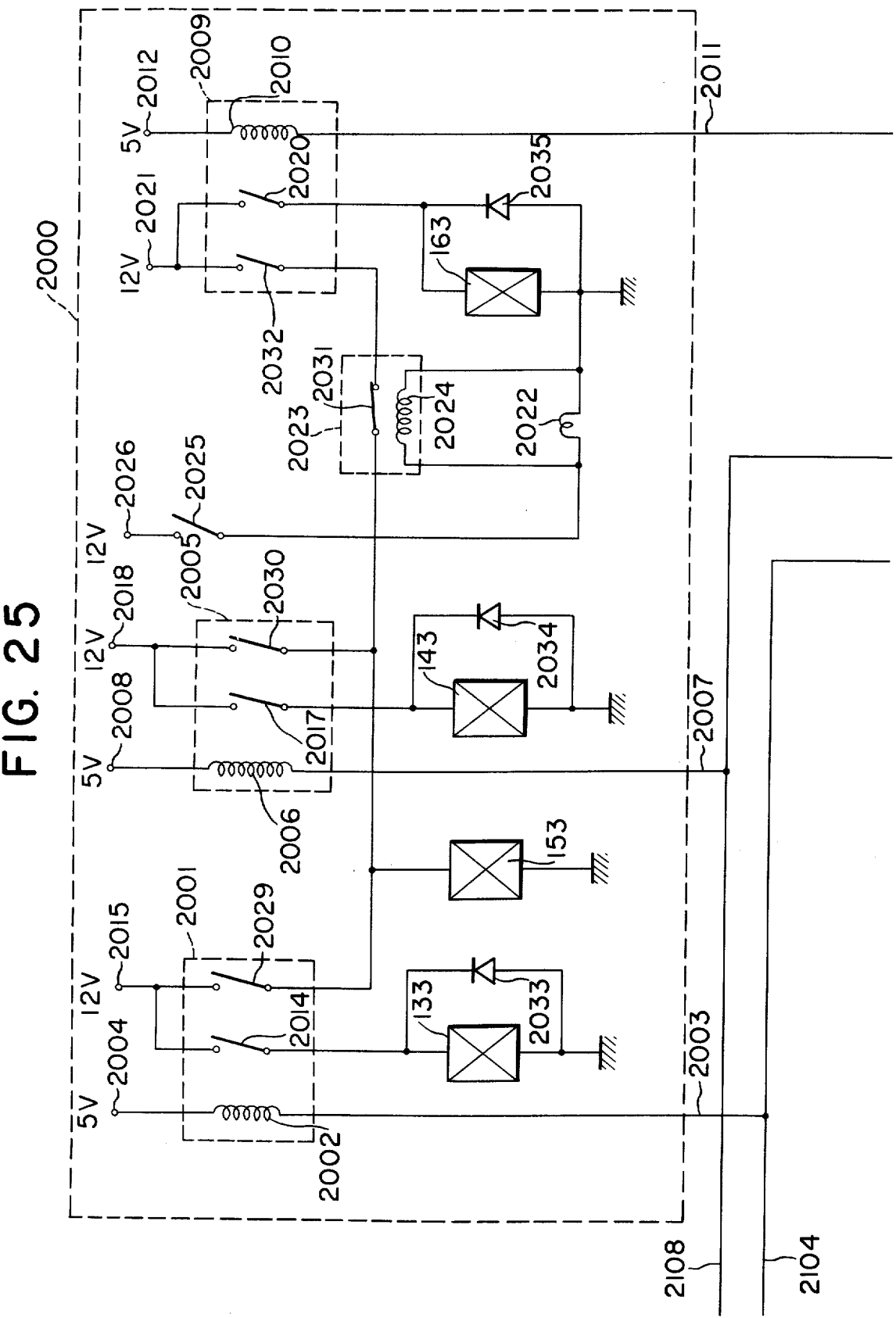
FIG. 25 is a diagram showing an up-and-down and reverse drive circuit.

FIG. 25 illustrates the configuration of an up-and-down and reverse drive circuit 2000. One end of a solenoid 2002 of a relay 2001 provided therein is connected to the output terminal of the NAND element 1831 of the up-and-down control circuit 1800, FIG. 24, through a conductor 2003, while the other end of the solenoid is connected to a supply terminal 2004. One end of a solenoid 2006 of a relay 2005 is connected to the output terminal of the NAND element 1833 of the up-and-down control circuit 1800 through a conductor 2007, and the end thereof to a supply terminal 2008. One end of a solenoid 2010 of a relay 2009 is connected to the output terminal of the NAND element 1907 of the reverse control circuit 1900, FIG. 24, through a conductor 2011, and the other end thereof to a supply terminal 2012.

The reference numeral 133 denotes the previously mentioned coil or solenoid of the upshift solenoid valve 130. One end of this solenoid is grounded, and the other end connected to a supply terminal 2015 via a switch 2014 of the relay 2001. Similarly, one end of the solenoid 143 of the downshift solenoid valve 140 is grounded, and the other end connected to a supply terminal 2018 via a switch 2017 of the relay 2005. One end of the solenoid 163 of the reverse shift solenoid valve 160 is also grounded, and the other end connected to a supply terminal 2021 via a switch 2020 of the relay 2009. A back lamp 2022 and a solenoid 2024 of a relay 2023 are each grounded at one end and connected at the other end to a supply terminal 2026 via a switch 2025 which is closed when the gear position is shifted to "reverse." One end of the solenoid 153 of the clutch release solenoid valve 150 is grounded. The other end of this solenoid is connected to the supply terminal 2015 via a switch 2029 of the relay 2001, to the supply terminal 2018 via a switch 2030 of the relay 2005, and to the supply terminal 2021 via a switch 2031 of the relay 2024 and a switch 2032 of the relay 2009. Diodes 2033, 2034 and 2035 are provided for the purpose of chatter prevention.

The up-and-down and reverse drive circuit 2000 being configured as hereinbefore described, an electric current flows through the solenoid 2002 of the relay 2002 to close the switches 2014 and 2029 when the NAND element 1831 of the up-and-down control circuit 1800 produces a low voltage. As a consequence, a current flows through the solenoid 133 of the upshift solenoid valve 130 and the solenoid 153 of the clutch release solenoid valve 150. When the output voltage of the NAND element 1833 of the up-and-down control circuit 1800 becomes low, a current flows through the solenoid 2006 of the relay 2005 thereby closing the switches 2017 and 2030, so that a current flows through the solenoid 143 of the downshift solenoid valve 140 and the solenoid 153 of the clutch release solenoid valve 150.

When the output voltage of the NAND element 1907 of the reverse control circuit 1900 becomes low, a current flows through the solenoid 2010 of the relay 2009 thereby closing the switches 2020 and 2032, so that a current flows through the solenoid 163 of the reverse shift solenoid valve 160 and the solenoid 153 of the clutch release solenoid valve 150. When the gear position is shifted to "reverse," the switch 2025 is closed so that a current flows through the back lamp 2022 thereby lighting up the same. The current is also supplied to the solenoid 2024 of the relay 2023 to open the switch 2031, so that the current is no longer supplied to the solenoid 153 of the clutch release solenoid valve 150.

Reference is now directed back to FIG. 20 in order to describe the configuration of a gate control circuit 2100 for engine speed. The input terminal of a NAND element 2101 provided therein is connected to the output terminal $\bar{5}$ of the decoder 1112 of the time base generating circuit 1100, FIG. 18, through a conductor 2102. The input terminal of a NAND element 2103 is connected to the output terminal of the NAND element 1831 of the up-and-down control circuit 1800, FIG. 24, through a conductor 2104. The input terminal of a NAND element 2105 is connected to the output terminal $\bar{6}$ of the decoder 1112 of the time base generating circuit 1100 through a conductor 2106. The input terminal of a NAND element 2107 is connected to the output terminal of the NAND element 1833 of the up-and-down control circuit 1800 through a conductor 2108.

The output terminals of the NAND elements 2101 and 2103 are connected to the input terminals of a two-input NAND element 2109. The output terminals of the NAND elements 2105 and 2107 are connected to the input terminals of a two-input NAND element 2110. The output terminals of the NAND elements 2109 and 2110 are connected to the input terminals of a three-input NAND element 2111. The output terminal of this three-input NAND element is connected to one of the input terminals of a two-input NAND element 2112 and, through a conductor 2115, to one of the input terminals of a three-input NAND element 1001 of an engine speed gate circuit 1000. The other input terminal of the NAND element 2112 is connected to the output terminal $\bar{7}$ of the decodee 1112 of the time base generating circuit 1100 through a conductor 2113. The output terminal of this NAND element 2112 is connected to the other input terminal of the NAND element 2111. A flip flop 2114 is thus formed by these NAND elements 2111 and 2112.

In the engine speed gate control circuit 2100 of the foregoing configuration, the output voltages of the NAND elements 2103 and 2107 are both low when the output voltages of the NAND elements 1831 and 1833 of the up-and-down control circuit 1800 are both high. Since the low output voltages of the NAND elements 2103 and 2107 are supplied to the NAND elements 2109 and 2110, respectively, the latter two NAND elements produce high voltages. If, in this condition, the output terminal $\bar{7}$ of the decoder 1112 of the time base generating circuit 1100 produces a low voltage, the NAND element 2112 of the flip flop 2114 produces a high voltage, so that the other NAND element 2111 of the flip flop produces a low voltage because then its three input terminals are all supplied with the high voltages. This low output voltage of the flip flop 2114 is maintained until the output voltage of the NAND element 2109 or 2110 becomes low.

When the output voltage of the NAND element 1831 of the up-and-down control circuit 1800 is low and the output voltage of the NAND element 1833 high, the NAND element 2103 produces a high voltage because then its input terminal is supplied with the low voltage. If, in this condition, the output terminal $\bar{5}$ of the decoder 1112 of the time base generating circuit 1100 produces a low voltage so that the output voltage of the NAND element 2101 of the engine speed gate control circuit 2100 becomes high, the output voltage of the NAND element 2109 becomes low because then its input terminals are both supplied with the high voltages. This low voltage is supplied to one of the input terminals of the NAND element 2111 of the flip flop 2114, so that the flip flop 2114 produces a high voltage. Thereafter, when two more control pulses are supplied to the counter 1111 of the time base generating circuit 1100 so that the output terminal $\bar{7}$ of the decoder 1112 produces a low voltage, the output voltage of the NAND element 2112 of the flip flop 2114 becomes low, with the result that the output voltage of this flip flop 2114 again becomes low.

When the output voltage of the NAND element 1833 of the up-and-down control circuit 1800 is low and the output voltage of the NAND element 1831 high, the NAND element 2107 produces a high voltage because then its input terminal is supplied with the low voltage. When, in this condition, the output terminal $\bar{6}$ of the decoder 1112 of the time base generating circuit 1100 produces a low voltage so that the output voltage of the NAND element 2105 becomes high, the NAND element 2110 produces a low voltage because its input terminals are both supplied with the high voltages. This low voltage is supplied to one of the input terminals of the NAND element 2111 of the flip flop 2114 thereby making the output voltage of this flip flop 2114 high. The output voltage of the flip flop 2114 again becomes low when the output terminal $\bar{7}$ of the decoder 1112 of the time base generating circuit 1100 produces a low voltage.

FIG. 20 also illustrates the configuration of an engine speed control circuit 2200. An input terminal A of its four-bit, sexadecimal counter 2201 is connected to the output terminal of the NAND element 1001 of the engine speed gate circuit 1000 through a conductor 2202. An output terminal B of the counter 2201 is connected to an input terminal A of another four-bit, sexadecimal counter 2203. The counter 2201 supplies one pulse to the input terminal A of the other counter 2203 each time it receives 16 pulses through its input terminal A. Similarly, the counter 2203 repeats counting every 16 of the pulses thus supplied through its input terminal A.

Reset terminals C of these counters 2201 and 2203 are connected to the output terminal of the NAND element 1303 of the counting circuit 1300 through a conductor 2204. Hence, each time a high voltage is applied to these reset terminals C, the counters 2201 and 2203 are both reset to zero. An output terminal B of the counter 2203 is connected to an input terminal K of a JK flip flop 2205 and to the input terminal of a NAND element 2206. The output terminal of this NAND element 2206 is connected to an input terminal J of the Jk flip flop 2205 and, through a conductor 2207, to one of the input terminals of the NAND element 1001 of the engine speed gate circuit 1000. An input terminal T of the JK flip flop 2205 is connected to the output terminal of the NAND element 1219 of the vehicle speed gate control circuit 1200, FIG. 19, through a conductor 2208. An output terminal Q of the JK flip flop 2205 is connected to the input terminal of a NAND element 2209.

In the engine speed control circuit 2200 of the above described configuration, the output terminal B of the counter 2203 produces a low voltage when the number of pulses being counted by this counter is zero, and the output terminal of the NAND element 2206 produces a high voltage when the voltage produced by the output terminal B of the counter 2203 is low. If, in this condition, the flip flop 2114 of the engine speed gate control circuit 2100 produces a high voltage, conduction is permitted through the engine speed gate circuit 1000, so that now the aforesaid engine pulses formed by the engine speed detecting section 800 and amplifying/-shaping circuit 900, FIG. 18, are fed into the counter 2201 of the engine speed control circuit 2200 via the engine speed gate circuit 1000. The counters 2201 and 2203 thus start counting the engine pulses. As the counter 2201 receives the predetermined number of these engine pulses, the output terminal B of the counter 2203 produces a high voltage. This high voltage is supplied to the input terminal K of the JK flip flop 2205 and to the input terminal of the NAND element 2206. A low voltage thus produced by this NAND element 2206 is supplied to the input terminal J of the JK flip flop 2205 and to one of the input terminals of the NAND element 1001 of the engine speed gate circuit 1000, thereby preventing the passage of any more pulses therethrough.

Thereafter, when the output terminal $\overline{7}$ of the decoder 1112 of the time base generating circuit 1100 produces a low voltage so that the output voltage of the NAND element 1219 of the vehicle speed gate control circuit 1200 becomes high, the output terminal Q of the JK flip flop 2205 produces a high voltage because then its input terminal T is supplied with the high voltage through the conductor 2208. Hence the output voltage of the NAND element 2209 becomes low.

As long as the pulses supplied to the counter 2201 of the engine speed control circuit 2200 via the engine speed gate circuit 1000 do not reach the predetermined number, the voltage produced from the output terminal B of the counter 2203 remains low. When the output terminal $\overline{7}$ of the decoder 1112 of the time base generating circuit 1100 produces a low voltage, the output voltage of the flip flop 2114 of the engine speed gate control circuit 2100 becomes low to prevent conduction through the engine speed gate circuit 1000. Hence the output voltage of the JK flip flop 2205 remains low, while the output voltage of the NAND element 2209 remains high. The counters 2201 and 2203 are both reset to zero when the output terminal $\overline{9}$ of the decoder 1112 of the time base generating circuit 1100 produces a low voltage, because then a high voltage produced by the NAND element 1303 of the counting circuit 1300 is supplied to their reset input terminals C.

Figure 27:
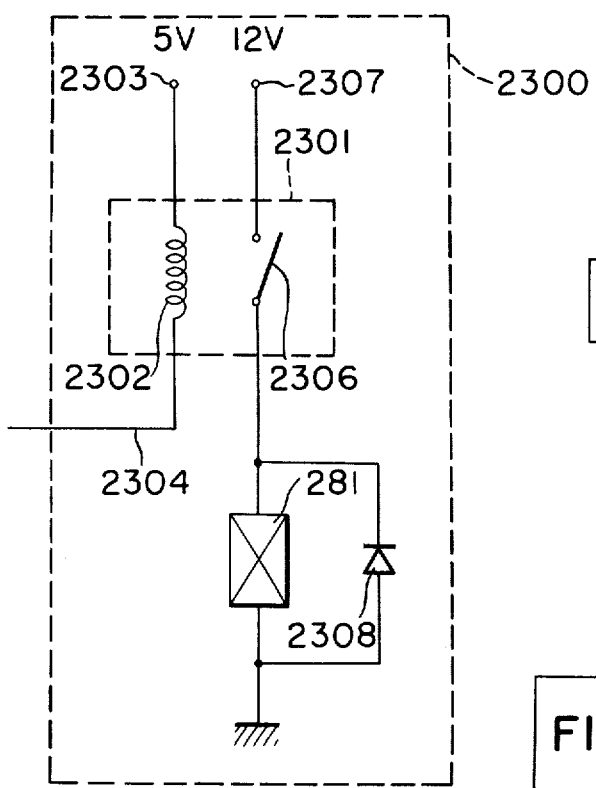
FIG. 27 is a diagram showing a fuel valve drive circuit.
Figure 28:
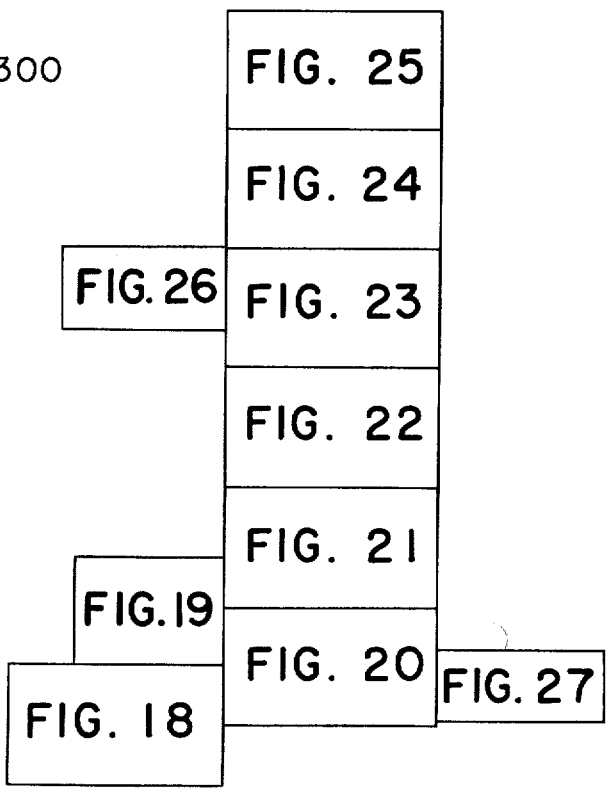
FIG. 28 shows, by way of reference, the relative locations of the circuits shown in FIGS. 18 through 27.

A fuel valve drive circuit 2300 is shown in FIG. 27. One end of a solenoid 2302 of its relay 2301 is connected to a supply terminal 2303, while the other end thereof is connected to the output terminal of the NAND element 2209 of the engine speed control circuit 2200, FIG. 20, via a conductor 2304. The solenoid 281 of the three-port, two-position solenoid valve 280 is grounded at one end and is connected at the other end to a supply terminal 2307 via a switch 2306 of the relay 2301. A diode 2308 is connected in parallel with this solenoid 281 for the purpose of chatter prevention.

In the fuel valve drive circuit 2300 of the above configuration, an electric current flows through the solenoid 2302 of the relay 2301 when the output voltage of the NAND element 2209 of the engine speed control 22000 becomes low. The switch 2306 is thus closed, so that a current flows through the solenoid 281 of the solenoid valve 280.

Proceeding now to the description of operation of the overall automatic transmission control system of this invention, it will first be supposed that the internal combustion engine or the prime mover of the vehicle is set in operation when the vehicle is at rest and the manual shift lever is in the neutral position, with the gear position in "neutral." The rotation of its output shaft or engine crankshaft 10 is transmitted through the torque converter 12 and clutch 29, FIG. 1, to the input shaft 45 of the transmission 300, FIG. 2. The rotation of the transmission input shaft is further transmitted through the transmission input gear 70 and the countershaft drive gear 59 to the countershaft 57, and thence through the "low" counter gear 54 to the "low" gear 77, through the "second" counter gear 56 to the "second" gear 78, and through the "overdrive" counter gear 58 to the "overdrive" gear 79. However, the rotation of the countershaft 57 is not transmitted to the transmission output shaft 76 because, then, the "low" gear 77 and "second" gear 78 are disengaged from the output shaft by the pin-type synchro means 80, because the transmission input shaft 45 and "overdrive" gear 79 are also disengaged from the output shaft by the Warner-type synchro means 81, and because the "reverse" gear 83 is not in mesh with the "reverse" counter gear 55.

Since, now, wheel pulses are not produced by the vehicle speed detecting section 500 and amplifying/shaping circuit 600, the output terminals $\overline{0}$ of the decoders 1307 and 1310 of the counting circuit 1300 produce low voltages, so that the flip flop 1440 of the hysteresis control circuit 1400 (which also operates to set the vehicle speed at speed change points) produces a high voltage while the other flip flops 1441, 1442 and 1445 produce low voltages. Also, the NAND element 1426 of this circuit produces a high voltage, and the NAND elements 1510 and 1539 of the manual shift sensing circuit 1500 produce low voltages while the other NAND elements 1504, 1541, 1543 and 1552 produce high voltages (see Table 5). The NAND elements 1614, 1615, 1616, 1617, 1618, 1619, 1620 and 1620 of the up-and-down shift sensing circuit 1600 produce high voltages (see Table 6). The NAND elements 1831 and 1833 of the up-and-down control circuit 1800 produce high voltages. The NAND element 1907 of the reverse control circuit 1900 also produces a high voltage.

Thus, no electric current flows through the solenoid 2002 of the relay 2001, the solenoid 2006 of the relay 2005, and the solenoid 2010 of the relay 2009 of the up-and-down and reverse drive circuit 2000. As these relays remain unoperative, no current flows through the solenoid 133 of the upshift solenoid valve 130, the solenoid 143 of the downshift solenoid valve 140, and the solenoid 163 of the reverse shift solenoid valve 160.

An electric current does not flow through the solenoid 153 of the clutch release solenoid valve 150, either. Since these solenoid valves prevents the supply of hydraulic pressure from the pump 220 to the reverse shift servomotor 200, the clutch release servo cylinder 230, and the servo means 250, these servo means are now inoperative. Hence the clutch 29 remains engaged, and the gear position remains in neutral.

When the manual shift lever is succeedingly set in the "low" position, the NAND elements 1539 and 1541 of the manual shift sensing circuit 1500 produce low voltages, while its NAND elements 1504, 1510, 1543 and 1552 produce high voltages (see Table 5). Hence, the NAND element 1619 of the up-and-down shift sensing circuit 1600 produces a low voltage, while its NAND elements 1614, 1615, 1616, 1617, 1618, 1620 and 1621 produce high voltages (see Table 6). Hence, the NAND element 1833 of the up-and-down control circuit 1800 produces a low voltage, while its NAND element 1831 produces a high voltage. Also in the reverse control circuit 1900, the NAND element 1907 produces a high voltage, so that an electric current flows through the solenoid 2006 of the relay 2005 in the up-and-down and reverse circuit 2000 thereby closing the switches 2017 and 2030. An electric current from the supply terminal 2018 is now permitted to flow through the solenoid 153 of the clutch release solenoid valve 150 and the solenoid 143 of the downshift solenoid valve 140. However, the relays 2001 and 2009 remain unoperative, so that no electric current flows through the solenoid 133 of the upshift solenoid valve 130 and the solenoid 163 of the reverse shift solenoid valve 160.

The clutch release solenoid valve 150 operates to supply fluid pressure from the pump 220 to the clutch release servo cylinder 230, which then operates to disengage the clutch 29. The downshift solenoid valve 140 also operates to supply the fluid pressure from the pump 220 to the downshift fluid chamber 252 of the servo means 250, so that this servo means operates to rotate the cam plate 102 from its neutral position shown in FIG. 12 to the "low" position shown in FIG. 13. By this rotation of the cam plate 102, the low speed fork plate 88 is moved to its position shown in FIG. 13. Further, when the cam plate 102 is moved to its illustrated "low" position, the pin-type synchro means 80 engages the "low" gear 77 with the transmission output shaft 76.

When the transmission is thus set in low gear, all of the NAND elements 1614, 1615, 1616, 1617, 1618, 1619, 1620 and 1621 of the up-and-down shift sensing circuit 1600, FIG. 23, produce high voltages (see Table 6). The output voltage of the NAND element 1833 of the up-and-down control circuit 1800 again becomes high. As no current is then permitted to flow through the solenoid 2006 of the relay 2005 of the up-and-down and reverse drive circuit 2000, FIG. 25, neither the solenoid 153 of the clutch release solenoid valve 150 nor the solenoid 143 of the downshift solenoid valve 140 is supplied with a current. Thus, the clutch release solenoid valve 150 discommunicates the clutch release servo cylinder 130 from the pump 220 and communicates the same with the sump 214, while the downshift solenoid valve 140 discommunicates the downshift fluid chamber of the servo means 250 from the pump 220 and communicates the same with the sump 214. As a result, the servo means 250 becomes inoperative so that the transmission is kept in low gear, and the clutch release servo cylinder 230 also becomes inoperative so that the clutch 29 is kept in engagement. As the rotation of the shaft 10 is thus conveyed to the transmission output shaft 76, the vehicle starts running in low gear.

When the vehicle starts running in this manner, the vehicle speed detecting section 500 and the amplifying/shaping circuit 600, FIG. 18, becomes operative to produce the aforesaid wheel pulses proportional to the vehicle speed. These wheel pulses are supplied to the counter 1301 of the counting circuit 1300, FIG. 20, through the vehicle speed gate circuit 700 during conduction thereof, so that the output voltages of the NAND elements 1440, 1441, 1442 and 1445 of the hysteresis control circuit 1400, FIG. 21, change as in Table 3. Separately, the output voltages of the NAND elements 1539 and 1541 of the manual shift sensing circuit 1500, FIG. 22, are kept low, while the output voltages of its NAND elements 1504, 1510, 1543 and 1552 are kept high (see Table 5). No shift transition takes place unless the manual shift lever is operated by the vehicle driver.

When the manual shift lever is moved from its "low" to "second" position, the output voltages of the NAND elements 1539 and 1552 of the manual shift sensing circuit 1500, FIG. 22, become low, while the output voltages of its NAND elements 1540, 1510, 1541 and 1543 are high (see Table 5). Hence, in the up-and-down shift sensing circuit 1600, FIG. 23, the NAND element 1614 produces a low voltage, while the NAND elements 1615, 1616, 1617, 1618, 1619, 1620 and 1621 produce high voltages (see Table 6). In the up-and-down control circuit 1800, FIG. 24, the NAND element 1831 produces a low voltage, while the NAND element 1833 produces a high voltage. In the reverse control circuit 1900 shown in the same drawing, the NAND element 1907 produces a high voltage. Thus, in the up-and-down and reverse drive circuit 2000, FIG. 25, an electric current flows through the solenoid 2002 of the relay 2001 thereby closing the switches 2014 and 2029, so that a current flows through the solenoid 153 of the clutch release solenoid valve 150 and the solenoid 133 of the upshift solenoid valve 130. However, the solenoid 2006 of the relay 2005 and the solenoid 2010 of the relay 2009 are not unactuated, so that no current flows through the solenoid 143 of the downshift solenoid valve 140 and the solenoid 163 of the reverse shift solenoid valve 160.

Accordingly, with reference to FIG. 11, the clutch release solenoid valve 150 operates to supply a fluid pressure from the pump 220 to the clutch release servo cylinder 230, which then operates to release the clutch 29. The upshift solenoid valve 130 operates to supply the fluid pressure from the pump 220 to the upshift fluid chamber 251 of the servo means 250, which then operates to rotate the cam plate 102 from its "low" position shown in FIG. 13 to the "neutral" position shown in FIG. 12. By this rotation of the cam plate 102, the low speed fork plate 88 is moved to its illustrated position. When the cam plate 102 is thus rotated to its illustrated "neutral" position, the pin-type synchro means 80 operates to disengage the "low" gear 77 from the transmission output shaft 76.

Even though the transmission is thus set in neutral, the output voltage of the NAND element 1614 of the up-and-down shift sensing circuit 1600, FIG. 23, remains low while the output voltages of its NAND elements 1615, 1616, 1617, 1618, 1619, 1620 and 1621 remain high (see Table 6), so that an electric current continues flowing through the solenoid 153 of the clutch release solenoid valve 150 and the solenoid 133 of the upshift solenoid valve 130. The clutch release servo cylinder 230 thus remains operative to keep the clutch 29 released. The servo means 250 also remains operative to further rotate the cam plate 102 from its "neutral" to "second" position shown in FIG. 14. By this additional rotation of the cam plate 102, the low speed fork plate 88 is further moved leftward as viewed in the drawing. The pin-type synchro means 80 now operates to engage the "second" gear 78 with the transmission output shaft 76.

When the transmission is thus set in second gear, all of the NAND elements 1614 through 1621 of the up-and-down shift sensing circuit 1600 produce high voltages. The NAND element 1831 of the up-and-down control circuit 1800 again produces a high voltage. Since then the solenoid 2002 of the relay 2001 of the up-and-down and reverse control circuit 2000 is unactuated, no current flows through the solenoid 153 of the clutch release solenoid valve 150 or the solenoid 133 of the upshift solenoid valve 130. As a result, the clutch release solenoid valve 150 discommunicates the clutch rerease servo cylinder 230 from the pump 220 and communicates the cylinder with the sump 214. The upshift solenoid valve 130 discommunicates the upshift fluid chamber 251 of the servo means 250 from the pump 220 and communicates the upshift fluid chamber with the sump 214. The servo means 250 thus becomes unoperative so that the transmission remains in second gear. The clutch release servo cylinder 230 also become inoperative so that the clutch 29 is engaged. Hence the vehicle starts running in second gear. In this case, too, no more shift transition takes place unless the manual shift lever is operated.

When the manual shift lever is moved from its "second" to "third" position, the NAND elements 1539 and 1543 of the manual shift sensing circuit 1500 produces a low voltage while its NAND elements 1504, 1510, 1514 and 1552 produce high voltages (see Table 5). Thus, in the up-and-down shift sensing circuit 1600, the NAND element 1615 produces a low voltage while the other NAND elements 1614, 1616, 1617, 1618, 1619, 1620 and 1621 produce high voltages (see Table 6). Thus, in the up-and-down control circuit 1800, the NAND element 1831 produces a low voltage while the NAND element 1833 produces a high voltage. The NAND element 1907 of the reverse control circuit 1900 also produces a high voltage. Accordingly, in the up-and-down and reverse drive circuit 2000, only the solenoid 2002 of the relay 2001 is actuated thereby closing the switches 2014 and 2029. An electric current is thus permitted to flow through the solenoid 153 of the clutch release solenoid valve 150 and the solenoid 133 of the upshift solenoid valve 130. However, the solenoid 2006 of the relay 2005 and the solenoid 2010 of the relay 2009 are unactuated, so that no current flows through the solenoid 143 of the downshift solenoid valve 140 or the solenoid 163 of the reverse shift solenoid valve 160.

The clutch release solenoid valve 150 supplies the fluid pressure produced by the pump 220 to the clutch release servo cylinder 230, which then operates to release the clutch 29. The upshift solenoid valve 130 supplies the fluid pressure to the upshift fluid chamber 251 of the servo means 250. The cam plate 102 is now rotated from its "second" position shown in FIG. 14 to the "third" position shown in FIG. 15. By this rotation of the cam plate 102, the low speed fork plate 88 is moved to its "neutral" position N, whereas the high speed fork plate 89 is moved to its illustrated "third" position. The pin-type synchro means 80 operates to disengage the "second" gear 78 from the transmission output shaft 76. The Warner-type synchro means 81 also operates to engage the transmission input shaft 45 with the output shaft 76.

When the cam plate 102 is rotated to its "third" position as shown in FIG. 15 so that the transmission is set in third gear, all of the NAND elements 1614 through 1621 of the up-and-down shift sensing circuit 1600 produce high voltages (see Table 6). As the output voltage of the NAND element 1831 of the up-and-down control circuit 1800 again becomes high, the solenoid 2002 of the relay 2001 of the up-and-down and reverse drive circuit 2000 is now unactuated, so that no current flows through the solenoid 153 of the clutch release solenoid valve 150 or the solenoid 133 of the upshift solenoid valve 130.

Accordingly, the clutch release solenoid valve 150 discommunicates the clutch release servo cylinder 230 from the pump 200 and communicates the cylinder with the sump 214. The upshift solenoid valve 130 discommunicates the upshift fluid chamber 251 of the servo means 250 from the pump 220 and communicates the fluid chamber with the sump 214. The transmission is thus kept in third gear, and the clutch 29 is engaged, so that the vehicle starts running in third gear. No further shift transition takes place unless the manual shift lever is operated.

In addition to the regular or gradual upshifts described in the foregoing, the transmission also permits shifts from netural to second or third gear, from low to third gear, and so forth, as hereinafter described in detail.

When the manual shift lever is moved from its "neutral" to "second" position, the NAND elements 1539 and 1552 of the manual shift sensing circuit 1500 produce low voltages, while its NAND elements 1504, 1510, 1541 and 1543 produce high voltages (see Table 5). Thus, in the up-and-down shift sensing circuit 1600, the NAND element 1614 produces a low voltage while the other NAND elements 1615 through 1621 produce high voltages (see Table 6). Thus, in the up-and-down control circuit 1800, the NAND element 1831 produces a low voltage while the other NAND element 1833 produces a high voltage. The NAND element 1907 of the reverse control circuit 1900 also produces a high voltage. Accordingly, in the up-and-down and reverse drive circuit 2000, only the solenoid 2002 of the relay 2001 is actuated thereby closing the switches 2014 and 2059, so that an electric current flows through the solenoid 153 of the clutch release solenoid valve 150 and the solenoid 133 of the upshift solenoid valve 130. The solenoid 2006 of the relay 2005 and the solenoid 2010 of the realy 2009 are unactuated, so that no current flows through the solenoid 143 of the downshift solenoid valve 140 or the solenoid 163 of the reverse shift solenoid valve 160.

The clutch release solenoid valve 150 operates to supply the fluid pressure produced by the pump 220 to the clutch release servo cylinder 230, which then operates to release the clutch 29. The upshift solenoid valve 130 also operates to supply the fluid pressure to the upshift fluid chamber 251 of the servo means 250. By the operation of this servo means 250, the cam plate 102 is rotated from its "neutral" position shown in FIG. 12 to the "second" position shown in FIG. 14, so that the low speed fork plate 88 is moved to its illustrated "second" position while the high speed fork plate 89 remains neutral. The pin-type synchro means 80 now operates to engage the "second" gear 78 with the transmission output shaft 76. When the transmission is thus set in second gear, all of the NAND elements 1614 through 1621 of the up-and-down shift sensing circuit 1600 produce high voltages (see Table 6), so that the output voltage of the NAND element 1831 of the up-and-down control circuit 1800 again becomes high. Since then the solenoid 2002 of the relay 2001 of the up-and-down and reverse drive circuit 2000 is unactuated, no current is supplied to the solenoid 153 of the clutch release solenoid valve 150 or the solenoid 133 of the upshift solenoid valve 130. The servo means 250 becomes inoperative. The transmission thus remains in second gear, and the clutch 29 is now engaged.

When the manual shift lever is moved from its "neutral" to "third" position, the NAND elements 1539 and 1543 of the manual shift sensing circuit 1500 produce low voltages, while the other NAND elements 1504, 1510, 1541 and 1552 produce high voltages (see Table 5). Thus, in the up-and-down shift sensing circuit 1600, the NAND element 1614 produces a low voltage, while the other NAND elements 1615 through 1621 produce high voltages (see Table 6). Thus, in the up-and-down control circuit 1800, the NAND element 1831 produces a low voltage, while the other NAND element 1833 produces a high voltage. The NAND element 1907 of the reverse control circuit 1900 also produces a high voltage. Accordingly, in the up-and-down and reverse drive circuit 2000, only the solenoid 2002 of the relay 2001 is actuated thereby closing the switches 2014 and 2029, so that an electric current flows through the solenoid 153 of the clutch release solenoid valve 150 and the solenoid 133 of the upshift solenoid valve 130. The solenoid 2006 of the relay 2005 and the solenoid 2010 of the relay 2009 are unactuated so that no current flows through the solenoid 143 of the downshift solenoid valve 140 or the solenoid 163 of the reverse shift solenoid valve 160.

The clutch release solenoid valve 150 becomes operative to supply the fluid pressure produced by the pump 220 to the clutch release servo cylinder 230, which then operates to release the clutch 29. The upshift solenoid valve 130 also becomes operative to supply the fluid pressure to the upshift fluid chamber 251 of the servo means 250. By the operation of this servo means 250, the cam plate 102 is moved from its "neutral" position shown in FIG. 12 to the "second" position shown in FIG. 14, so that the low-speed fork plate 88 is moved to its illustrated "second" position while the high speed fork plate 89 remains neutral. The pin-type synchro means 80 now operates to temporarily engage the "second" gear 78 with the transmission output shaft 76.

When the transmission is thus temporarily set in second gear, the NAND element 1615 of the up-and-down shift sensing circuit 1600 produces a low voltage while the other NAND elements 1614, 1616, 1617, 1618, 1619, 1620 and 1621 produce high voltages (see Table 6). The output voltage of the NAND element 1831 of the up-and-down control circuit 1800 remains low, so that a current still continues flowing through the solenoid 153 of the clutch release solenoid valve 150 and the solenoid 133 of the upshift solenoid valve 130.

Accordingly, the clutch release servo cylinder 230 remains operative to keep the clutch 29 released. The servo means 250 also remains operative to further rotate the cam plate 102 from its "second" position shown in FIG. 14 to the "third" position shown in FIG. 15. By this rotation of the cam plate 102, the low speed fork plate 88 is moved to its illustrated "neutral" position and the high speed fork plate 89 to its illustrated "third" position. Thereupon the pin-type synchro means 80 disengages the "second" gear 78 from the transmission output shaft 76, and, instead, the Warner-type synchro means 81 engages the transmission input shaft 45 with the output shaft 76.

When the transmission is thus set in third gear, all of the NAND elements 1614 through 1621 of the up-and-down shift sensing circuit 1600 produce high voltages (see Table 6), so that the output voltage of the NAND element 1831 of the up-and-down control circuit 1800 again becomes high. The solenoid 2002 of the relay 2001 of the up-and-down and reverse drive circuit 2000 being no longer actuated, no current flows through the solenoid 153 of the clutch release solenoid valve 150 or the solenoid 133 of the upshift solenoid valve 130.

The clutch release solenoid valve 150 discommunicates the clutch release servo cylinder 230 from the pump 220 and communicates the servo cylinder with the sump 214. The upshift solenoid valve 130 discommunicates the upshift fluid chamber 251 of the servo means 250 from the pump 220 and communicates the fluid chamber with the sump 214. As the servo means 250 thus becomes inoperative, the transmission remains in third gear, and the clutch 29 is engaged.

When the manual shift lever is moved from its "low" to "third" position, the NAND elements 1539 and 1543 of the manual shift sensing circuit 1500 produce low voltages, while its NAND elements 1504, 1510, 1541 and 1552 produce high voltages (see Table 5). Thus, in the up-and-down shift sensing circuit 1600, the NAND element 1614 produces a low voltage, while all of the NAND elements 1615 through 1621 produce high voltages (see Table 6). Thus, in the up-and-down control circuit 1800, the NAND element 1831 produces a low voltage while the NAND element 1833 produces a high voltage. The NAND element 1907 of the reverse control circuit 1900 also produces a high voltage. Accordingly, in the up-and-down and reverse drive circuit 2000, only the solenoid 2002 of the relay 2001 is actuated thereby closing the switches 2014 and 2029, so that an electric current flows through the solenoid 153 of the clutch release solenoid valve 150 and the solenoid 133 of the upshift solenoid valve 130. Neither the solenoid 2006 of the relay 2005 nor the solenoid 2010 of the relay 2009 is actuated, so that no current flows through the solenoid 143 of the downshift solenoid valve 140 or the solenoid 163 of the reverse shift solenoid valve 160.

The clutch release solenoid valve 150 thus operates to supply the fluid pressure produced by the pump 220 to the clutch release servo cylinder 230, which then operates to release the clutch 29. The upshift solenoid valve 130 also operates to supply the fluid pressure to the upshift fluid chamber 251 of the servo means 250. By the operation of this servo means 250, the cam plate 102 is rotated from its "low" position shown in FIG. 13 to the "neutral" position shown in FIG. 12, so that the low speed fork plate 88 is moved to its illustrated "neutral" position. Thereupon the pin-type synchro means 80 operates to disengage the "low" gear 77 from the transmission output shaft 76.

When the transmission is thus set in neutral, the output voltage of the NAND element 1614 of the up-and-down shift sensing circuit 1600 remains low, while the output voltages of the NAND elements 1615 through 1621 remain high (see Table 6). Hence a current continues flowing through the solenoid 153 of the clutch release solenoid valve 150 and the solenoid 133 of the upshift solenoid valve 130. The clutch release servo cylinder 230 remains operative to keep the clutch 29 released. The servo means 250 also remains operative to further rotate the cam plate 102 from its "neutral" position shown in FIG. 12 to the "second" position shown in FIG. 14, so that the low speed fork plate 88 is now moved to its illustrated "second" position while the high speed fork plate 89 remains neutral. The pin-type synchro means 80 engages the "second" gear 78 with the transmission output shaft 76.

When the transmission is thus shifted to second gear, the NAND element 1615 of the up-and-down shift sensing circuit 1600 produces a low voltage, while the other NAND elements 1614, 1616, 1617, 1618, 1619, 1620 and 1621 produce high voltages (see Table 6). However, the output voltage of the NAND element 1831 of the up-and-down control circuit 1800 remains low, so that t current continues flowing through the solenoid 153 of the clutch release solenoid valve 150 and the solenoid 133 of the upshift solenoid valve 130. The clutch release servo cylinder 230 still remains operative to keep the clutch 29 release. The servo means 250 also remains operative to further rotate the cam plate 102 from its "second" to "third" position of FIG. 15, so that the low speed fork plate 88 is now moved to its "neutral" position and the high speed fork plate 89 to the illustrated "third" position. The pin-type synchro means 80 again becomes operative to disengage the "second" gear 78 from the transmission output shaft 76, and the Warner-type synchro means 81 also becomes operative to engage the transmission input shaft 45 with the output shaft 76.

When the transmission is thus set in third gear, all of the NAND elements 1614 through 1621 of the up-and-down shift sensing circuit 1600 produce high voltages (see Table 6). Since then the output voltage of the NAND element 1831 of the up-and-down control circuit 1800 becomes high, the solenoid 2002 of the relay 2001 of the up-and-down and reverse drive circuit 2000 is no longer actuated, so that no current flows through the solenoid 153 of the clutch release solenoid valve 150 or the solenoid valve 130. The transmission thus remains in third gear, and the clutch 29 is now engaged.

Described hereinbelow are the operations of the transmission control system of this invention in case of various downshifts.

When the manual shift lever is moved from its "third" to "second" position, the NAND elements 1539 and 1552 of the manual shift sensing circuit 1500 produce low voltages, while the other NAND elements 1504, 1510, 1541 and 1543 produce high voltages (see Table 5). Thus, in the up-and-down shift sensing circuit 1600, the NAND element 1618 produces a low voltage, the other NAND elements 1614, 1615, 1616, 1617, 1619, 1620 and 1621 producing high voltages (see Table 6). In the up-and-down control circuit 1800, the NAND element 1833 produces a low voltage while the NAND element 1831 produces a high voltage. The NAND element 1907 of the reverse control 1900 also produces a high voltage. Hence, in the up-and-down and reverse drive circuit 2000, only the solenoid 2006 of the relay 2005 is actuated thereby closing the switches 2017 and 2030, so that an electric current flows through the solenoid 153 of the clutch release solenoid valve 150 and the solenoid 143 of the downshift solenoid valve 140. The solenoid 2002 of the relay 2001 and the solenoid 2010 of the relay 2009 are both unactuated, so that no current flows through the solenoid 133 of the upshift valve 130 or the solenoid 163 of the reverse shift solenoid valve 160.

The clutch release solenoid valve 150 becomes operative to supply the fluid pressure produced by the pump 220 to the clutch release servo cylinder 230, which then operates to release the clutch 29. The downshift solenoid valve 140 also operates to supply the fluid pressure to the downshift fluid chamber 252 of the servo means 250. By the operation of this servo means 250, the cam plate 102 is rotated from its "third" position shown in FIG. 15 to the "second" position shown in FIG. 14, so that the high speed fork plate 89 is moved to its illustrated "neutral" position and the low speed fork plate 88 to its illustrated "second" position. The Warner-type synchro means 81 disengages the transmission input shaft 45 from the output shaft 76, while the pin-type synchro means 80 engages the "second" gear 78 with the output shaft.

When the transmission is thus set in second gear, all of the NAND elements 1614 through 1621 of the up-and-down shift sensing circuit 1600 produce high voltages (see Table 6). The output voltage of the NAND element 1833 of the up-and-down control circuit 1800 becomes high. The solenoid 2006 of the relay 2005 of theh up-and-down and reverse drive circuit 2000 is no longer actuated, so that no current flows through the solenoid 153 of the clutch release solenoid valve 150 or the solenoid 143 of the downshift solenoid valve 140.

The clutch release solenoid valve 150 discommunicates the clutch release servo cylinder 230 from the pump 230 and communicates the servo cylinder with the sump 214. The downshift solenoid valve 140 discommunicates the downshift fluid chamber of the servo means 250 from the pump 220 and communicates the downshift fluid chamber with the sump 214. The clutch 29 is thus engaged, and the transmission is kept in second gear.

When the manual shift lever is moved from its "second" to "low" position, the NAND elements 1539 and 1541 of the manual shift sensing circuit 1500 produce low voltages, while its NAND elements 1504, 1510, 1543 and 1552 produce high voltags (see Table 5). Thus, in the up-and-down shift sensing circuit 1600, the NAND element 1619 produces a low voltage, while the other NAND elements 1614, 1615, 1616, 1617, 1618, 1620 and 1621 produce high voltages (see Table 6). The NAND element 1833 of the up-and-down control circuit 1800 produces a low voltage, and its NAND element 1831 a high voltage. The NAND element 1907 of the reverse control circuit 1900 also produces a high voltage. Hence, in the up-and-down and reverse control circuit 2000, only the solenoid 2006 of the relay 2005 is actuated thereby closing the switches 2017 and 2030, so that an electric current flows through the solenoid 153 of the clutch release solenoid valve 150 and the solenoid 143 of the downshift solenoid valve 140. No current flows through the solenoid 133 of the upshift solenoid valve 130 or the solenoid 163 of the reverse shift solenoid valve 160 because then the solenoid 2002 of the relay 2001 and the solenoid 2010 of the relay 2009 are both unactuated.

Accordingly, the clutch release solenoid valve 150 operates to supply the fluid pressure from the pump 220 to the clutch release servo cylinder 230, which then operates to release the clutch 29. The downshift solenoid valve 140 also operates to supply the fluid pressure to the downshift fluid chamber 252 of the servo means 250. By the operation of this servo means 250, the cam plate 102 is rotated from its "second" position shown in FIG. 14 to the "neutral" position shown in FIG. 12, so that the low speed fork plate 88 is moved to its illustrated position. Thereupon the pin-type synchro means 80 disengages the "second" gear 78 from the transmission output shaft 76.

Although the transmission is thus temporarily shiftei to neutral, the output voltage of the NAND element 1619 of the up-and-down shift sensing circuit 1600 remains low, and the output voltages of its NAND elements 1614, 1615, 1616, 1617, 1618, 1620 and 1621 remain high (see Table 6). A current continues flowing through the solenoid 153 of the clutch release solenoid valve 150 and the solenoid 143 of the downshift solenoid valve 140.

The clutch release servo cylinder 230 remains operative to keep the clutch 29 released. The servo means 250 also remains operative to further rotate the cam plate 102 from its "neutral" to "low" position shown in FIG. 13, so that the low speed fork plate 88 is now shifted to its illustrated "low" position. Thereupon the pintype synchro means 80 engages the "low" gear 77 with the transmission output shaft 76.

When the transmission is thus set in low gear, all of the NAND elements 1614 through 1621 of the up-and-down shift sensing circuit 1600 produce high voltages (see Table 6), so that the output voltage of the NAND element 1833 of the up-and-down control circuit 1800 also becomes high. The solenoid 2006 of the relay 2005 of the up-and-down and reverse drive circuit 2000 being no longer actuated, no current flows through the solenoid 153 of the clutch release solenoid valve 150 or the solenoid 143 of the downshift solenoid valve 140.

The clutch release solenoid valve 150 discommunicates the clutch release servo cylinder 230 from the pump 220 and communicates the servo cylinder with the sump 214. The downshift solenoid valve 140 also discommunicates the downshift fluid chamber 252 of the servo means 250 from the pump 220 and communicates the fluid chamber with the sump 214. The clutch 29 is thus engaged, and the transmission remains in the precedingly set low gear.

When the manual shift lever is moved from its "low" to "neutral" position, and if the number of wheel pulses supplied to the counter 1301 of the counting circuit 1300, FIG. 20, via the vehicle speed gate circuit 700 during the conduction thereof is less than 10 so that the output voltage of the NAND element 1426 of the hysteresis control circuit 1400, FIG. 21, is high, then the NAND elements 1539 and 1510 of the manual shift sensing circuit 1500 produce low voltages and its NAND elements 1504, 1541, 1543 and 1552 produce high voltages (see Table 5). Thus, in the up-and-down shift sensing circuit 1600, the NAND element 1620 produces a low voltage while the other NAND elements 1614, 1615, 1616, 1617, 1618, 1619 and 1621 produce high voltages (see Table 6). Thus, in the up-and-down control circuit 1800, the NAND element 1831 produces a low voltlage and the NAND element 833 a high voltage. The NAND element 1907 of the reverse control circuit 1900 also produces a high voltage. Accordingly, in the up-and-down and reverse drive circuit 2000, only the solenoid 2002 of the relay 2001 is actuated thereby closing the switches 2014 and 2029, so that a current flows through the solenoid 153 of the clutch release solenoid valve 150 and the solenoid 133 of the upshift solenoid valve 130. No current flows through the solenoid 143 of the downshift solenoid valve 140 or the solenoid 163 of the reverse shift solenoid valve 160 because then the solenoid 2006 of the relay 2005 and the solenoid 2010 of the relay 2009 are both unactuated.

The clutch release solenoid valve 150 supplies the fluid pressure from the pump 220 to the clutch release servo cylinder 230, which then operates to release the clutch 29. The upshift solenoid valve 130 supplies the fluid pressure to the upshift fluid chamber 251 of the servo means 250. By the operation of this servo means 250, the cam plate 102 is rotated from its "low" position shown in FIG. 13 to the "neutral" position shown in FIg. 12, so that the low speed fork plate 88 is shifted to its illustrated position. Thereupon the pin-type synchro means 80 disengages the "low" gear 77 from the transmission output shaft 76.

When the transmission is thus set in neutral, all of the NAND elements 1614 through 1621 of the up-and-down shift sensing circuit 1600 produce high voltages (see Table 6), so that the output voltage of the NAND element 1831 of the up-and-down control circuit 1800 becomes high. Since the solenoid 2002 of the relay 2001 of the up-and-down and reverse drive circuit 2000 is no longer actuated, no current flows through the solenoid 153 of the clutch release solenoid valve 150 or the solenoid 133 of the upshift solenoid valve 130.

The clutch release solenoid valve 150 discommunicates the clutch release servo cylinder 230 from the pump 220 and communicates the servo cylinder with the sump 214. The upshift solenoid valve 130 also discommunicates the upshift fluid chamber 251 of the servo means 250 from the pump 220 and communicates the fluid chamber with the sump 214. The clutch 29 is thus engaged, and the transmission is kept in neutral.

If, in the above case, the number of wheel pulses supplied to the counter 1301 of the counting circuit 1300 via the vehicle speed gate circuit 700 during conduction thereof is not less than 10, the NAND element 1426 of the hysteresis control circuit 1400 will produce a low voltage. Thus, the output voltage of the NAND element 1510 of the manual shift sensing circuit 1500 will not become low when the manual shift lever is moved to its "neutral" position (see Table 5), so that the above described procedure will not take place.

When the manual shift lever is moved from its "third" to "neutral" position, and if, as in the preceding case, the output voltage of the NAND element 1426 of the hysteresis control circuit 1400 is high, the NAND elements 1539 and 1510 of the manual shift sensing circuit 1500 produce low voltages while the other NAND elements 1504, 1541, 1543 and 1552 produce high voltages (see Table 5). Thus, in the up-and-down shift sensing circuit 1600, the NAND element 1618 produces a low voltage while all of the other NAND elements 1614, 1615, 1616, 1617, 1619, 1620 and 1621 produce high voltages (see Table 6). In the up-and-down control circuit 1800, therefore, the NAND element 1833 produces a low voltage and the NAND element 1831 a high voltage. The NAND element 1907 of the reverse control circuit 1900 also produces a high voltage. Hence, in the up-and-down and reverse drive circuit 2000, only the solenoid 2006 of the relay 2005 is actuated thereby closing the switches 2017 and 2030, so that an electric current flows through the solenoid 153 of the clutch release solenoid valve 150 ad the solenoid 143 of the downshift solenoid valve 140.

The clutch release solenoid valve 150 supplies the fluid pressure from the pump 220 to the clutch release serve cylinder 230, which then operates to release the clutch 29. The downshift solenoid valve 140 supplies the fluid pressure to the downshift fluid chamber 252 of the servo means 250. By the operation of this servo means 250, the cam plate 102 is rotated from its "third" position shown in FIG. 15 to the "second" position shown in FIG. 14, so that the high speed fork plate 89 is moved to its illustrated "neutral" position while the low speed fork plate 88 is moved to its illustrated "second " position. Thereupon the transmission input shaft 45 is disengaged from the output shaft 76 by the Warner-type synchro means 81, and the "second" gear is engaged with the output shaft 76 by the pin-type synchro means 80.

When the transmission is thus temporarily shifted to second gear, the output voltage of the NAND element 1621 of the up-and-down shift sensing circuit 1600 becomes low, and the output voltages of all of the other NAND elements 1614 through 1620 become high. However, the output voltage of the NAND element 1833 of the up-and-down control circuit 1800 remains high, so that a current continues flowing through the solenoid 153 of the clutch release solenoid valve 150 and the solenoid 143 of the downshift solenoid valve 140.

The clutch release servo cylinder 230 thus remains operative to keep the clutch 29 released. The servo means 250 also remains operative to further rotate the cam plate 102 from its "second" position shown in FIG. 14 to the "neutral" position shown in FIG. 12, so that the low speed fork plate 88 is moved to its illustrated "neutral" position. The "second" gear 78 is now disengaged from the transmission output shaft 76 by the pin-type synchro means 80.

When the transmission is thus set in neutral, all of the NAND elements 1614 through 1621 of the up-and-down shift sensing circuit 1600 produce high voltages (see Table 6). Since the output voltage of the NAND element 1833 of the up-and-down control circuit 1800 becomes high, the solenoid 2006 of the relay 2005 of the up-and-down and reverse drive circuit 2000 is no longer actuated thereby preventing the flow of current through the solenoid 153 of the clutch release solenoid valve 150 and the solenoid 143 of the downshift solenoid valve 140.

The clutch release solenoid valve 150 discommunicates the clutch release servo cylinder 230 from the pump 220 and communicates the servo cylinder with the sump 214. The downshift solenoid valve 140 discommunicates the downshift fluid chamber 252 of the servo means 250 from the pump 220 and communicates the fluid chamber with the sump 214. The clutch 29 is thus, engaged, and the transmission is kept neutral. It will be understood that the above described procedure does not take place in case the output voltage of the NAND element 1426 of the hysteresis control circuit 1400 is low.

When the manual shift lever is moved from its "third" to "low" position, the NAND elements 1539 and 1541 of the manual shift sensing circuit 1500 produce low voltages while its NAND elements 1504, 1510, 1543 and 1552 produce high voltages (see Table 5). Thus, in the up-and-down shift sensing circuit 1600, the NAND element 1618 produces a low voltage while the other NAND elements 1614, 1615, 1616, 1617, 1619, 1620 and 1621 produce high voltages (see Table 6). In the up-and-down control circuit 1800, the NAND element 1833 produces a low voltage and the other NAND element 1831 a high voltage. The NAND element 1907 of the reverse control circuit 1900 also produces a high voltage. Accordingly, in the up-and-down and reverse drive circuit 2000, the solenoid 2002 of the relay 2001 is actuated thereby closing the switches 2014 and 2029, so that an electric current flows through the solenoid 153 of the clutch release solenoid valve 150 and the solenoid 143 of the downshift solenoid valve 140. However, since the solenoid 2006 of the relay 2005 and the solenoid 2010 of the relay 2009 are both unactuated, no current flows through the solenoid 133 of the upshift solenoid valve 130 or the solenoid 163 of the reverse shift solenoid valve 160.

The clutch release solenoid valve 150 supplies the fluid pressure from the pump 220 to the clutch release servo cylinder 230, which then operates to release the clutch 29. The downshift solenoid valve 140 supplies the fluid pressure from the pump 220 to the downshift fluid chamber 252 of the servo means 250. By the operation of this servo means 250, the cam plate 102 is rotated from its "third" position shown in FIG. 15 to the "second" position shown in FIG. 14, so that the high speed fork plate 89 is moved to its illustrated "neutral" position and the low speed fork plate 88 to its illustrated "second" position. Thereupon the Warner-type synchro means 81 disengages the transmission input shaft 45 from the output shaft 76, and the pin-type synchro means 80 engages the "second" gear 78 with the output shaft 76.

When the transmission is thus temporarily shifted to second gear, the NAND element 1619 of the up-and-down shift sensing circuit 1600 produces a low voltage while, the other NAND elements 1614, 1615, 1616, 1617, 1618, 1620 and 1621 produce high voltages (see Table 6). However, the output voltage of the NAND element 1833 of the up-and-down control circuit 1800 remains high, so that a current continues flowing through the solenoid 153 of the clutch release solenoid valve 150 and the solenoid 143 of the downshift solenoid valve 140.

Accordingly, the clutch release servo cylinder 230 remains operative to keep the clutch 29 released. The servo means 250 also remains operative to further rotate the cam plate 102 from its "second" position shown in FIG. 14 to the "neutral" position shown in FIG. 12, so that the low speed fork plate 88 is now moved to its "neutral" position. The "second" gear 78 is again disengaged from the transmission output shaft 76 by the pin-type synchro means 80.

Although the transmission is thus shifted to neutral, the output voltage of the NAND element 1619 of the up-and-down sensing circuit 1600 remains low, and the output voltages of the other NAND elements thereof remain high. As a result, an electric current still continues flowing through the solenoid 153 of the clutch release solenoid valve 150 and the solenoid 143 of the downshift solenoid valve 140. The clutch release servo cylinder 230 remains operative to keep the clutch 29 released, and the servo means 250 also remains operative to further rotate the cam plate 102 from its "neutral" position shown in FIG. 12 to the "low" position shown in FIG. 13. As the low speed fork plate 88 is moved to its illustrated "low" position, the pin-type synchro means 80 engages the "low" gear 77 with the transmission output shaft 76.

When the transmission is thus set in low gear, all of the NAND elements 1614 through 1621 of the up-and-down shift sensing circuit 1600 produce high voltages (see Table 6). The output voltage of the NAND element 1833 of the up-and-down control circuit 1800 again becomes high. Since then the solenoid 2006 of the relay 2005 of the up-and-down and reverse drive circuit 2000 is no longer actuated, no current flows through the solenoid 153 of the clutch release solenoid valve 150 or the solenoid 143 of the downshift solenoid valve 140. The transmission is thus maintained in low gear, and the clutch is engaged.

When the manual shift lever is moved from its "second" to "neutral" position, and if the output voltage of the NAND element 1426 of the hysteresis control circuit 1400 is high, the NAND elements 1510 and 1539 of the manual shift sensing circuit 1500 produce low voltages, and the other NAND elements 1504, 1541, 1543 and 1552 produce high voltages (see Table 5). Thus, in the up-and-down shift sensing circuit 1600, the NAND element 1621 produces a low voltage, and the other NAND elements 1614 through 1620 produce high voltages (see Table 6). In the up-and-down control circuit 1800, the NAND element 1833 produces a low voltage, and the NAND element 1831 produces a high voltage. The NAND element 1907 of the reverse control circuit 1900 also produces a high voltage. In the up-and-down and reverse drive circuit 2000, therefore, the solenoid 2006 of the relay 2005 is actuated thereby closing the switches 2017 and 3030, so that an electric current flows through the solenoid 153 of the clutch release solenoid valve 150 and the solenoid 143 of the downshift solenoid valve 140.

Consequently, the clutch release solenoid valve 150 supplies the fluid pressure from the pump 220 to the clutch release servo cylinder 230, which then operates to release the clutch 29. The downshift solenoid valve 140 supplies the fluid pressure from the pump 220 to the downshift fluid chamber 252 of the servo means 250. By the operation of this servo means 250, the cam plate 102 is rotated from its "second" position shown in FIG. 14 to the "neutral" position shown in FIG. 12, so that the low speed fork plate 88 is moved to its illustrated "neutral" position. Thereupon the pin-type synchro means 80 disengages the "second" gear 78 from the transmission output shaft 76.

When the transmission is thus set in neutral, all of the NAND elements 1614 through 1621 of the up-and-down sensing circuit 1600 produce high voltages (see Table 6). The output voltage of the NAND element 1833 of the up-and-down control circuit 1800 becomes high. Hence, in the up-and-down and reverse drive circuit 2000, the solenoid 2006 of the relay 2005 is no longer actuated thereby preventing the flow of current through the solenoid 153 of the clutch release solenoid valve 150 and the solenoid 143 of the downshift solenoid valve 140. The transmission is maintained in neutral, and the clutch is engaged. It will be apparent that when the output voltage of the NAND element 1426 of the hysteresis control circuit 1400 is low, the above described procedure does not take place when the manual shift lever is moved to its "neutral" position.

When the manual shift lever is moved to its "reverse" position, the NAND element 1539 of the manual shift sensing circuit 1500 produces a high voltage. If, in this instance, the transmission is neutral, the NAND element 1907 of the reverse control circuit 1900 will produce a low voltage. The solenoid 2010 of the relay 2009 of the up-and-down and reverse drive circuit 2000 will now be actuated, thereby closing the switches 2020 and 2032, so that an electric current will flow through the solenoid 153 of the clutch release solenoid valve 150 and the solenoid 163 of the reverse shift solenoid valve 160.

The clutch release solenoid valve 150 supplies the fluid pressure from the pump 220 to the clutch release servo cylinder 230, which then operates to release the clutch 29. The reverse shift solenoid valve 160 supplies the fluid pressure to the servomotor 200, FIGS. 9 and 11, which then operates to engage the "reverse" gear 83 with the "reverse" counter gear 55. The switch 2025 of the up-and-down and reverse drive circuit 2000 is thereupon closed to light up and back lamp 2022. An electric current also flows through the solenoid 2024 of the relay 2023, so that the switch 2031 is opened to prevent the flow of current through the solenoid 153 of the clutch release solenoid valve 150. The clutch release solenoid valve 150 discommunicates the clutch release servo cylinder 230 from the pump 220 and communicates the servo cylinder with the sump 214. The clutch 29 is now engaged.

Unless the transmission is neutral, the output voltage of the NAND element 1907 of the reverse control circuit 1900 does not become low even when the manual shift lever is moved to its "reverse" position. However, if the vehicle is running at such low speed that the output voltage of the NAND element 1426 of the hysteresis control circuit 1500 will produce a low voltage (see Table 5). Hence, the transmission is first shifted to neutral and then to reverse.

It will again be supposed that the vehicle is now at rest and that the transmission is set in neutral by the manual shift lever. Then no wheel pulse is produced by the vehicle speed detecting section 500 and amplifying/shaping circuit 600, FIG. 18. Consequently, the output voltages of the decoders 1307 and 1310 of the counting circuit 1300, FIG. 20, are low. The output voltage of the flip flop 1440 of the hysteresis control circuit 1400 is high, and the output voltages of the other flip flops 1441, 1442 and 1445 are low (see Table 4).

If, in this instance, the payload of the vehicle exceeds the limit predetermined in relation with the operation of the switch 1544 of the manual shift sensing circuit 1500, or if the inclination of the road exceeds the limit predetermined in relation with the operation of the switch 1545 of the manual shift sensing circuit, with the result that at least one of these switches 1544 and 1545 is closed, the NAND elements 1539 and 1541 of the manual shift sensing circuit 1500 will produce low voltages and other NAND elements 1504, 1510, 1543 and 1552 will produce high voltages (see Table 5) when the manual shift lever is succeedingly moved from its "neutral" to "drive" position. This condition also occurs when, as above described, the manual shift lever is moved from its "neutral" to "low" position. As a result, the vehicle starts running in low gear when the accelerator pedal is depressed.

If the vehicle payload does not reach the limit predetermined in relation with the operation of the switch 1544 of the manual shift sensing circuit 1500, and if the road inclination does not reach the limit predetermined in relation with the operation of the switch 1545, so that these switches 1544 and 1545 are both open, the NAND elements 1539 and 1552 of the manual shift sensing circuit 1500 will produce low voltages and the other NAND elements 1504, 1510, 1541 and 1543 will produce high voltages (see Table 5) when the manual shift lever is moved from its "neutral" to "drive" position. This condition also occurs when the manual shift lever is moved from its "neutral" to "second" position, so that the vehicle starts running in second gear when the accelerator pedal is depressed.

When the vehicle starts running in this manner, wheel pulses having a frequency proportional to the vehicle speed are produced by the vehicle speed detecting section 500 and amplifying/shaping circuit 600, and are supplied to the vehicle speed gate circuit 700. When the number of these wheel pulses supplied to the counter 1301 of the counting circuit 1300 via the vehicle speed gate circuit 700 during the conduction thereof reaches 15, the flip flop 1441 of the hysteresis control circuit 1400 produces a high voltage, and the other flip flops 1440, 1442 and 1445 produce low voltages (see Table 3). Hence, in the manual shift sensing circuit 1500, the NAND elements 1539 and 1552 produce low voltages, and the other NAND elements 1504, 1510, 1541 and 1543 produce high voltages (see Table 5).

Accordingly, if the vehicle starts running in low gear, the transmission will be automatically shifted from low to second gear through the same procedure as when the manual shift lever is moved from its "low" to "second" position. If the vehicle starts running in second gear, no shift transition will take place.

As the vehicle speed increaes so that the number of wheel pulses supplied to the counter 1301 of the counting circuit 1300 via the vehicle speed gate circuit 700 during the conduction thereof reaches 30, the flip flop 1442 of the hysteresis control circuit 1400 produces a high voltage, and the other flip flops 1440, 1441 and 1445 produce low voltages (see Table 3). Hence, in the manual shift sensing circuit 1500, the NAND elements 1539 and 1543 produce low voltages, and the NAND elements 1504, 1510, 1541 and 1552 produce high voltages (see Table 5). The transmission is then automatically shifted from second to third gear through the same procedure as when the manual shift lever is moved from its "second" to "third" position.

As the vehicle speed further increases so that the number of wheel pulses supplied to the counter 1301 of the counting circuit 1300 via the vehicle speed gate circuit 700 during the conduction thereof reaches 40, the flip flop 1445 of the hysteresis control circuit 1400 produces a high voltage, and the other flip flops 1440, 1441 and 1442 produce low voltages (see Table 3). Hence, in the manual shift sensing circuit 1500, the NAND elements 1504 and 1539 produce low voltages, and the NAND elements 1510, 1541, 1543 and 1552 produce high voltages (see Table 5). Hence, in the up-and-down sensing circuit 1600, the NAND element 1616 produces a low voltage, and the NAND elements 1614, 1615, 1617, 1618, 1619, 1620 and 1621 produce high voltages (see Table 6). Thus the NAND element 1831 of the up-and-down control circuit 1800 produces a low voltage. The solenoid 2002 of the relay 2001 of the up-and-down and reverse drive circuit 2000 is now actuated, thereby closing the switches 2014 and 2029, so that an electric current flows through the solenoid 153 of the clutch release solenoid valve 150 and the solenoid 133 of the upshift solenoid valve 130.

The clutch release solenoid valve 150 supplies the fluid pressure from the pump 220 to the clutch release servo cylinder 230, which then operates to release the clutch 29. The upshift solenoid valve 130 supplies the fluid pressure to the upshift fluid chamber of the servo means 250. By the operation of this servo means 250, the cam plate 102 is rotated from its "third" position shown in FIG. 15 to the "overdrive" position shown in FIG. 16, so that the high speed fork plate 89 is moved to its illustrated "overdrive" position. Thereupon the Warner-type synchro means 81 engages the "overdrive" gear 79 with the transmission output shaft 76.

When the transmission is thus shifted to overdrive, all of the NAND elements 1614, 1615, 1616, 1617, 1618, 1619, 1620 and 1621 of the up-and-down sensing circuit 1600 produce high voltages (see Table 6), so that the output voltage of the NAND element 1831 of the up-and-down control circuit 1800 becomes high. Since the solenoid 2002 of the relay 2001 of the up-and-down and reverse drive circuit 2000 is no longer actuated, no current flows through the solenoid 153 of the clutch release solenoid valve 150 or the solenoid 133 of the upshift solenoid valve 130.

The clutch release solenoid valve 150 discommunicates the clutch release servo cylinder 230 from the pump 220 and communicates the servo cylinder with the sump 214. The upshift solenoid valve 130 similarly discommunicates the upshift fluid chamber 251 of the servo means 250 from the pump 220 and communicates the fluid chamber with the sump 214. The clutch 29 is now engaged, and the vehicle runs in overdrive.

The system of this invention operates as hereinafter described in case the vehicle speed decreases. If now the payload of the vehicle does not reach the first limit predetermined in relation with the operation of the switches 1411 and 1418 of the hysteresis control circuit 1400, and if the inclination of the road does not reach the first limit predetermined in relation with the operation of the switches 1412 and 1419 of the same circuit, so that both of the switches 1418 and 1419 are open and that at least one of the switches 1411 and 1412 is closed, then the flip flop 1442 of the hysteresis control circuit 1400 will produce a high voltage and other flip flops 1440, 1441 and 1445 will produce low voltages (see Table 4) when the number of wheel pulses supplied to the counter 1301 of the counting circuit 1300 via the vehicle speed gate circuit 700 during the conduction thereof becomes 38. Hence, in the manual shift sensing circuit 1500, the NAND elements 1539 and 1543 produce low voltages and the NAND elements 1504, 1510, 1541 and 1552 produce high voltages (see Table 5). In the up-and-down sensing circuit 1600, the NAND element 1617 produces a low voltage, and the NAND elements 1614, 1615, 1616, 1618, 1619, 1620 and 1621 produce high voltages (see Table 6). Thus the NAND element 1833 of the up-and-down control circuit produces a low voltage. The solenoid 2006 of the relay 2005 of the up-and-down and reverse drive circuit 2000 is now actuated thereby closing the switches 2017 and 2030, so that an electric current flows through the solenoid 153 of the clutch release solenoid valve 150 and the solenoid 143 of the downshift solenoid valve 140.

The clutch release solenoid valve 150 delivers the fluid pressure from the pump 220 to the clutch release servo cylinder 230, which then operates to release the clutch 29. The downshift solenoid valve 140 delivers the fluid pressure to the downshift fluid chamber 252 of the servo means 250. By the operation of this servo means 250, the cam plate 102 is rotated from its "overdrive" position shown in FIG. 16 to the "third" position shown in FIG. 15, so that the high speed fork plate 89 is moved to its illustrated "third" position. Thereupon the Warner-type synchro means 81 engages the transmission input shaft 45 with the output shaft 76.

When the transmission is thus shifted to third gear, all of the NAND elements 1614 through 1621 of the up-and-down sensing circuit 1600 produce high voltages (see Table 6), so that the output voltage of the NAND element 1833 of the up-and-down control circuit 1800 becomes high. The solenoid 2006 of the relay 2005 of the up-and-down and reverse drive circuit 2000 is no longer actuated, so that no current flows through the solenoid 153 of the clutch release solenoid valve 150 or the solenoid 143 of the downshift solenoid valve 140.

The clutch release solenoid valve 150 discommunicates the clutch release servo cylinder 230 from the pump 220 and communicates the servo cylinder with the sump 214. The downshift solenoid valve 140 also discommunicates the downshift fluid chamber 252 of the servo means 250 from the pump 220 and communicates the fluid chamber with the sump 214. The clutch 29 is now engaged, and the vehicle runs in third gear.

As the vehicle speed decreases so that the number of wheel pulses supplied to the counter 1301 of the counting circuit 1300 via the vehicle speed gate circuit 700 during the conduction thereof becomes 28, the flip flop 1441 of the hysteresis control circuit 1400 produces a high voltage and the other flip flops 1440, 1442 and 1445 produce low voltages (see Table 4). Hence, in the manual shift sensing circuit 1500, the NAND elements 1539 and 1552 produce low voltages, and the NAND elements 1504, 1510, 1541 and 1543 produce high voltages (see Table 5). As a result, the transmission is automatically shifted from third to second gear through the same procedure as when the manual shift lever is moved from its "third" to "second" position.

As the vehicle speed further decreases so that the number of wheel pulses supplied to the counter 1301 of the counting circuit 1300 via the vehicle speed gate circuit 700 during the conduction thereof becomes 8, the flip flop 1440 of the hysteresis control circuit 1400 produces a high voltage and the other flip flops 1441, 1442 and 1445 produce low voltages (see Table 4).

If, in this instance, the payload of the vehicle exceeds the limit predetermined in relation with the operation of the switch 1544 of the manual shift sensing circuit 1500, or if the inclination of the road exceeds the limit predetermined in relation with the operation of the switch 1545 of the same circuit, so that at least one of these switches 1544 and 1545 is closed, then the NAND elements 1539 and 1541 of the manual shift sensing circuit 1500 will produce low voltages, and the other NAND elements 1504, 1510, 1543 and 1552 will produce high voltages (see Table 5). Consequently, the transmission will be automatically shifted from second to low gear through the same procedure as when the manual shift lever is moved from its "second" to "low" position.

If, the above instance, the vehicle payload falls short of the limit predetermined in relation with the operation of the switch 1544 of the manual shift sensing circuit 1500, and if the road inclination also falls short of the limit predetermined in relation with the operation of the switch 1545 of the same circuit, so that these switches are both opened, then the output voltages of the NAND elements 1539 and 1552 of the manual shift sensing circuit 1500 will remain low, and the output voltages of the NAND elements 1504, 1510, 1541 and 1543 will remain high (see Table 5). Hence, the transmission will be kept in the precedingly set second gear.

When the vehicle payload lies intermediate between the first and the second limit predetermined in relation with the operation of the switches 1411 and 1418 of the hysteresis control circuit 1400, or when the road inclination lies intermediate between the first and the second limit predetermined in relation with the operation of the switches 1412 and 1419 of the same circuit, so that both of the switch 1411 and 1412 are open and that at least one of the switches 1418 and 1419 is closed, then the flip flop 1442 of the hysteresis control circuit 1400 produces a high voltage and the other flip flops 1440, 1441 and 1445 produce low voltages (see Table 4) when the number of wheel pulses supplied to the counter 1301 of the counting circuit 1300 via the vehicle speed gate circuit 700 during the conduction thereof has decreased to 37. Then the transmission is shifted from overdrive to third gear.

When the number of wheel pulses has decreased to 27, the flip flop 1441 of the hysteresis control circuit 1400 produces a high voltage, and the other flip flops 1440, 1442 and 1445 produce low voltages (see Table 4). Then the transmission is shifted from third to second gear. Further when the number of wheel pulses has decreased to 7, the flip flop 1440 of the hysteresis control circuit 1400 produces a high voltage, and the other flip flops 1441, 1442 and 1445 produce low voltages (see Table 4). Then the transmission is shifted from second to low gear, or is maintained in second gear.

When the vehicle payload exceeds the second limit predetermined in relation with the operation of the switches 1411 and 1418 of the hysteresis control circuit 1400, or when the road inclination exceeds the second limit predetermined in relation with the operation of the switches 1412 and 1419 of the same circuit, so that these switches are open, then the flip flop 1442 of the hysteresis control circuit 1400 produces a high voltage and the other flip flops 1440, 1441 and 1445 produce low voltages (see Table 4) when the number of wheel pulses supplied to the counter 1301 of the counting circuit 1300 via the vehicle speed gate circuit 700 during the conduction thereof has decreased to 34. Then the transmission is shifted from overdrive to third gear.

When the number of wheel pulses has decreased to 24, the flip flop 1441 of the hysteresis control circuit 1400 produces a high voltate and the other flip flops 1440, 1442 and 1445 produce low voltages (see Table 4). Then the transmission is shifted from third to second gear. Further when the number of wheel pulses has decreased to 4, the flip flop 1440 of the hysteresis control circuit 1400 produces a high voltage and the other flip flops 1441, 1442 and 1445 produce low voltages (see Table 4). Then the transmission is shifted from second to low gear, or is maintained in second gear.

As may now be apparent, the hysteresis between vehicle speed at upshifts and vehicle speed at downshifts automatically increases in response to increase in the payload of the vehicle and in the inclination of the road.

The conduction period of the vehicle speed gate circuit 700, which is under the control of the vehicle speed gate control circuit 1200, is equal to the period of time required for the oscillator circuit 1109 of the time base generating circuit 110 to produce 7 pulses when the accelerator pedal is not depressed to the kickdown position, when the payload of the vehicle falls short of the first limit predetermined in relation with the operation of the switches 1225 and 1232 of the vehicle speed gate control circuit 1200, and when the inclination of the road also falls short of the first limit predetermined in relation with the operation of the switches 1226 and 1232 of the same circuit.

The conduction period of the vehicle speed gate circuit 700 is equal to the period of time required for the oscillator circuit 1109 to produce 6 pulses when the accelerator pedal is not depressed to the kickdown position, and when the vehicle payload lies intermediate between the first and the second limit predetermined in relation with the operation of the switches 1225 and 1232 of the vehicle speed gate control circuit 1200, or when the road inclination lies intermediate between the first and the second limit predetermined in relation with the operation of the switches 1226 and 1233 of the same circuit.

The conduction period is equal to the period of time required for the oscillator circuit 1109 to produce 5 pulses when the accelerator pedal is not depressed to the kickdown position, and when the vehicle payload exceeds the second limit predetermined in relation with the operation of the switches 1225 and 1232 of the vehicle speed gate control circuit 1200, or when the road inclination exceeds the second limit predetermined in relation with the switches 1226 and 1233 of the same circuit. When the accelerator pedal is depressed to the kickdown position, the conduction period is equal to the period of time required for the oscillator circuut 1109 to produce 4 pulses. In this manner, the vehicle speed at the instants of gearshift is automatically made higher with increase in vehicle payload and road inclination, and also in response to the kickdown operation.

Further according to this invention, engine speed is controlled in connection with various gearshifts as hereinafter described. When the NAND element 1831 of the up-and-down control circuit 1800 has produced a high voltage for the upshift of the transmission, the engine speed gate circuit 1000 under the control of the engine speed gate control circuit 2100 is made conductive for a length of time necessary for the oscillator circuit 1109 of the time base generating gircuit 1100 to produce 2 pulses. The aforesaid engine pulses having a frequency proportional to the engine speed, which are formed by the engine speed detecting section 800 and amplifying/shaping circuit 900, are supplied to the counter 2201 of the engine speed control circuit 2200 via the gate circuit 1000 during the conduction thereof.

When the counter 2201 has thus received a predetermined number of the engine pulses, the output voltage of the NAND element 2209 of the engine speed control circuit 2200 becomes low. Hence the solenoid 2302 of the relay 2301 of the fuel valve drive circuit 2300 is actuated thereby closing the switch 2306, so that an electric current flows through the solenoid 281 of the three-port, two-position solenoid valve 280. This solenoid valve communicates the chamber 292b of the fuel injection control means 290 with the vacuum pump 260. The diaphragm 293 of this fuel injection control means 290 is now displaced rightwardly, as viewed in FIG. 17, so that the rack, not shown, is moved in its predetermined direction to decrease the amount of fuel injected.

When the engine pulses supplied to the counter 2201 of the engine speed control circuit 2200 via the engine speed gate circuit 1000 during the conduction thereof falls short of the predetermined number because of the decrease in engine speed, the output voltage of the NAND element 2209 of the engine speed control circuit 2200 becomes high. Since then the solenoid 2302 of the relay 2301 of the fuel valve drive circuit 2300 is no longer actuated, no current flows through the solenoid 281 of the solenoid valve 280. The chamber 292b of the fuel injection control means 290 is now communicated with the conduit 315 by the solenoid valve 280. If the position of the accelerator pedal 310 is left unchanged, the diaphragm 293 of the fuel injection control means 290 is moved leftwardly, as viewed in FIG. 17, by the spring 294, so that the aforesaid rack is now moved in the opposite direction to increase the amount of fuel injected. By the repetition of the above described procedure, the engine is maintained at predetermined speed.

When the NAND element 1833 of the up-and-down control circuit 1800 has produced a low voltage for the downshift of the transmission, the engine speed gate circuit 1000 under the control of the engine speed gate control circuit 2100 is made conductive for a length of time necessary for the oscillator circuit 1109 of the time base generating circuit 1100 to produce one pulse. When the engine pulses supplied to the counter 2201 of the engine speed control circuit 2200 via the gate circuit 1000 during the conduction thereof reaches a predetermined number, the engine speed is decreased as aforesaid. In event the engine pulses fall short of the predetermined number due to decrease in the engine speed, the engine speed is again increased as above described. By the repetition of such procedure, the engine is maintained at predetermined speed. It may be noted that, since the conduction period of the engine speed gate circuit in this case is only half as long as that in the above described case of upshifts, the mentioned predetermined engine speed is twice the engine speed maintained when the transmission undergoes upshifts.

We claim:

1. In a vehicle transmission comprising an input shaft, an output shaft, and a plurality of selectively employable gear trains positioned between said input shaft and said output shaft to transmit power through said transmission at different speed ratios, a system for controlling said transmission comprising
   a. gearshift means for completing a selected one of said gear trains,
   b. power source means for operating said gearshift means,
   c. vehicle speed detecting means for producing a signal according to the rotational speed of said output shaft,
   d. payload detecting means for producing a signal according to the payload of the vehicle equipped with said transmission, and
   e. gearshift control means having a manual shift means which has a number of operating positions including an automatic drive operation, said gearshift control means, when said manual shift means is at said automatic drive position, automatically controlling the operation of said gearshift means in response to the output signal of said vehicle speed detecting means in order to transmit power through said transmission at an optimum speed ratio selected according to the rotational speed of said output shaft; and when said manual shift means is at said automatic drive position, said gearshift control means also responding to the output signal of said payload detecting means in order to transmit power through said transmission at a selected one ratio between the lowest and the highest speed ratios provided by said gear trains when the payload of the vehicle is larger than a predetermined value and between a speed ratio higher than said lowest speed ratio and the highest speed ratio when the payload of the vehicle is smaller than said predetermined value.

2. In a vehicle transmission as claimed in claim 1 said gearshift control means having a manual shift position sensing means which senses what position of said number of operating positions said manual shift means takes thereby to position said gearshift means to a selected one of said gear trains, said payload detecting means including switching means responding to the payload of the vehicle, said switching means, when said manual shift means takes said automatic drive position and the rotational speed of said output shaft is a predetermined value or lower, controlling said gearshift control means so as to set the speed ratio of said transmission at one of the lowest and higher speed ratios.

3. In a vehicle transmission as claimed in claim 2, said system further comprising inclination detecting means for producing a signal according to the inclination of a road, said gearshift control means also responding to the output signal of the inclination detecting means, whereby, when said manual shift means takes said automatic drive position and the rotational speed of said output shaft is said predetermined value or lower, said speed ratio of said transmission being set at the higher speed ratio when said payload is said predetermined value or smaller and said inclination is lower than a predetermined value and being set at the lowest speed ratio when the payload and/or the inclination is larger than the predetermined values.

4. In a vehicle transmission as claimed in claim 2, said vehicle speed detecting means being rendered to produce a pulse signal having a frequency corresponding to the rotational speed of said output shaft, said gearshift control means further comprising a counter circuit for counting said pulse signal for a predetermined period of time, an up-and-down sensing circuit for sensing the up and down of said speed ratios from the output of said counting circuit, and a control circuit for controlling said gearshift means in response to an output signal from said up-and-down sensing circuit, said manual shift position sensing means being connected to said up-and-down sensing circuit.

5. In a vehicle transmission as claimed in claim 4, said manual shift position sensing means comprising first and second NAND elements connected respectively to first and second switches which are linked to said manual shift means at least for said lowest and highest speed ratios, at least two NAND elements linked to said automatic drive position of said manual shift means, said two NAND elements being connected to said first and second NAND elements, and third and fourth NAND elements connected respectively to said first and second NAND elements and to said up-and-down sensing circuit, said third NAND element being linked to said switching means of said payload detecting means.

6. In a vehicle transmission as claimed in claim 5, said system further comprising a fifth NAND element having inputs connected to said first switch linked to said manual shift means and to said first NAND element and an output connected to said fourth NAND element.

7. In a vehicle transmission as claimed in claim 5, said at least two NAND elements being rendered to receive an output signal of said counter circuit.

8. In a vehicle transmission as claimed in claim 4, said system further comprising a gate circuit for controlling the operating time of said counting circuit and a predetermined frequency pulse generating circuit for operating said gate circuit.

9. In a vehicle transmission as claimed in claim 8, said system further comprising a gate control circuit for controlling the open time of said gate circuit controlled by said predetermined frequency pulse generating circuit in response to the kick-down operation of an accelerator pedal.

10. In a vehicle transmission as claimed in claim 9, said gate control circuit comprising two switches which respond to different depths in depression of said accelerator pedal and a flip-flop circuit connected to said switches so that when said accelerator pedal is kicked down the open time of said gate circuit is reduced.

11. In a vehicle transmission as claimed in claim 8, said system further comprising a gate control circuit including a second payload detecting means for controlling the open time of said gate circuit.

12. In a vehicle transmission as claimed in claim 11, said second payload detecting means comprising switching means for shortening the open time of said gate circuit according to the payload.

13. In a vehicle transmission as claimed in claim 8, said system further comprising inclination detecting means for shortening the open time of said gate circuit in response to the inclination of the road.

14. In a vehicle transmission as claimed in claim 4, said up-and-down sensing means of said gearshift control means comprising a circuit for generating an up-shift signal or a down-shift signal by sensing whether or not an output signal from said counter circuit is greater than predetermined limits and further comprising third payload detecting means for modifying said predetermined limits in response to the payload of the vehicle.

15. In a vehicle transmission as claimed in claim 14, said counting circuit comprising counter means for counting said pulse signal and a plurality of decoders connected to said counter means, said up-and-down sensing circuit comprising a first NAND element for receiving one output signal of said counter, a series of NAND elements receiving an output signal of said first NAND element and the other output signal of of said counter, and a group of flip-flops for respectively receiving output signals from said series of Nand elements, said first NAND element being rendered to receive an output signal from said third payload detecting means.

16. In a vehicle transmission as claimed in claim 15, said third payload detecting means comprising a plurality of switches which are operated according to the payload of the vehicle, thereby to modify said predetermined limits for the generation of the down-shift signal.

17. In a vehicle transmission as claimed in claim 16, said up-and-down sensing circuit further comprising a group of NAND elements respectively receiving said output signals of said group of flip-flops, the other individual inputs of said group of NAND elements being caused to receive an output signal of operating position detecting means of said gear trains completed by said gearshift means.

18. In a vehicle transmission as claimed in claim 4, said up-and-down sensing circuit of said gearshift control means including a circuit for producing a speed ratio variation signal by sensing whether or not an output signal of said counter circuit is greater than predetermined limits and further including inclination detecting means for modifying said predetermined limits according to the inclination of the road.

19. In a vehicle transmission as claimed in claim 4, said control circuit comprising a circuit for generating an up-shift signal and a down-shift signal by receiving an output signal of said up-and-down sensing control circuit, and a circuit for driving said gearshift means according to said up-shift and down-shift signals.

20. In a vehicle transmission as claimed in claim 19, said gearshift means comprising switching valve means operated by said drive circuit, servo means operated by said switching valve means, and shift means for effecting the engagement of one of said gear trains by the operation of said servo means.

21. In a vehicle transmission as claimed in claim 4, said system further comprising engine speed detecting means for producing a signal corresponding to the rotation number of an engine, comparison means for comparing said signal corresponding to the rotational number of the engine with a predetermined value and means for controlling the rotational number of said engine in response to an output signal from said comparison means.

22. In a vehicle transmission as claimed in claim 21, said comparison means comprising a predetermined frequency pulse generating circuit for generating a pulse having a predetermined frequency, a gate circuit controlled by said predetermined frequency pulse generating circuit, a counter circuit for counting said engine rotational number response signal when said gate circuit is open, and a comparison circuit for comparing said engine rotational number response signal counted by said counter circuit with a predetermined signal.

23. In a vehicle transmission comprising an input shaft, an output shaft, and a plurality of selectively employable gear trains positioned between said input shaft and said output shaft to transmit power through said transmission at different speed ratios, a system for controlling said transmission comprising
 a. gearshift means for completing a selected one of said gear trains,
 b. power source means for operating said gearshift means,
 c. vehicle speed detecting means for producing a signal according to the rotational speed of said output shaft,
 d. inclination detecting means for producing a signal according to the inclination of the road, and
 e. gearshift control means having a manual shift means which has a number of operating positions including an automatic drive position, said gearshift control means, when said manual shift means takes said automatic drive position, automatically controlling the operation of said gearshift means via said power source means in response to the output signal of said vehicle speed detecting means in order to transmit power through said transmission at an optimum speed ratio selected according to the rotational speed of said output shaft; said inclination detecting means including switching means operated according to the inclination of the road, said switching means, when said manual shift means takes said automatic drive position and the rotational speed of said output shaft is a predetermined value or less, controlling said gearshift control means so that the speed ratio of said transmission is rendered to be the lowest speed ratio of a speed ratio higher than said lowest speed ratio.

* * * * *